US011341157B2

(12) United States Patent
Kumar et al.

(10) Patent No.: US 11,341,157 B2
(45) Date of Patent: May 24, 2022

(54) FILTER CHAINS FOR EXPLORING LARGE DATA SETS

(71) Applicant: Palantir Technologies Inc., Palo Alto, CA (US)

(72) Inventors: Adit Kumar, New York, NY (US); Lindsay Canfield, Santa Clara, CA (US); Karl Hanson, Palo Alto, CA (US); Kevin Simler, Palo Alto, CA (US); Beyang Liu, Menlo Park, CA (US)

(73) Assignee: Palantir Technologies Inc., Denver, CO (US)

( * ) Notice: Subject to any disclaimer, the term of this patent is extended or adjusted under 35 U.S.C. 154(b) by 185 days.

(21) Appl. No.: 16/567,837

(22) Filed: Sep. 11, 2019

(65) Prior Publication Data

US 2020/0110758 A1 Apr. 9, 2020

Related U.S. Application Data

(63) Continuation of application No. 14/562,420, filed on Dec. 5, 2014, now Pat. No. 10,452,678, which is a (Continued)

(51) Int. Cl.
*G06F 15/16* (2006.01)
*G06F 16/26* (2019.01)
(Continued)

(52) U.S. Cl.
CPC ............ *G06F 16/26* (2019.01); *G06F 16/335* (2019.01); *G06F 16/35* (2019.01); *G06F 16/904* (2019.01)

(58) Field of Classification Search
None
See application file for complete search history.

(56) References Cited

U.S. PATENT DOCUMENTS 8,489,548 B2 7/2013 Wang et al.
8,909,656 B2 12/2014 Kumar et al.
(Continued)

FOREIGN PATENT DOCUMENTS

| | | |
|---|---|---|
| AU | 2014201553 | 3/2018 |
| EP | 2778974 | 10/2019 |
| EP | 3598376 | 1/2020 |

OTHER PUBLICATIONS

European Search Report, EP Application 19196345.3, dated Nov. 4, 2019; 8 pages.

*Primary Examiner* — Alex Gofman
(74) *Attorney, Agent, or Firm* — Knobbe, Martens, Olson & Bear, LLP

(57) ABSTRACT

A multipath explorer may allow a user to quickly visualize an entire population of data hierarchically in a tree-like structure. For example, a user can select a first filter to be applied to a data set, and the multipath explorer can display data in the data set that satisfies the first filter requirements and data in the data set that does not satisfy the first filter requirements. A second filter can be applied to the data in the data set, and the multipath explorer can display data in the data set that satisfies the first and second filter requirements, data in the data set that satisfies the first filter requirements and not the second filter requirements, data in the data set that satisfies the second filter requirements and not the first filter requirements, and data in the data set that does not satisfy the first or second filter requirements.

21 Claims, 61 Drawing Sheets

1316
1312
1318
1314
1322
1324

Related U.S. Application Data continuation of application No. 14/149,608, filed on Jan. 7, 2014, now Pat. No. 8,909,656.

(60) Provisional application No. 61/794,653, filed on Mar. 15, 2013.

(51) Int. Cl.

| | |
|---|---|
| ***G06F 16/335*** | (2019.01) |
| ***G06F 16/35*** | (2019.01) |
| ***G06F 16/904*** | (2019.01) |

(56) References Cited

U.S. PATENT DOCUMENTS

| | | | | |
|---|---|---|---|---|
| 10,452,678 | B2 | 10/2019 | Kumar et al. | |
| 2003/0237046 | A1 | 12/2003 | Parker et al. | |
| 2006/0026120 | A1 | 2/2006 | Carolan et al. | |
| 2006/0161485 | A1* | 7/2006 | Meldahl | G06Q 40/00 705/35 |
| 2008/0120593 | A1* | 5/2008 | Keren | G06F 9/451 717/105 |
| 2008/0162616 | A1 | 7/2008 | Gross et al. | |
| 2008/0255973 | A1 | 10/2008 | El Wade et al. | |
| 2009/0019064 | A1 | 1/2009 | Takafuji | |
| 2009/0125459 | A1 | 5/2009 | Norton et al. | |
| 2010/0070489 | A1 | 3/2010 | Aymeloglu et al. | |
| 2010/0191563 | A1 | 7/2010 | Schlaifer et al. | |
| 2010/0287512 | A1* | 11/2010 | Gan | G06F 16/26 715/854 |
| 2011/0153384 | A1 | 6/2011 | Horne et al. | |
| 2014/0019464 | A1* | 1/2014 | Fujimoto | G06F 16/335 707/754 |

* cited by examiner

1310

FILTER CHAINS FOR EXPLORING LARGE DATA SETS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application is a continuation of U.S. patent application Ser. No. 14/562,420, entitled "FILTER CHAINS FOR EXPLORING LARGE DATA SETS", filed Dec. 5, 2014, which claims benefit of U.S. patent application Ser. No. 14/149,608, entitled "FILTER CHAINS WITH ASSOCIATED MULTIPATH VIEWS FOR EXPLORING LARGE DATA SETS", filed Jan. 7, 2014, which claims benefit of U.S. Provisional Application No. 61/794,653, entitled "FILTER CHAINS WITH ASSOCIATED MULTIPATH VIEWS FOR EXPLORING LARGE DATA SETS," which was filed Mar. 15, 2013. Each of these applications are hereby incorporated by reference herein in their entireties.

TECHNICAL FIELD

The present disclosure relates to systems and techniques for data integration, analysis, and visualization. More specifically, the present disclosure relates to systems and techniques for exploring large data sets in multipath views.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Data analysts often perform analysis of a large collection of data items, such as data relating to the medical field, the financial industry, the real estate market, and the like. In many instances, the amount of raw data about data items (also referred to as "inventory") can be massive and dynamically increasing all the time. For example, such data may be updated in large volumes and/or numerous times in a day. Therefore, in addition to metadata that captures relatively stable aspects of the inventory, a huge amount of raw data may be accumulated over a particular period of time.

While inventory can possibly be analyzed based on the raw data, it is often difficult to make sense of the raw data, metadata, or related computations. This problem is drastically compounded when analyzing a large collection of inventory. Thus, an analyst often is forced to rely on inexact hunches, experience, and/or cumbersome spreadsheets to identify trends, diagnose problems, and/or otherwise evaluate the inventory.

SUMMARY

One aspect of this disclosure provides a computing system comprising a network interface that is coupled to a data network for receiving and transmitting one or more packet flows. The computer system further comprises a processor. The computer system further comprises one or more stored program instructions configured for execution by the processor in order to cause the computing system to create and store in computer memory a first filter chain indicating one or more first membership criteria. The executed stored program instructions may further cause the computing system to apply the first filter chain to a data set to identify one or more first data items that satisfy the first membership criteria and one or more second data items that do not satisfy the first membership criteria. The executed stored program instructions may further cause the computing system to transmit the first data items and the second data items to a client computer configured to display the first data items in a first filter view in a first graphically demarcated area and the second data items in a second filter view in a second graphically demarcated area. The executed stored program instructions may further cause the computing system to receive a user selection of the first graphically demarcated area and the second graphically demarcated area. The executed stored program instructions may further cause the computing system to determine one or more second membership criteria. The executed stored program instructions may further cause the computing system to create a second filter chain based on the first filter chain and the second membership criteria. The executed stored program instructions may further cause the computing system to apply the second filter chain to the data set to identify one or more third data items that satisfy the first membership criteria and the second membership criteria, one or more fourth data items that satisfy the first membership criteria and do not satisfy the second membership criteria, one or more fifth data items that satisfy the second membership criteria and do not satisfy the first membership criteria, and one or more sixth data items that do not satisfy the first membership criteria and do not satisfy the second membership criteria. The executed stored program instructions may further cause the computing system to transmit the third data items, the fourth data items, the fifth data items, and sixth data items to the client computer. The client computer may be configured to display the third data items and the fourth data items in the first graphically demarcated area, and the fifth data items and the sixth data items in the second graphically demarcated area.

Another aspect of this disclosure provides a computer-implemented method of analyzing and exploring a large amount of dynamically updating data. The computer-implemented method comprises, as implemented by one or more computer systems comprising computer hardware and memory, the one or more computer systems configured with specific executable instructions, receiving, from a user of the one or more computer systems, selection of a first membership criteria for application on a first data set comprising a plurality of data items. The computer-implemented method further comprises applying the first membership criteria to the data set to identify a first set of data items that satisfy the first membership criteria and a second set of data items that do not satisfy the first membership criteria. The computer-implemented method further comprises generating a user interface including indications of the first set of data items in a first area and indications of the second set of data items in a second area. The computer-implemented method further comprises receiving, from the user, selection of a second membership criteria for application on the first data set. The computer-implemented further comprises applying the first membership criteria and the second membership criteria to the data set to identify a third set of data items that satisfy the first membership criteria and the second membership criteria, a fourth set of data items that satisfy the first membership criteria and do not satisfy the second membership criteria, a fifth set of data items that satisfy the second membership criteria and do not satisfy the first membership criteria, and a sixth set of data items that do not satisfy the first membership criteria and do not satisfy the second membership criteria. The computer-implemented method further comprises updating the user interface to include an indication of the third set of data items and the fourth set of data items in the first area, and the fifth set of data items and the sixth set of data items in the second area.

Another aspect of this disclosure provides a non-transitory computer-readable medium comprising one or more program instructions recorded thereon, the instructions configured for execution by a computing system comprising one or more processors in order to cause the computing system to determine a first membership criteria to be applied to a data set including a plurality of data items. The medium further comprises one or more program instructions configured for execution by the computing system to cause the computing system to identify one or more first data items of the data set that satisfy the first membership criteria. The medium further comprises one or more program instructions configured for execution by the computing system to cause the computing system to identify one or more second data items of the data set that do not satisfy the first membership criteria. The medium further comprises one or more program instructions configured for execution by the computing system to cause the computing system to transmit display instructions to a client computer device, the display instructions indicating display of a first filter view of the one or more first data items in a first graphically demarcated area and display of a second filter view of the one or more second data items in a second graphically demarcated area, such that information regarding both the data items matching the first membership criteria and data items not matching the first membership criteria are viewable by a user of the client computer device.

BRIEF DESCRIPTION OF THE DRAWINGS

FIG. 9-1 illustrates a content pane included in the GUI of FIG. 9.

FIG. 9-2 illustrates another content pane included in the GUI of FIG. 9.

FIG. 9-3 illustrates another content pane included in the GUI of FIG. 9.

FIG. 9-4 illustrates another content pane included in the GUI of FIG. 9.

FIG. 10-1A illustrates a content pane included in the GUI of FIG. 10.

FIG. 10-1B illustrates another content pane included in the GUI of FIG. 10.

FIG. 10-2A illustrates another content pane included in the GUI of FIG. 10.

FIG. 10-2B illustrates another content pane included in the GUI of FIG. 10.

FIG. 10-3A illustrates another content pane included in the GUI of FIG. 10.

FIG. 10-3B illustrates another content pane included in the GUI of FIG. 10.

FIG. 10-4A illustrates another content pane included in the GUI of FIG. 10.

FIG. 10-4B illustrates another content pane included in the GUI of FIG. 10.

FIG. 11-1A illustrates a content pane included in the GUI of FIG. 11.

FIG. 11-1B illustrates another content pane included in the GUI of FIG. 11.

FIG. 11-1C illustrates another content pane included in the GUI of FIG. 11.

FIG. 11-1D illustrates another content pane included in the GUI of FIG. 11.

FIG. 11-2A illustrates another content pane included in the GUI of FIG. 11.

FIG. 11-2B illustrates another content pane included in the GUI of FIG. 11.

FIG. 11-2C illustrates another content pane included in the GUI of FIG. 11.

FIG. 11-2D illustrates another content pane included in the GUI of FIG. 11.

FIG. 11-3A illustrates another content pane included in the GUI of FIG. 11.

FIG. 11-3B illustrates another content pane included in the GUI of FIG. 11.

FIG. 11-3C illustrates another content pane included in the GUI of FIG. 11.

FIG. 11-3D illustrates another content pane included in the GUI of FIG. 11.

FIG. 11-4A illustrates another content pane included in the GUI of FIG. 11.

FIG. 11-4B illustrates another content pane included in the GUI of FIG. 11.

FIG. 11-4C illustrates another content pane included in the GUI of FIG. 11.

FIG. 11-4D illustrates another content pane included in the GUI of FIG. 11.

FIG. 12-1A illustrates a content pane included in the GUI of FIG. 12.

FIG. 12-1B illustrates another content pane included in the GUI of FIG. 12.

FIG. 12-1C illustrates another content pane included in the GUI of FIG. 12.

FIG. 12-1D illustrates another content pane included in the GUI of FIG. 12.

FIG. 12-2A illustrates another content pane included in the GUI of FIG. 12.

FIG. 12-2B illustrates another content pane included in the GUI of FIG. 12.

FIG. 12-3A illustrates another content pane included in the GUI of FIG. 12.

FIG. 12-3B illustrates another content pane included in the GUI of FIG. 12.

FIG. 12-4A illustrates another content pane included in the GUI of FIG. 12.

FIG. 12-4B illustrates another content pane included in the GUI of FIG. 12.

DETAILED DESCRIPTION OF SPECIFIC EMBODIMENTS

Overview

Figure 1:
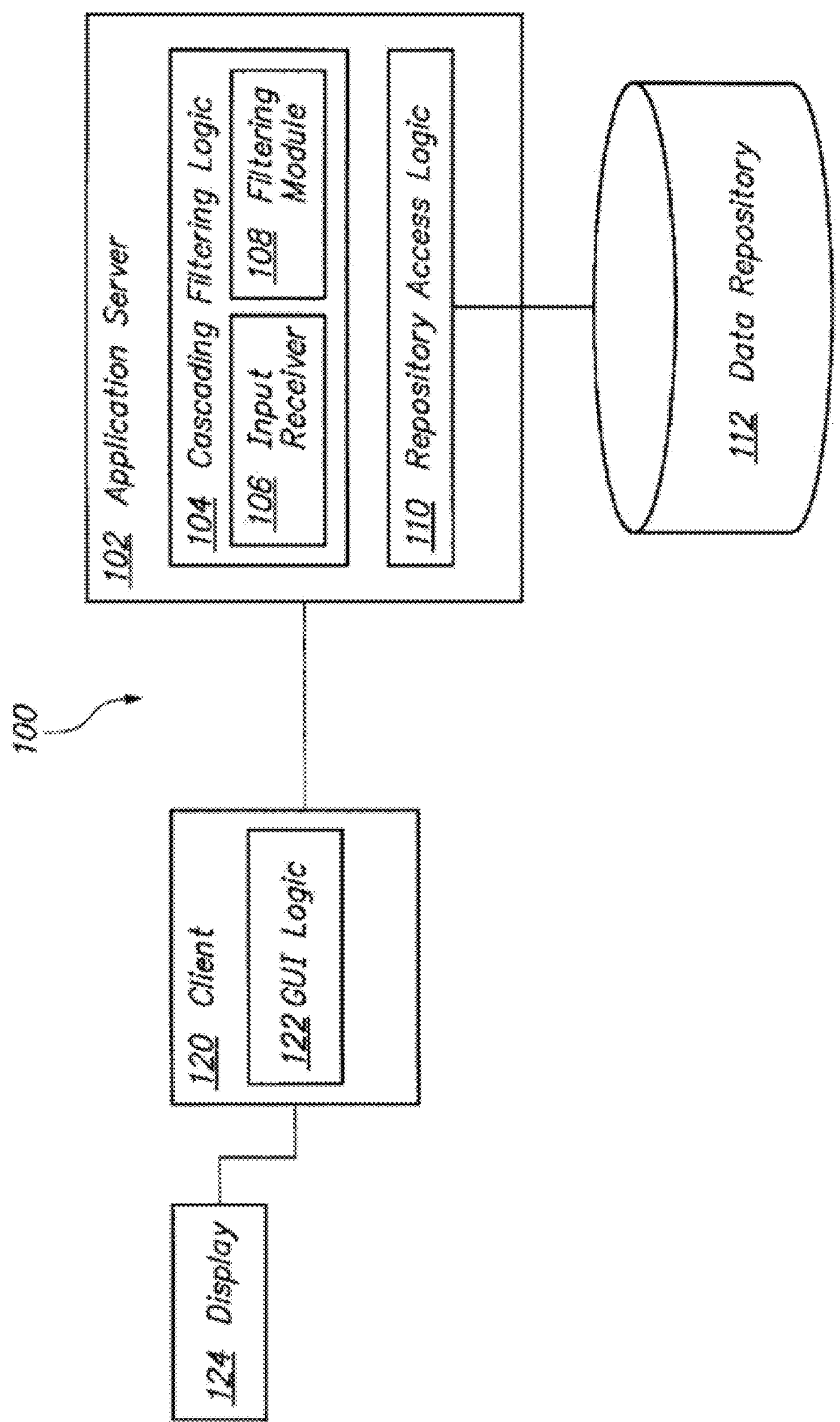
FIG. 1 illustrates an example data analysis system for analyzing a universe of data items.

Aspects of the disclosure provided herein describe the creation and implementation of a multipath explorer. As described above, it can be very difficult to make sense of raw data, metadata, or related computations, especially when analyzing a large collection of inventory. The multipath explorer reduces or eliminates the need for an analyst to rely on inexact hunches, experience, and/or cumbersome spreadsheets to identify trends, diagnose problems, and/or otherwise evaluate inventory or objects in one or more databases. In particular, the multipath explorer simplifies the analysis such that an analyst can make sense of raw data, metadata, or related computations, even when analyzing a large collection of inventory that is dynamically updating all the time.

In one embodiment, the multipath explorer allows a user (e.g., analyst) to quickly (e.g., immediately or substantially immediately) visualize an entire population (e.g., all the data in a data set), one or more subsets of the entire population (e.g., certain data in the data set that satisfies membership criteria), and one or more endpoints of an analysis of subsets of the entire population arranged hierarchically in a structure, such as a tree, a directed acyclic graph (DAG), or other structure. Any discussion herein of a particular structure or view, such as a tree structure, may also be applicable to any other structure or view, such as a DAG. As the population is updated, the multipath explorer dynamically updates one or more views such that the user can immediately visualize the entire updated population, one or more subsets of the entire updated population, and one or more endpoints of an analysis of subsets of the entire updated population. The speed and accuracy by which the multipath explorer updates the one or more views cannot be performed manually by a human since a human would need to continuously redo hundreds to millions or more computations each time the inventory is updated.

For example, a user can select a first filter to be applied to a data set, and the multipath explorer can display data in the data set that satisfies the first filter requirements and data in the data set that does not satisfy the first filter requirements. A second filter can be applied to some or all of the data in the data set, and the multipath explorer can display data in the data set that satisfies the first filter and second filter requirements, data in the data set that satisfies the first filter requirements and not the second filter requirements, data in the data set that satisfies the second filter requirements and not the first filter requirements, and/or data in the data set that does not satisfy the first filter or second filter requirements. Additional filters may be applied and the multipath explorer may generate corresponding views.

As an example use case, the data set may correspond to loan values for homes. A first filter may require that the homes be in California and a second filter may require that the homes be single family homes. Once the first filter is applied, the multipath explorer may display loan values for homes in California and loan values for homes not in California. The second filter may then be applied to only homes in California, only homes not in California, and/or to all homes. For example, if the second filter is applied to only homes in California, the multipath explorer may display loan values for single family homes in California, loan values for homes in California that are not single family homes (e.g., multi family homes in California), and loan values for homes not in California. As another example, if the second filter is applied to only homes not in California, the multipath explorer may display loan values for homes in California, loan values for single family homes not in California, and loan values for homes that are not single family homes and that are not in California (e.g., multi family homes not in California). As another example, if the second filter is applied to all homes, the multipath explorer may display loan values for single family homes in California, loan values for homes in California that are not single family homes (e.g., multi family homes in California), loan values for single family homes not in California, and loan values for homes that are not single family homes and that are not in California (e.g., multi family homes not in California).

Definitions

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms.

Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Database: A broad term for any data structure for storing and/or organizing data, including, but not limited to, relational databases (Oracle database, mySQL database, etc.), spreadsheets, XML files, and text file, among others.

Data Object or Object: A data container for information representing specific things in the world that have a number of definable properties. For example, a data object can represent an entity such as a person, a place, an organization, a market instrument, an inventory, an item, a product, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Data Item: An attribute of a data object. A data item can be represented by a number of attributes. These attributes may comprise relatively stable attributes along a dimension, such as time, and a number of measurable attributes that are dynamic along the same dimension. Values of the relatively stable properties of a data item constitute metadata. Values of the measurable properties of a data item constitute measured data along a certain dimension, say time. Examples of measured data include, but are not limited to, one or more sequences of measurements (e.g., raw measurement data) on one or more of the measurable properties. The data analysis system may determine a plurality of attributes for a data item based on the sequences of measurements. In an embodiment, a data item may be represented by a combination of metadata, sequences of measurements, and/or attributes based on the sequences of measurements.

Data Set: A starting set of data items for a filter chain, a universe of data items, a result set from one or more prior filtering operations performed on the universe of data items, or a subset in the universe of data items.

Filter: A filter link that can be selected by a user to be a part of a filter chain; and/or a filter view that provides a display of results of an evaluation of the filter chain. In some embodiments, a filter view can be used to modify an existing filter that is within the filter view.

Filter Chain: An object that consists of a starting set of data items, such as inventory, and a set of zero or more filter links.

Filter Link: A component object that consists of a set operation (e.g., narrow, expand, modify, transform, average, plot, etc.) and a membership criterion. A filter link may be one of many in a filter chain.

Filter View: A view of results of an evaluation of an existing filter chain. Each filter link in the filter chain can have a filter view associated with it. Filter views may be paired 1:1 with filter links. An individual filter view gives some graphical representation of some internal state of the computation involved in applying the membership criterion in the filter link to a set of data items that has made it to the filter link in question (which has passed all the previous filter links in the chain). The user can interact with the view associated with a particular filter link in order to change membership criterion for the particular filter link. For example, a histogram view shown in FIG. 3B is a view attached to the Histogram filter, and by clicking and dragging to select ranges along the x-axis of the histogram view, one actually changes the membership criterion for that filter.

Frame: A graphical representation object that is configurable to include one or more GUI components. Examples of frames include, but are not limited to, dialog boxes, forms, and other types of windows or graphical containers.

Graphically Demarcated Area: A bounded area on a graphic user interface. In some embodiments, a graphically demarcated area may be implemented as a window, a frame, or a content pane that is separate and apart from a portion of GUI that concurrently displays a list view, a table view, or a tree view, of data items. Examples of a graphically demarcated area also include a specific portion of a display on a handheld computing device.

Inventory: A data object that can be monitored. For example, medical data (e.g., types of surgeries, number of heart attacks, ailments that cause illness and/or death, etc.), financial data (e.g., stocks, bonds and derivatives thereof (e.g. stock options, bond futures, mutual funds) that can be traded on stock markets and/or exchanges), real estate data (e.g., loan values, number of plots and/or homes sold, number of homes and/or buildings constructed, etc.), and the like can be types of inventory that can be monitored.

Membership Criterion: A function that selects a set of inventory.

Starting Set of Inventory: A set of inventory that can be specified independent of the rest of the filter chain. This can be the "universe" of all the inventory known to a system or it can be the empty set.

Universe of Data Items: A set of data items that is known to a data analysis system.

Data Analysis System Overview

FIG. 1 illustrates an example data analysis system for analyzing a universe of data items. Data analysis system 100 comprises application server 102 and one or more clients, such as client 120.

Figure 14:
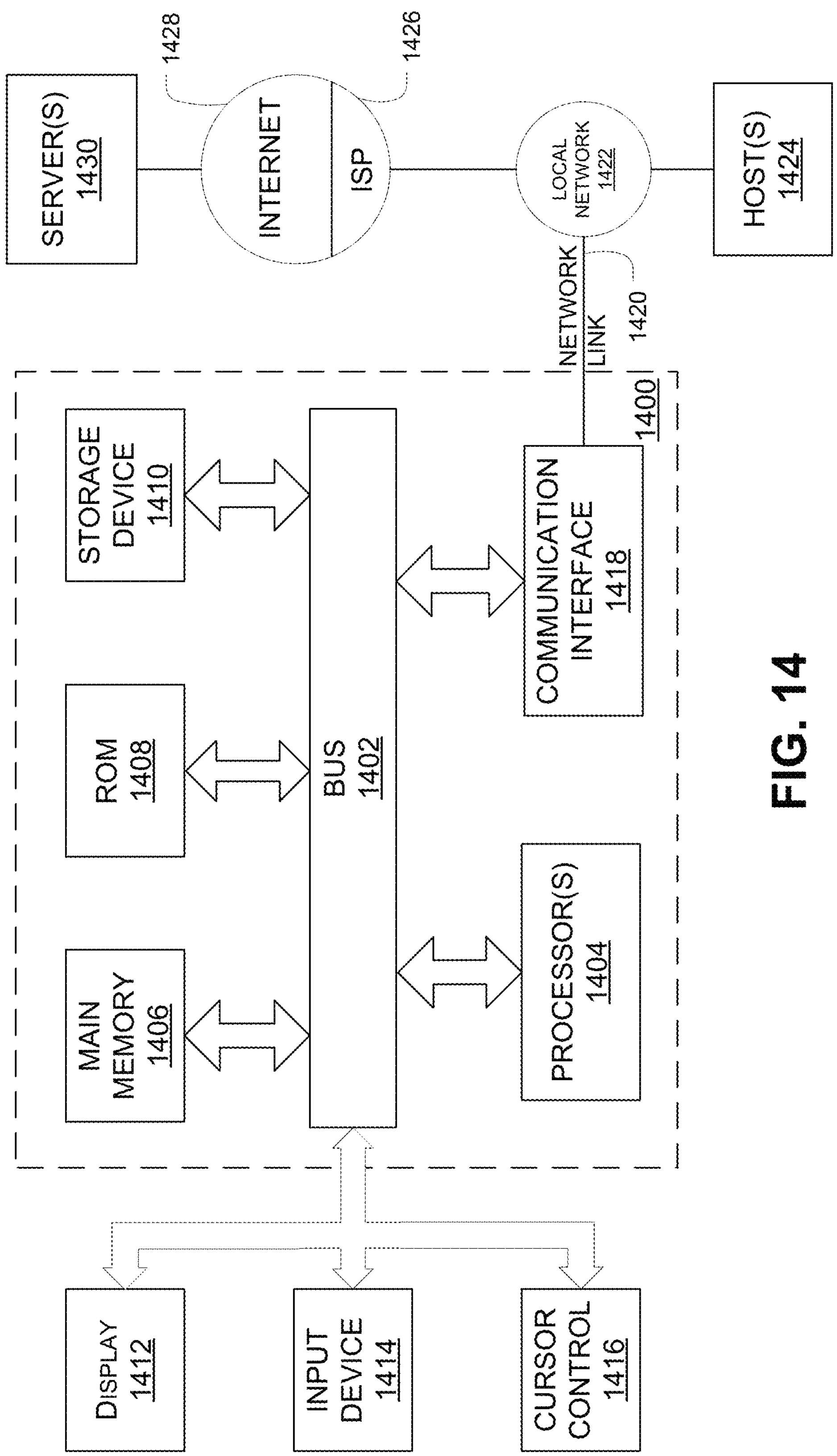
FIG. 14 illustrates a computer system with which certain methods discussed herein may be implemented.

In the embodiment illustrated in FIG. 1, client 120, which may be implemented by one or more first physical computing devices, is communicatively connected to application server 102, which may be implemented by one or more second physical computing devices, over a network. In some embodiments, each such physical computing device may be implemented as a computer system as shown in FIG. 14. For example, client 120 may be implemented in a computer system as a set of program instructions recorded on a machine-readable storage medium. Client 120 comprises graphical user interface (GUI) logic 122. GUI logic 122 may be a set of program instructions which, when executed by one or more processors of the computer system, are operable to receive user input and to display a graphical representation of analytical results of a universe of data items using the approaches herein. GUI logic 122 may be operable to receive user input from, and display analytical results to, a graphical user interface that is provided on display 124 by the computer system on which client 120 executes.

In some embodiments, GUI logic 122 is omitted. For example, in one embodiment, client 120 may comprise an application program or process that issues one or more function calls or application programming interface (API) calls to application server 102 to obtain information resulting from, to provide input to, and to execute along with application server 102, the processes or one or more steps thereof as described herein. For example, client 120 may request and obtain filtered data, filter chains, sets and other data as described further herein using a programmatic interface, and then the client may use, process, log, store, or otherwise interact with the received data according to local logic. Client 120 may also interact with application server 102 to provide input, definition, editing instructions, expressions related to filtered data, filter chains, sets and other data as described herein using a programmatic interface, and then the application server 102 may use, process, log, store, or otherwise interact with the received input according to application server logic.

Application server 102 may be implemented as a special-purpose computer system having the logical elements shown in FIG. 1. In an embodiment, the logical elements may comprise program instructions recorded on one or more machine-readable storage media. Alternatively, the logical elements may be implemented in hardware, firmware, or a combination.

When executed by one or more processors of the computer system, logic in application server 102 is operable to analyze the universe of data items according to the techniques described herein. In one embodiment, application server 102 may be implemented in a Java Virtual Machine (JVM) that is executing in a distributed or non-distributed computer system. In other embodiments, application server 102 may be implemented as a combination of programming instructions written in any programming language (e.g. C++ or Visual Basic) and hardware components (e.g., memory, CPU time) that have been allocated for executing the program instructions.

In an embodiment, application server 102 comprises repository access logic 110 and cascading filtering logic 104. Repository access logic 110 may comprise a set of program instructions which, when executed by one or more processors, are operable to access and retrieve data from data repository 112. For example, repository access logic 110 may be a database client or an Open Database Connectivity (ODBC) client that supports calls to a database server that manages data repository 112. Data repository 112 may be any type of structured storage for storing data including, but not limited to, relational or object-oriented databases, data warehouses, directories, data files, and any other structured data storage.

In an embodiment, cascading filtering logic 104 is operable to retrieve an existing filter chain based on prior saved information or prior user selections, receive new user selection of membership criteria and set operations from a client, create a new filter chain based on the user selection and the existing filter chain, create a new inventory group based on the new filter chain, and generate a filter view that may be operated on by a user of a client. In the embodiment illustrated in FIG. 1, cascading filtering logic 104 comprises input receiver 106 and filtering module 108. Cascading filtering logic 104 may be object-oriented logic. As used herein, the universe of data items can be accessed and/or operated by the cascading filtering logic 104 to generate the analytical results.

In an embodiment, input receiver 106 is a set of program instructions which, when executed by one or more processors, are operable to receive input, including user selection of membership criteria and set operations, from a client.

Filtering module 108 is a set of program instructions that implement logic to create filter chains based on membership criteria and set operations and apply the filter chains to a universe of data items to create filter views that may be provided to a client. Filter views may also be rendered by GUI logic 122 on display 120.

Example Process Flows

Figure 2A:
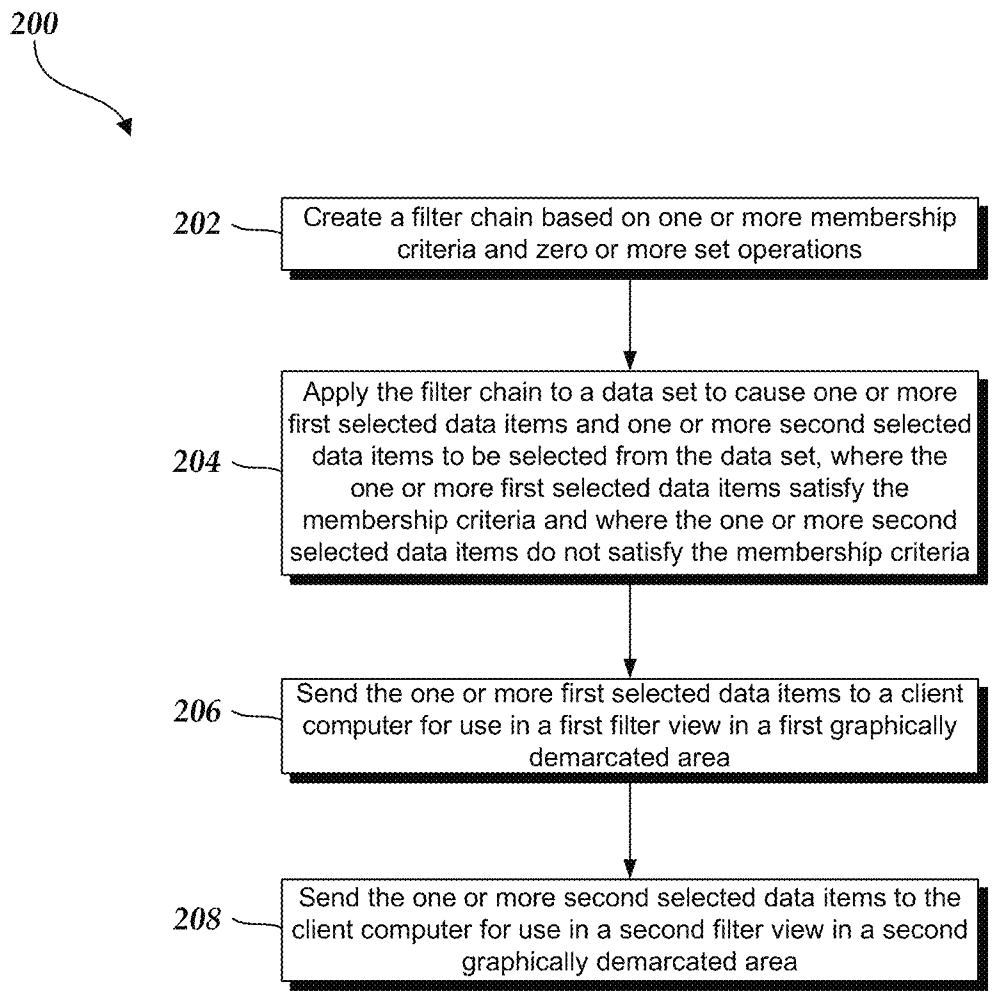
FIG. 2A illustrates an example process flow for analyzing a data set.

FIG. 2A illustrates an example process flow for analyzing a data set. In block 202, the data analysis system 100 creates a filter chain based on one or more membership criteria and zero or more set operations. For example, the filter chain may be retrieved from the data repository 112 in which the filter chain has been previously defined and saved, or may defined by one or more user inputs.

In block 204, the data analysis system 100 applies the filter chain to a data set to cause one or more first selected data items to be selected from the data set and one or more second selected data items to be selected from the data set. For example, the first selected data items may be data items that satisfy the membership criteria and the second selected data items may be data items that do not satisfy the membership criteria. The filter chain may be a histogram filter that selects all data items in a data set that satisfy the membership criteria. In alternative embodiments, zero data items may be returned when the filter chain is applied to the data set.

In block 206, the data analysis system 100 sends the one or more first selected data items to a client computer for constructing a first filter view in a first graphically demarcated area (e.g., the one or more first selected data items are configured to be viewed in the first filter view). For example, the first filter view may be a list view filter that displays all homes for sale in a region specified by the membership criteria. As another example, the first filter view may be a list view filter that displays all heart attacks that occurred in a region specified by the membership criteria. As another example, the first filter view may be a histogram view filter that displays the number of stocks purchased over a period specified by the membership criteria. The first graphically demarcated area may be a content pane that is separate and apart from a list, table, or tree view that presents a scrollable listing of all inventory.

In block 208, the data analysis system 100 sends the one or more second selected data items to a client computer for constructing a second filter view in a second graphically demarcated area (e.g., the one or more second selected data items are configured to be viewed in the second filter view). For example, the second filter view may be a list view filter that displays all homes for sale in all regions not specified by the membership criteria. The second graphically demarcated area may be a content pane that is separate and apart from a list, table, or tree view that presents a scrollable listing of all inventory. Thus the user can advantageously view homes for sale (or other objects) that match the provided membership criteria in a first graphical display and also view homes for sale (or other objects) that do not match the provided membership criteria in a second graphical display.

Figure 2B:
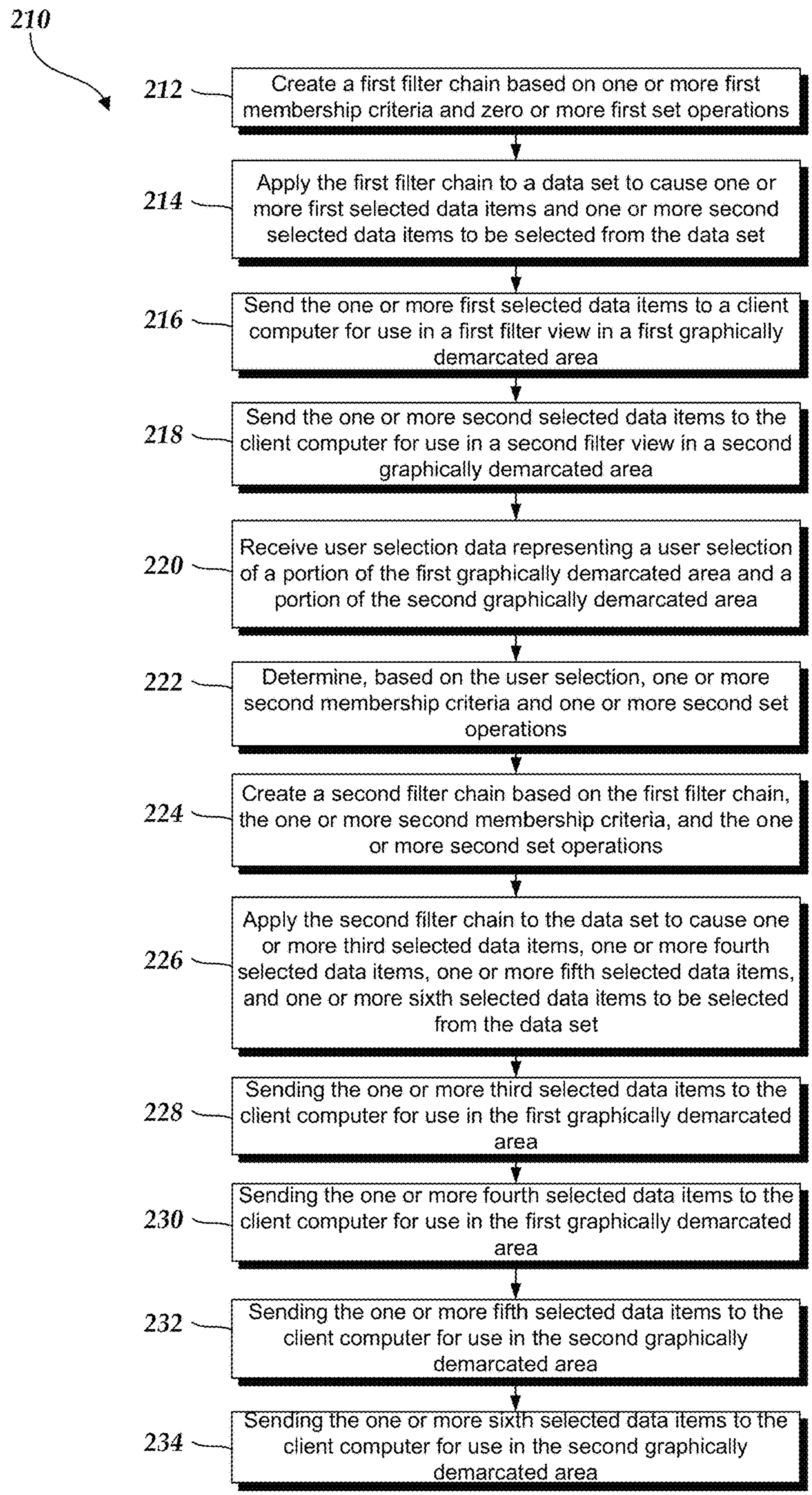
FIG. 2B illustrates another example process flow for analyzing a data set.

FIG. 2B illustrates another example process flow for analyzing a data set, wherein a second filter chain is applied in order to generate further visualizations of various combinations of data sets matching and not matching the first and second filter chain. In block 212, the data analysis system 100 creates a first filter chain based on one or more first membership criteria and zero or more first set operations. For example, the first filter chain may be retrieved from the data repository 112 in which the first filter chain has been previously defined and saved.

In block 214, the data analysis system 100 applies the first filter chain to a data set to cause one or more first selected data items to be selected from the data set and one or more second selected data items to be selected from the data set. For example, the first selected data items may be data items that satisfy the first membership criteria and the second selected data items may be data items that do not satisfy the first membership criteria. The first filter chain may be a histogram filter that selects all data items in a data set that satisfy the first membership criteria. In alternative embodiments, zero data items may be returned when the first filter chain is applied to the data set.

In block 216, the data analysis system 100 sends the one or more first selected data items to a client computer for constructing a first filter view in a first graphically demarcated area (e.g., the one or more first selected data items are configured to be viewed in the first filter view). For example, the first filter view may be a list view filter that displays all homes for sale in a region specified by the first membership criteria. The first graphically demarcated area may be a content pane that is separate and apart from a list, table, or tree view that presents a scrollable listing of all inventory.

In block 218, the data analysis system 100 sends the one or more second selected data items to a client computer for constructing a second filter view in a second graphically demarcated area (e.g., the one or more second selected data items are configured to be viewed in the second filter view). For example, the second filter view may be a list view filter that displays all homes for sale in all regions not specified by the first membership criteria. The second graphically demarcated area may be a content pane that is separate and apart from a list, table, or tree view that presents a scrollable listing of all inventory.

In block 220, the data analysis system 100 receives user selection data representing a user selection of a portion of the first graphically demarcated area and a portion of the second graphically demarcated area. For example, the user may select a particular type of home in the list view, where the particular type of home represents homes of a particular type of use (e.g., single family, multi family, etc.). The user may select the same type of home in the first graphically demarcated area and the second graphically demarcated area. In alternative embodiments, the user may additionally or alternatively enter criteria in a suitable input means such as a text field entry. For example, the user may specify in a text field entry the type of home to be selected.

In block 222, the data analysis system 100 determines, based on the user selection, one or more second membership criteria and one or more second set operations. For example, the one or more second membership criteria may comprise a membership criterion that an inventory must be the selected type of home.

In block 224, the data analysis system 100 creates a second filter chain based on the first filter chain, the one or more second membership criteria, and the one or more second set operations. For example, this second filter chain comprises two filter links, with the first filter link selecting all the homes in a particular region and the second filter link selecting only those inventories in the particular region that are of the selected type of home.

In block 226, the data analysis system 100 applies the second filter chain to the data set to cause one or more third selected data items, one or more fourth selected data items, one or more fifth data items, and one or more sixth data items to be selected from the data set. For example, the third selected data items may be data items that satisfy the first membership criteria and the second membership criteria, the fourth selected data items may be data items that satisfy the first membership criteria and do not satisfy the second membership criteria, the fifth selected data items may be data items that do not satisfy the first membership criteria and do satisfy the second membership criteria, and the sixth selected data items may be data items that do not satisfy the first membership criteria and do not satisfy the second membership criteria.

In block 228, the data analysis system 100 sends the one or more third selected data items to the client computer for constructing a third filter view in the first graphically demarcated area (e.g., the one or more third selected data items are configured to be viewed in the third filter view). For example, the third filter view may be a histogram filter view that displays the number of homes and the sale value for those homes in a region specified by the first membership criteria and that are of a type specified by the second membership criteria. In alternative embodiments, zero data items may be returned when the second filter chain is applied to the data set.

In block 230, the data analysis system 100 sends the one or more fourth selected data items to the client computer for constructing a fourth filter view in the first graphically demarcated area (e.g., the one or more fourth selected data items are configured to be viewed in the fourth filter view). For example, the fourth filter view may be a histogram filter view that displays the number of homes and the sale value for those homes in a region specified by the first membership criteria and that are not of a type specified by the second membership criteria. In alternative embodiments, zero data items may be returned when the second filter chain is applied to the data set.

In block 232, the data analysis system 100 sends the one or more fifth selected data items to the client computer for constructing a fifth filter view in the second graphically demarcated area (e.g., the one or more fifth selected data items are configured to be viewed in the fifth filter view). For example, the fifth filter view may be a histogram filter view that displays the number of homes and the sale value for those homes that are not in a region specified by the first membership criteria and that are of a type specified by the second membership criteria. In alternative embodiments, zero data items may be returned when the second filter chain is applied to the data set.

In block 234, the data analysis system 100 sends the one or more sixth selected data items to the client computer for constructing a sixth filter view in the second graphically demarcated area (e.g., the one or more sixth selected data items are configured to be viewed in the sixth filter view).

For example, the sixth filter view may be a histogram filter view that displays the number of homes and the sale value for those homes that are not in a region specified by the first membership criteria and that are not of a type specified by the second membership criteria. In alternative embodiments, zero data items may be returned when the second filter chain is applied to the data set.

Figure 2C:
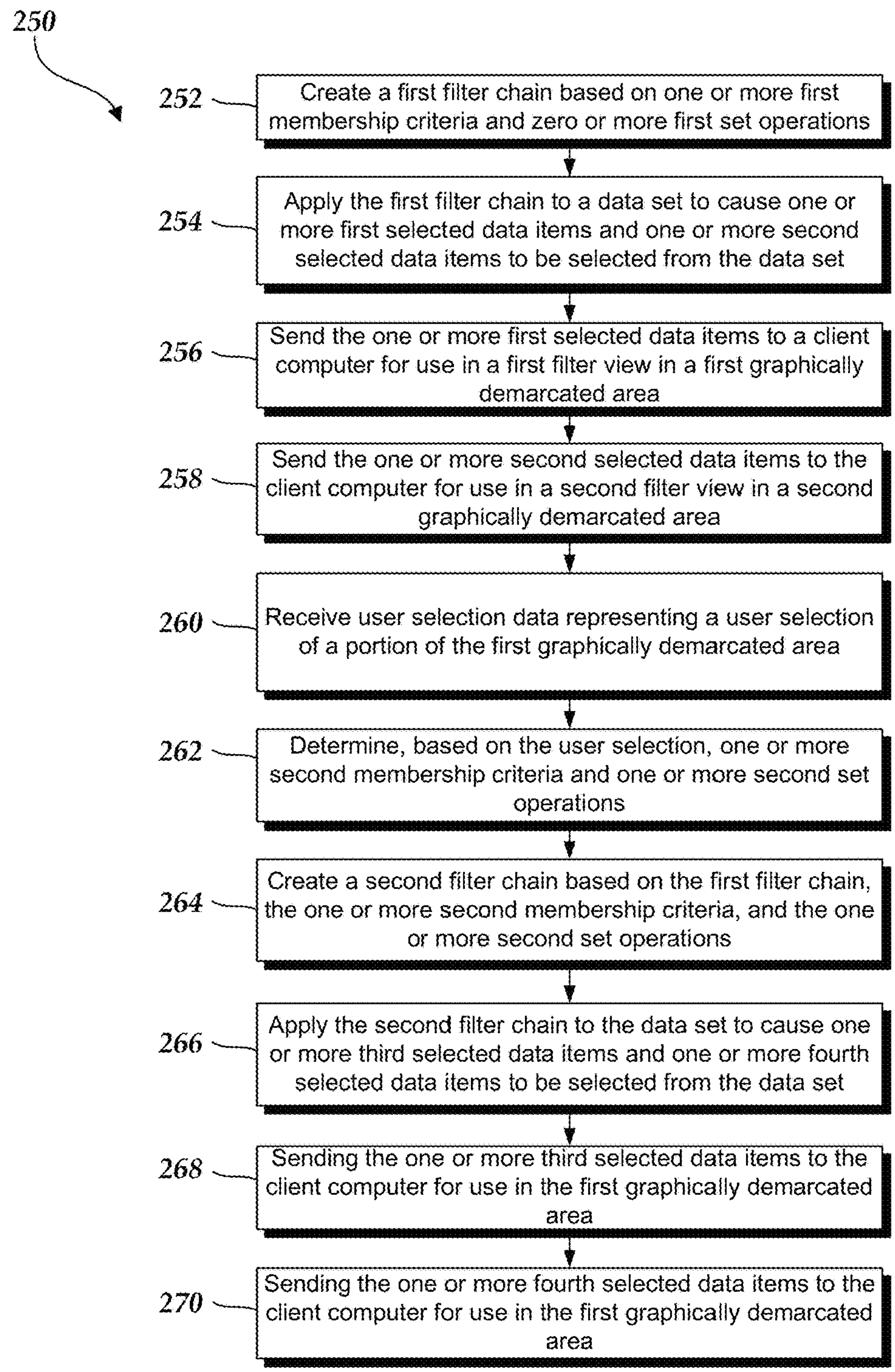
FIG. 2C illustrates another example process flow for analyzing a data set.

FIG. 2C illustrates another example process flow for analyzing a data set. In block 252, the data analysis system 100 creates a first filter chain based on one or more first membership criteria and zero or more first set operations. For example, the first filter chain may be retrieved from the data repository 112 in which the first filter chain has been previously defined and saved, or may be determined based on user input.

In block 254, the data analysis system 100 applies the first filter chain to a data set to cause one or more first selected data items to be selected from the data set and one or more second selected data items to be selected from the data set. For example, the first selected data items may be data items that satisfy the first membership criteria and the second selected data items may be data items that do not satisfy the first membership criteria. The first filter chain may be a histogram filter that selects all data items in a data set that satisfy the first membership criteria. In alternative embodiments, zero data items may be returned when the first filter chain is applied to the data set.

In block 256, the data analysis system 100 sends the one or more first selected data items to a client computer for constructing a first filter view in a first graphically demarcated area (e.g., the one or more first selected data items are configured to be viewed in the first filter view). For example, the first filter view may be a list view filter that displays all homes for sale in a region specified by the first membership criteria. The first graphically demarcated area may be a content pane that is separate and apart from a list, table, or tree view that presents a scrollable listing of all inventory.

In block 258, the data analysis system 100 sends the one or more second selected data items to a client computer for constructing a second filter view in a second graphically demarcated area (e.g., the one or more second selected data items are configured to be viewed in the second filter view). For example, the second filter view may be a list view filter that displays all homes for sale in all regions not specified by the first membership criteria. The second graphically demarcated area may be a content pane that is separate and apart from a list, table, or tree view that presents a scrollable listing of all inventory.

In block 260, the data analysis system 100 receives user selection data representing a user selection of a portion of the first graphically demarcated area. For example, the user may select a particular type of home in the list view in the first graphically demarcated area, where the particular type of home represents homes of a particular type of use (e.g., single family, multi family, etc.). In alternative embodiments, the user may additionally or alternatively enter criteria in a suitable input means such as a text field entry. For example, the user may specify in a text field entry the type of home to be selected.

In block 262, the data analysis system 100 determines, based on the user selection, one or more second membership criteria and one or more second set operations. For example, the one or more second membership criteria may comprise a membership criterion that an inventory must be the selected type of home.

In block 264, the data analysis system 100 creates a second filter chain based on the first filter chain, the one or more second membership criteria, and the one or more second set operations. For example, this second filter chain comprises two filter links, with the first filter link selecting all the homes in a particular region and the second filter link selecting only those inventories in the particular region that are of the selected type of home.

In block 266, the data analysis system 100 applies the second filter chain to the data set to cause one or more third selected data items and one or more fourth selected data items to be selected from the data set. For example, the third selected data items may be data items that satisfy the first membership criteria and the second membership criteria and the fourth selected data items may be data items that satisfy the first membership criteria and do not satisfy the second membership criteria.

In block 268, the data analysis system 100 sends the one or more third selected data items to the client computer for constructing a third filter view in the first graphically demarcated area (e.g., the one or more third selected data items are configured to be viewed in the third filter view). For example, the third filter view may be a histogram filter view that displays the number of homes and the sale value for those homes in a region specified by the first membership criteria and that are of a type specified by the second membership criteria. In alternative embodiments, zero data items may be returned when the second filter chain is applied to the data set.

In block 270, the data analysis system 100 sends the one or more fourth selected data items to the client computer for constructing a fourth filter view in the first graphically demarcated area (e.g., the one or more fourth selected data items are configured to be viewed in the fourth filter view). For example, the fourth filter view may be a histogram filter view that displays the number of homes and the sale value for those homes in a region specified by the first membership criteria and that are not of a type specified by the second membership criteria. In alternative embodiments, zero data items may be returned when the second filter chain is applied to the data set.

In this way, the second filter chain can be applied to the first graphically demarcated area and not the second graphically demarcated area such that the first graphically demarcated includes filter views that are more refined than the filter views included in the second graphically demarcated area.

Object Centric Data Model

To provide a framework for the following discussion of specific systems and methods described herein, an example database system 310 using an ontology 305 will now be described. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 305. The conceptual data model is independent of any particular database used for durably storing one or more database(s) 309 based on the ontology 305. For example, each object of the conceptual data model may correspond to one or more rows in a relational database or an entry in Lightweight Directory Access Protocol (LDAP) database, or any combination of one or more databases.

Figure 3:
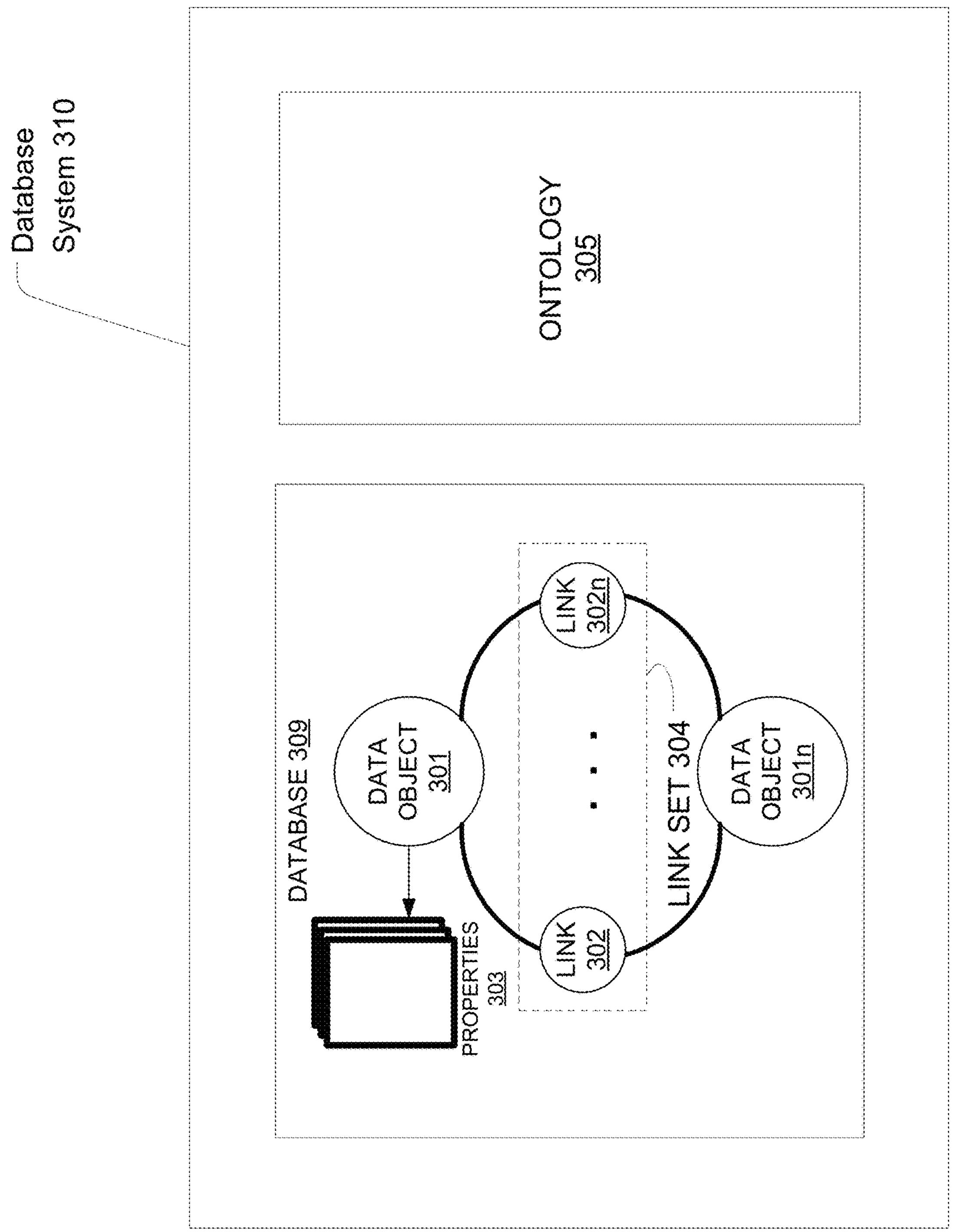
FIG. 3 illustrates one embodiment of a database system using an ontology.

FIG. 3 illustrates an object-centric conceptual data model according to an embodiment. An ontology 305, as noted above, may include stored information providing a data model for storage of data in the database 309. The ontology 305 may be defined by one or more object types, which may each be associated with one or more property types. At the highest level of abstraction, data object 301 is a container for information representing things in the world. For example, data object 301 can represent an entity such as a person, a place, an organization, a market instrument, an inventory, or other noun. Data object 301 can represent an event that happens at a point in time or for a duration. Data object 301 can represent a document or other unstructured data source such as an e-mail message, a news report, or a written paper or article. Each data object 301 is associated with a unique identifier that uniquely identifies the data object within the database system.

Different types of data objects may have different property types. For example, a "Person" data object might have an "Eye Color" property type and an "Event" data object might have a "Date" property type. Each property 303 as represented by data in the database system 310 may have a property type defined by the ontology 305 used by the database 305.

Objects may be instantiated in the database 309 in accordance with the corresponding object definition for the particular object in the ontology 305. For example, a specific monetary payment (e.g., an object of type "event") of US$30.00 (e.g., a property of type "currency") taking place on Mar. 27, 2009 (e.g., a property of type "date") may be stored in the database 309 as an event object with associated currency and date properties as defined within the ontology 305.

The data objects defined in the ontology 305 may support property multiplicity. In particular, a data object 301 may be allowed to have more than one property 303 of the same property type. For example, a "Person" data object might have multiple "Address" properties or multiple "Name" properties.

Each link 302 represents a connection between two data objects 301. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 301 can have multiple links with another data object 301 to form a link set 304. For example, two "Person" data objects representing a husband and a wife could be linked through a "Spouse Of" relationship, a matching "Address" property, and one or more matching "Event" properties (e.g., a wedding). Each link 302 as represented by data in a database may have a link type defined by the database ontology used by the database.

Figure 4:
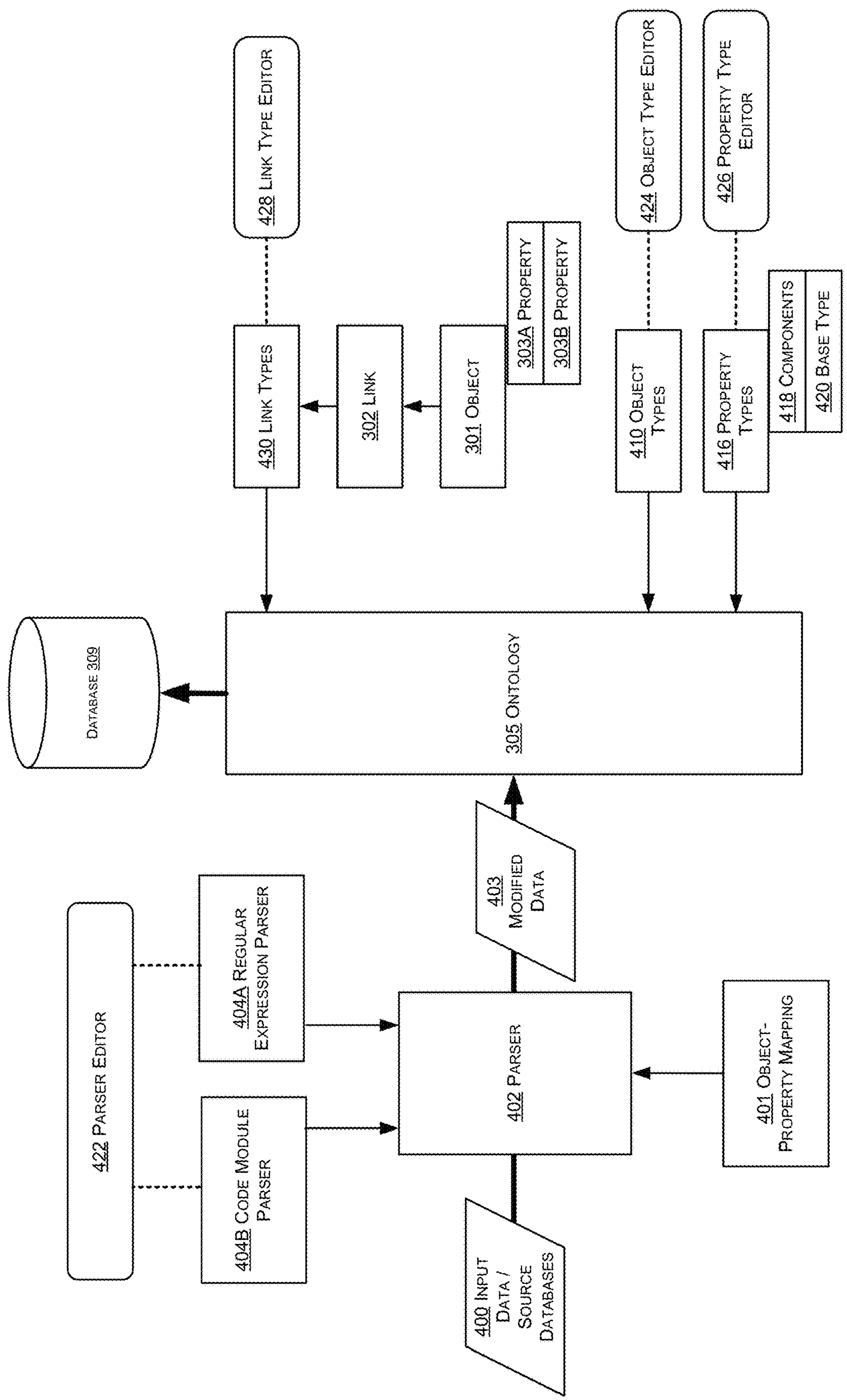
FIG. 4 illustrates one embodiment of a system for creating data in a data store using a dynamic ontology.

FIG. 4 is a block diagram illustrating exemplary components and data that may be used in identifying and storing data according to an ontology. In this example, the ontology may be configured, and data in the data model populated, by a system of parsers and ontology configuration tools. In the embodiment of FIG. 4, input data 400 is provided to parser 402. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 402 is able to read a variety of source input data types and determine which type of data it is reading.

In accordance with the discussion above, the example ontology 305 comprises stored information providing the data model of data stored in database 309, and the ontology is defined by one or more object types 410, one or more property types 416, and one or more link types 430. Based on information determined by the parser 402 or other mapping of source input information to object type, one or more data objects 301 may be instantiated in the database 309 based on respective determined object types 410, and each of the objects 301 has one or more properties 303 that are instantiated based on property types 416. Two data objects 301 may be connected by one or more links 302 that may be instantiated based on link types 430. The property types 416 each may comprise one or more data types 418, such as a string, number, etc. Property types 416 may be instantiated based on a base property type 420. For example, a base property type 420 may be "Locations" and a property type 416 may be "Home."

In an embodiment, a user of the system uses an object type editor 424 to create and/or modify the object types 410 and define attributes of the object types. In an embodiment, a user of the system uses a property type editor 426 to create and/or modify the property types 416 and define attributes of the property types. In an embodiment, a user of the system uses link type editor 428 to create the link types 430. Alternatively, other programs, processes, or programmatic controls may be used to create link types and property types and define attributes, and using editors is not required.

In an embodiment, creating a property type 416 using the property type editor 426 involves defining at least one parser definition using a parser editor 422. A parser definition comprises metadata that informs parser 402 how to parse input data 400 to determine whether values in the input data can be assigned to the property type 416 that is associated with the parser definition. In an embodiment, each parser definition may comprise a regular expression parser 404A or a code module parser 404B. In other embodiments, other kinds of parser definitions may be provided using scripts or other programmatic elements. Once defined, both a regular expression parser 404A and a code module parser 404B can provide input to parser 402 to control parsing of input data 400.

Using the data types defined in the ontology, input data 400 may be parsed by the parser 402 determine which object type 410 should receive data from a record created from the input data, and which property types 416 should be assigned to data from individual field values in the input data. Based on the object-property mapping 401, the parser 402 selects one of the parser definitions that is associated with a property type in the input data. The parser parses an input data field using the selected parser definition, resulting in creating new or modified data 403. The new or modified data 403 is added to the database 309 according to ontology 305 by storing values of the new or modified data in a property of the specified property type. As a result, input data 400 having varying format or syntax can be created in database 309. The ontology 305 may be modified at any time using object type editor 424, property type editor 426, and link type editor 428, or under program control without human use of an editor. Parser editor 422 enables creating multiple parser definitions that can successfully parse input data 400 having varying format or syntax and determine which property types should be used to transform input data 400 into new or modified input data 403.

The properties, objects, and the links (e.g. relationships) between the objects can be visualized using a graphical user interface (GUI). In an embodiment, a user interface that allows for searching, inspecting, filtering, and/or statistically aggregating data in a multipath format is illustrated and described below with respect to FIGS. 5A through 12-4B.

Multipath Explorer Creation

A multipath explorer can provide an interface that allows a user to apply one or more filters to a data set and visually identify data that satisfies the one or more filters and data that does not satisfy one or more of the filters. For example, a user can apply a first filter to a data set and the multipath explorer displays data in the data set that satisfies the first filter. The multipath explorer can also display data in the data set that does not satisfy the first filter (e.g., in a different view of window). As additional filters are applied by the user, the multipath explorer can display additional views or windows that show data that satisfy all of the filters, some of the filters, and/or none of the filters. In this way, the multipath explorer can display all combinations of data that do and do not satisfy the filters applied by the user. In other words, the multipath explorer allows a user to immediately visualize an entire population, one or more subsets of the entire population, and one or more endpoints of an analysis of subsets of the entire population. FIGS. 5A-7 illustrate how the different paths displayed by the multipath explorer can be generated.

Figure 5A:
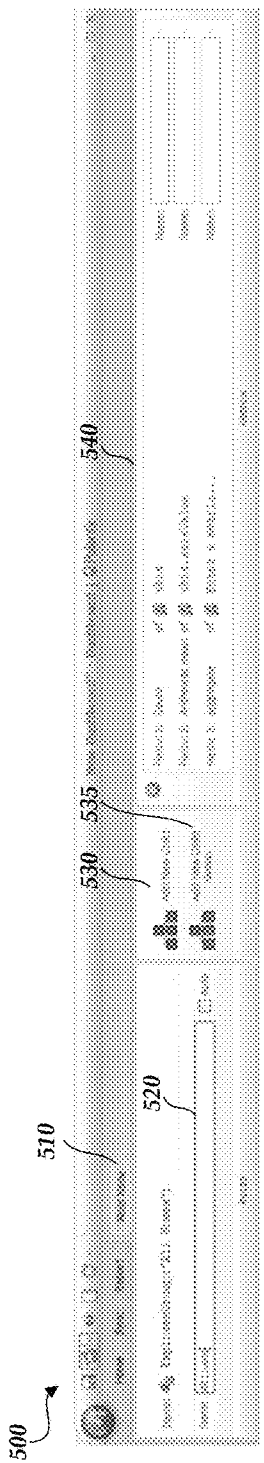
FIG. 5A illustrates a toolbar that allows a user to create a root node of a multipath view.

FIG. 5A illustrates an example toolbar 500 that allows a user to create a root node of a multipath view. In an embodiment, the multipath view may be illustrated in a tree structure. In another embodiment, the multipath view may be illustrated in a DAG structure. As illustrated in FIG. 5A, the toolbar 500 (also referred to as a dashboard) includes a tab 510. The tab 510 includes buttons, text fields, and/or other options that allow a user to create a root node (e.g., add new child button 530, add new child group button 535, and metrics group 540). The root node may represent all inventory in a data set. For example, the inventory may comprise all homes that currently have pending loans and a title of the root node may be "All Loans," as illustrated in text field 520.

Figure 5B:
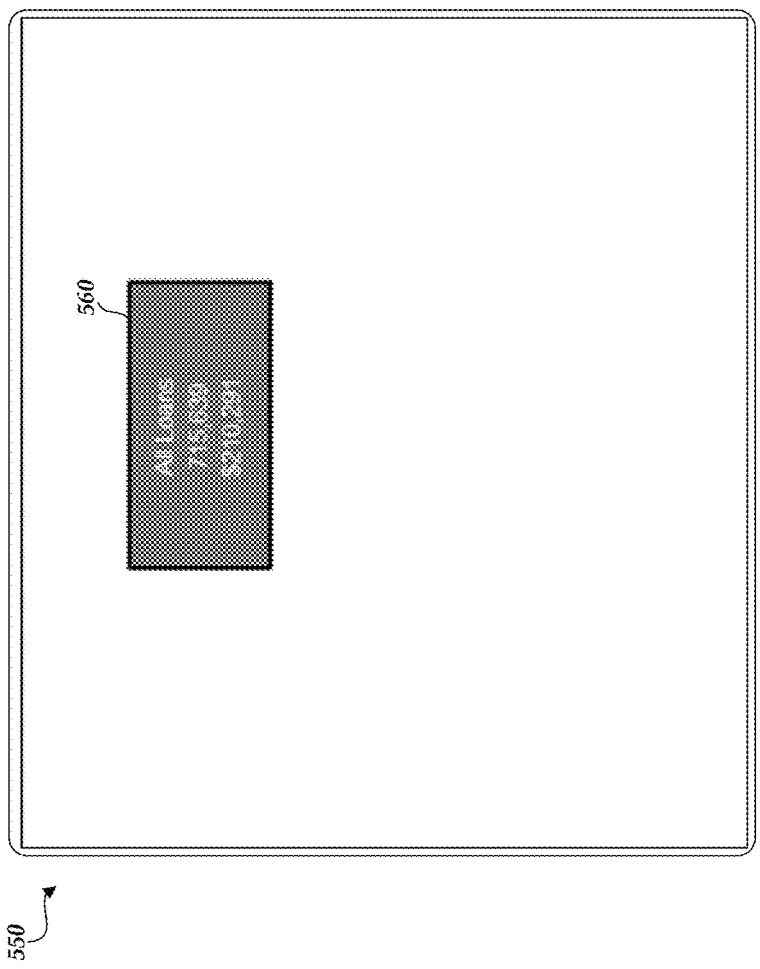
FIG. 5B illustrates a widget that displays a created root node.

FIG. 5B illustrates an example widget 550 that displays a created root node 560. In the example of FIG. 5B, the root node 560 is represented as a rectangular box and includes the title of the root node (e.g., "All Loans"), the number of inventory in the data set (e.g., 715,639 homes), and/or a metric or attribute associated with the inventory (e.g., an average or median value of the pending loans, etc.). While the root node 560 is illustrated in the shape of a rectangular box, this is not meant to be limiting as the root node 560 may be illustrated in any shape or form.

Figure 6A:
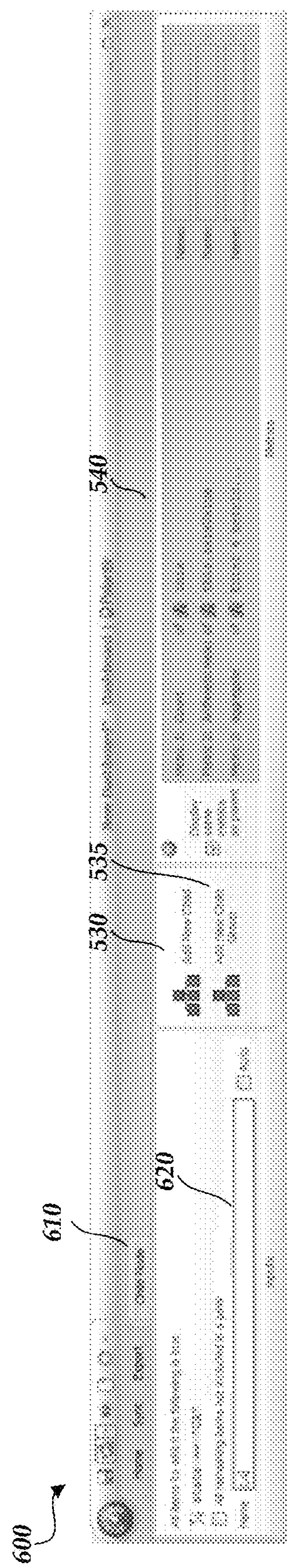
FIG. 6A illustrates a toolbar that allows a user to create a child node of a multipath view.

FIG. 6A illustrates an example toolbar 600 that allows a user to create a child node of a multipath view. As illustrated in FIG. 6A, the toolbar 600 (also referred to as a dashboard) includes a tab 610. The tab 610 includes buttons, text fields, and/or other options that allow a user to create a child node (e.g., add new child button 530, add new child group button 535, and metrics group 540). In an embodiment, the child node represents all inventory in a data set that corresponds to a membership criteria. For example, the inventory may comprise all homes that currently have pending loans and a membership criteria may be that the homes must be in California. In an alternative embodiment, the child node represents all inventory in a data set that does not correspond to a membership criteria. For example, the inventory may comprise all homes that currently have pending loans and the membership criteria may be that the homes cannot be in California. The membership criteria may be selected and/or entered in a text field, and name of the child node may be provided in text field 620.

In an embodiment, the child node inherits the metrics or attributes of its parent node. Alternatively or in addition, other metrics or attributes may be specified in metrics group 540.

In an embodiment, the add new child button 530 adds a new child node to a parent node selected by the user. The new child node includes the criteria set forth by the user in the tab 610. For example, the new child node may specify additional membership criteria to be applied to the data included in the parent node. In this way, a parent node may include one or more child nodes, whereas sibling nodes of the parent node may not include any child nodes.

In an embodiment, the add new child group button 535 adds a new child node to a parent node selected by the user and one or more sibling nodes of the parent node. For example, the new child node may specify additional membership criteria to be applied to the data included in the parent node and the data included in the sibling nodes of the parent node. In this way, a parent node and sibling nodes of the parent node may each include one or more child nodes (e.g., the parent node and the sibling nodes of the parent node may each include the same number of child nodes with the same membership criteria).

In another embodiment, the add new child group button 535 adds some or all of the possible results of a criteria as new child nodes to a parent node. For example, a parent node can include a data set that comprises a group of loans for homes. When the add new child group button 535 is selected, the membership criteria "homeType" may be entered, and a new child node may be added to the parent node for each unique value of "homeType" for all of the homes in the parent node.

In a further embodiment, the tab 610 includes an add new sibling button, not shown. The add new sibling button may add a sibling node to a parent node selected by the user. For example, the sibling node may specify the same membership criteria as the parent node.

In a further embodiment, the tab 610 include an add new parent button, not shown. The add new parent button may create a parent node (or a child node) based on one or more child nodes selected by the user. For example, a first child node may include a first data set and a second child node may include a second data set. The add new parent button may, when selected, create a parent node (or a child node) based on the first child node and the second child node. The parent node (or child node) may include a master data set, where the master data set is based on at least one common attribute of the first data set and the second data set (e.g. one common data type or property, such as the two nodes both being a collection of "house" object types). The creation of a new node based on at least one common attribute of a first data set and a second data set may be displayed in a manner as illustrated in FIGS. 13E-F, which are described in greater detail below. In some embodiments, the one or more child nodes used to create the parent node (or the child node) share another parent node. In other embodiments, the one or more child nodes used to create the parent node (or the child node) do not share any other parent node. If one or more child nodes are used to create a child node, the one or more child nodes may be considered parent nodes of the created child node.

In a further embodiment, the tab 610 includes a transform object type button, not shown. The transform object type button may, when selected, transform a data set from a first object type to a second object type. For example, a data set may include homes having a default mortgage and a result of a node may be documents (e.g., the mortgages). The data set may be transformed into new objects, such as real estate agents associated with those homes, so that a result of the node is now a person (e.g., the real estate agents). Additional child nodes may then be created based on the real estate agent data set (e.g., by requesting the names of real estate agents that appear three or more times). Such a transformation may be displayed in a manner as illustrated in FIGS. 13H-G, which are described in greater detail below.

Figure 6B:
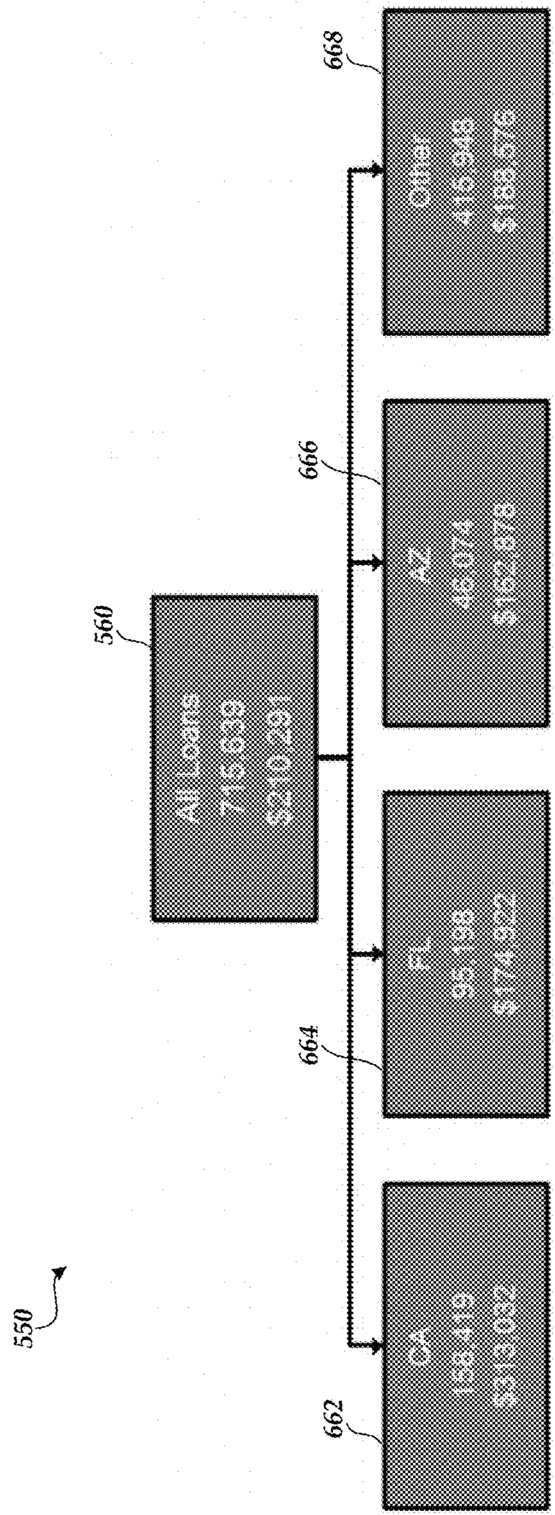
FIG. 6B illustrates the widget that displays the created root node and created child nodes.

FIG. 6B illustrates the widget 550 that displays the created root node 560 and created child nodes 662, 664, 666, and 668. As illustrated in FIG. 6B, like the root node 560, the child nodes 662, 664, 666, and 668 are represented as rectangular boxes and include the title of the child node (e.g., "CA," "FL," "AZ," and "Other"), the number of inventory in the data set (e.g., 158,419 homes, 95,198 homes, 46,074 homes, and 415,948 homes), and/or a metric or attribute associated with the inventory (e.g., an average or median value of the pending loans, etc.). While the child nodes 662, 664, 666, and 668 are illustrated in the shape of a rectangular box, this is not meant to be limiting as the child nodes 662, 664, 666, and 668 may be illustrated in any shape or form.

In an embodiment, the child nodes 662, 664, 666, and 668 are created by selecting the root node 560 and the add new child button 530 or the add new child group button 535. For example, the membership criteria specified for the child node may be homes in California, Florida, and Arizona. Thus, child nodes 662, 664, and 666 may be created for each value (e.g., California, Florida, and Arizona) and display the data that satisfies the membership criteria. The child node 668 may be created to illustrate the data that does not satisfy the membership criteria. In some embodiments, the data that does not satisfy the membership criteria may be identified by identifying all items from the parent node that are not included in the other child nodes. In other embodiments, the data that does not satisfy the membership criteria may be identified by identifying all items from the parent node that are not included in the other child nodes and that are above or below a certain percentage.

In an embodiment, the root node 560 and/or the child nodes 662, 664, 666, and/or 668 auto arrange, auto size and/or auto shape such that all nodes can fit in the widget 550. In a further embodiment, the user can adjust the background color, the font, the font size, the font color, the alignment, and/or the border of the root node 560 and/or the child nodes 662, 664, 666, and/or 668. In a further embodiment, the user can copy, drag (e.g., to change order or location), resize, and/or rotate the root node 560 and/or the child nodes 662, 664, 666, and/or 668. In a further embodiment, the user can select the root node 560 and/or the child nodes 662, 664, 666, and/or 668 to view additional information (e.g., data associated with the root node and/or child node displayed in a list, in a graph, etc.).

Figure 7:
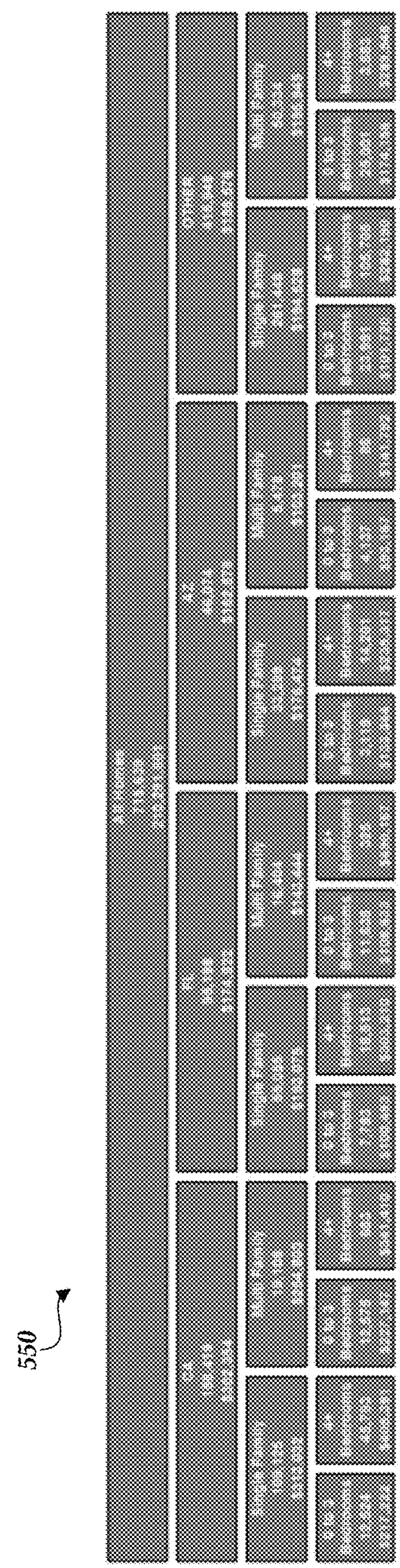
FIG. 7 illustrates the widget that displays a root node and a series of child nodes in a tree structure.

FIG. 7 illustrates the widget 550 that displays a root node and a series of child nodes in a tree structure. As illustrated in FIG. 7, each parent node includes child nodes with the same membership criteria as the parent node's sibling nodes (e.g., the parent nodes titled "CA," "FL," "AZ," and "Other" each include child nodes titled "Single Family," which represent data that does satisfy a specified membership criteria). In addition, each parent node and each of the parent node's sibling nodes include child nodes that do not satisfy the membership criteria at a particular level in the tree structure (e.g., the parent nodes titled "CA," "FL," "AZ," and "Other" each include child nodes titled "Multi Family," which represent data that does not satisfy the membership criteria specified by the "Single Family" child nodes). While the parent nodes and child nodes are illustrated in the shape of a rectangular box, this is not meant to be limiting as the parent nodes and child nodes may be illustrated in any shape or form.

In an embodiment, the widget 550 provides functionality such that the user can save a filtered or defiltered data set (e.g., a parent-child node chain or a root node) as a new object series. The user may be able to title the new object series. The new object series may be shared with other users, or restricted from other users viewing. The new object series may also be used in later analysis or filtering. For example, the new object series may be applied to the same data set at a later time (e.g., after the data set has been updated). As another example, the new object series may be applied to a different data set. When applying the new object series to the different data set, root nodes, parent nodes, and/or child nodes may be created and be formed in the same or similar tree structure as the root nodes, parent nodes, and/or child nodes of the saved data set.

In an embodiment (not shown), a parent node can include child nodes that are not included in the parent node's sibling nodes. For example, the "CA" parent node may include the "Single Family" and the "Multi Family" child nodes, whereas the "FL," "AZ," and/or "Other" parent nodes may not include the "Single Family" and the "Multi Family" child nodes.

In an embodiment (not shown), filter chains (e.g., a parent-child node chain) are color coded. The filter chains may be color coded based on a metric or attribute (e.g., magnitude, name, value, etc.) determined by the user. For example, if the output of nodes are numbers (e.g., home loan values), then filter chains that include nodes with loan values in a high range may appear red and filter chains that include nodes with loan values in a low range may appear blue.

The widget 550 as illustrated in FIG. 7 allows a user to immediately visualize an entire population, one or more subsets of the entire population, and one or more endpoints of an analysis of subsets of the entire population.

Multipath Explorer Graphical User Interface

Figure 8:
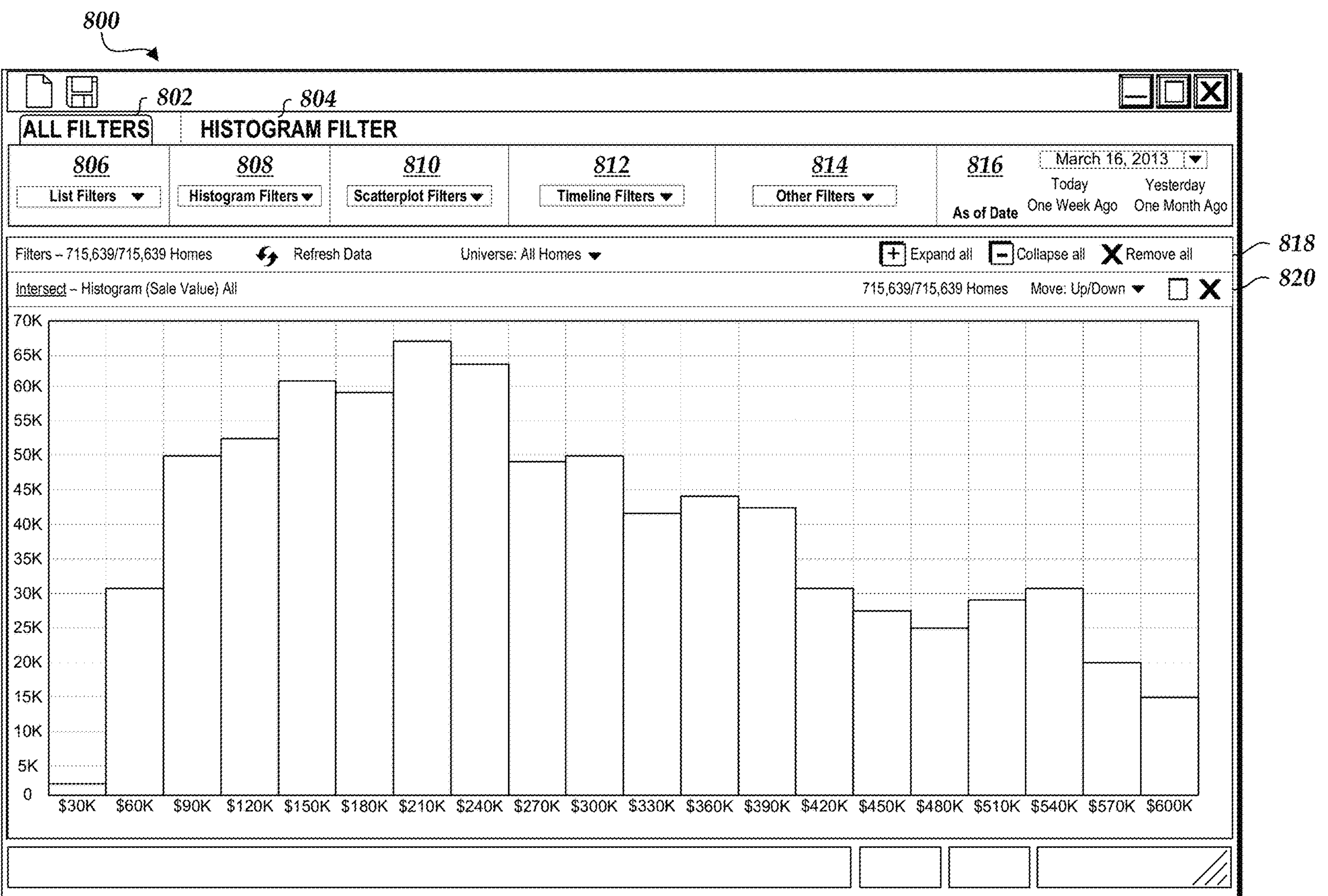
FIG. 8 illustrates an example graphical user interface (GUI) for a multipath explorer.

FIG. 8 illustrates an example graphical user interface (GUI) 800 for a multipath explorer. As illustrated in FIG. 8, the GUI 800 includes an all filters tab 802 and a histogram filter tab 804. While the GUI 800 includes the all filters tab 802 and the histogram filter tab 804, this is not meant to be limiting as the GUI 800 may include fewer or additional tabs, such as tabs associated with each of the filters discussed below.

In an embodiment, the all filters tab 802 is selected by the user and includes list filters group 806, histogram filters group 808, scatterplot filters group 810, timeline filters group 812, other filters group 814, and date group 816. The list filters group 806 includes list filters that can be applied to a data set. For example, list filters may include filters that display data in the data set in a list form. The histogram filters group 808 includes histogram filters that can be applied to a data set. For example, the histogram filters may include filters that display data in the data set in a graphical (e.g., bar graph, line graph, etc.) form. The scatterplot filters group 810 includes scatterplot filters that can be applied to a data set. For example, the scatterplot filters may include filters that display data in the data set in a scatterplot form. The timeline filters group 812 includes timeline filters that can be applied to a data set. For example, the timeline filters may include filters that display data in the data set in a timeline. The other filters group 814 include filters other than the filters described above that can be applied to a data set. The date group 816 includes options that can display data in the data set that correspond to a range of dates, a particular date, and/or the like.

As illustrated in FIG. 8, the GUI 800 includes a content pane 818 and a content pane 820. In an embodiment, the inventory includes homes with currently pending loans. Content pane 818 includes information related to the inventory, including the total number of homes with currently pending loans. In an embodiment, no filter has been applied to content pane 818 such that content pane 818 includes information on the entire inventory (e.g., the entire population).

In an embodiment, a histogram filter has been applied to the entire inventory. Thus, the content pane 820 displays a histogram for the entire inventory. The histogram includes a loan value on the x-axis and a count on the y-axis (e.g., a number of homes that have a particular loan value).

In an embodiment, the content pane 818 and/or the content pane 820 are embedded in the GUI 800. In another embodiment, the content pane 818 and/or the content pane 820 can open in separate windows within or outside the GUI 800.

Figure 9:
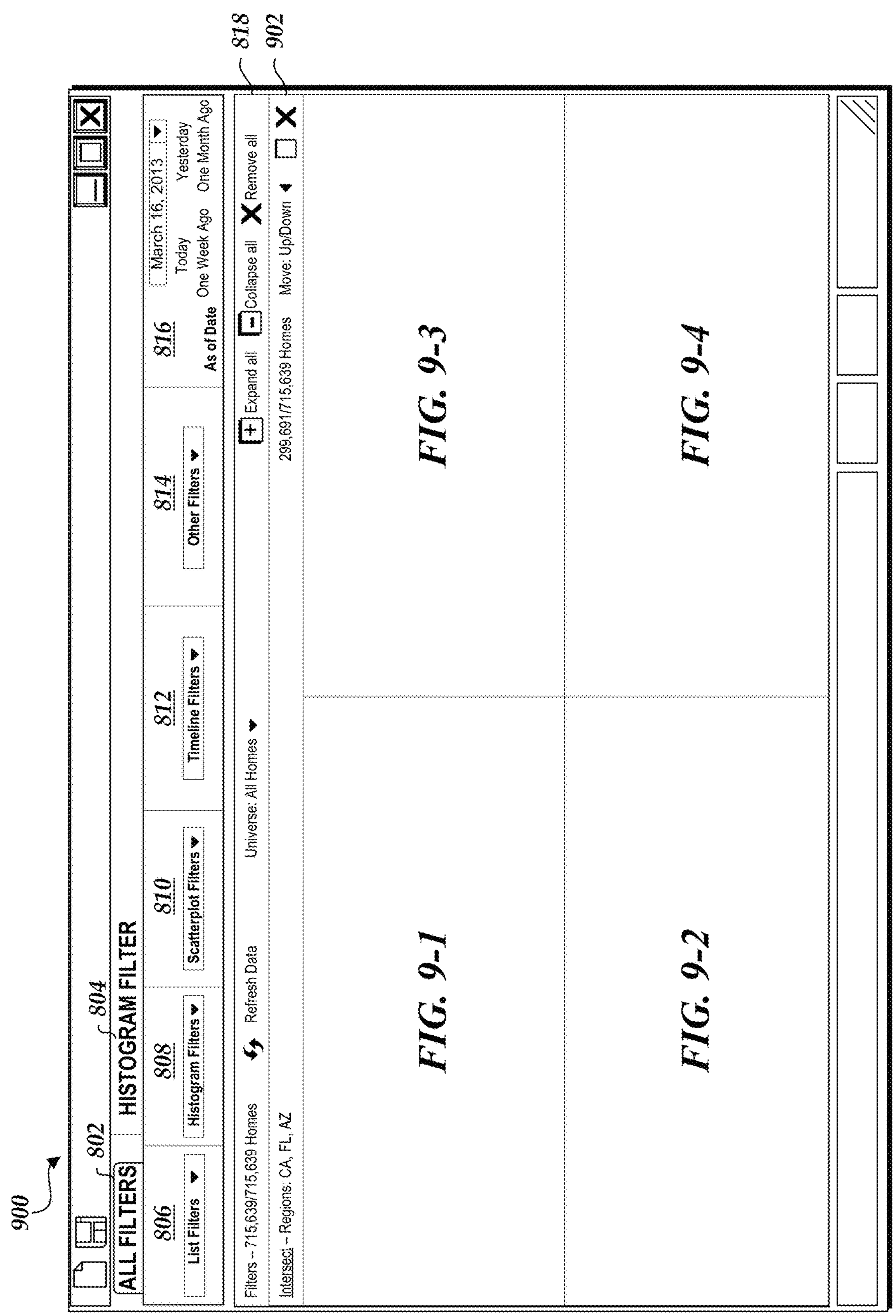
FIG. 9 illustrates another example GUI for a multipath explorer.
Figures 1, 9:
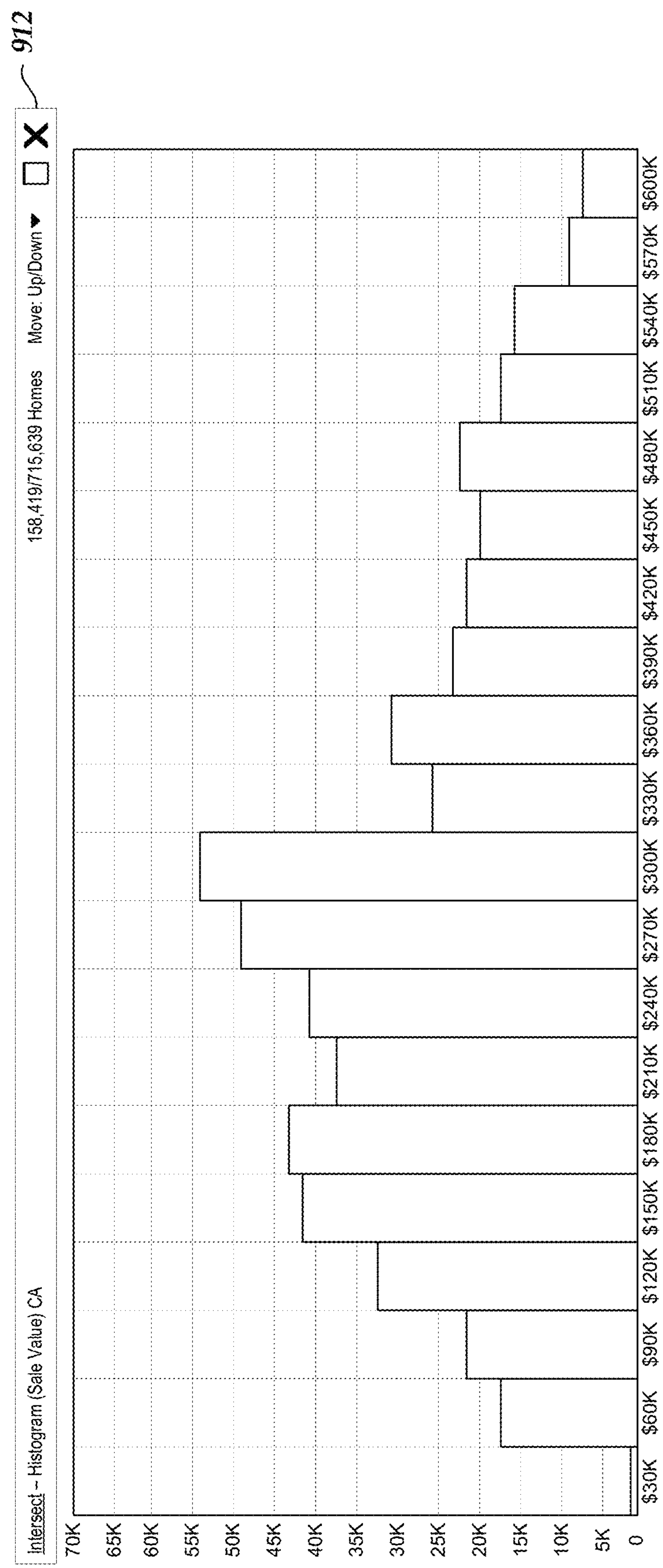

FIG. 9 illustrates another example graphical user interface (GUI) 900 for a multipath explorer. As illustrated in FIG. 9, the GUI 900 includes the all filters tab 802 and the histogram filter tab 804. While the GUI 900 includes the all filters tab 802 and the histogram filter tab 804, this is not meant to be limiting as the GUI 900 may include fewer or additional tabs, such as tabs associated with each of the filters discussed below.

As illustrated in FIG. 9, the GUI 900 includes the content pane 818 and a content pane 902. In an embodiment, the content pane 902 includes a filter that is applied to the entire inventory in content pane 818 such that 299,691 out of 715,639 homes satisfy the membership criteria embodied by the filter. For example, the membership criteria may specify that the homes must be in a particular region (e.g., California, Florida, or Arizona). Based on this membership criteria, four additional content panes may be included in the GUI 900. The first additional content pane is illustrated in FIG. 9-1, the second in FIG. 9-2, the third in FIG. 9-3, and the fourth in FIG. 9-4. The additional content panes may display data that satisfies the membership criteria and data that does not satisfy the membership criteria.

FIG. 9-1 illustrates a content pane 912 included in the GUI 900 of FIG. 9. In an embodiment, the content pane 912 includes a filter that is applied to the data in content pane 902 such that 158,419 out of 715,639 homes satisfy the membership criteria embodied by the filter. For example, the membership criteria may specify that the data is to be displayed in a histogram and that the homes must be in California. Thus, content pane 912 displays data that satisfies the membership criteria originally specified in content pane 902.

Figures 2, 9:
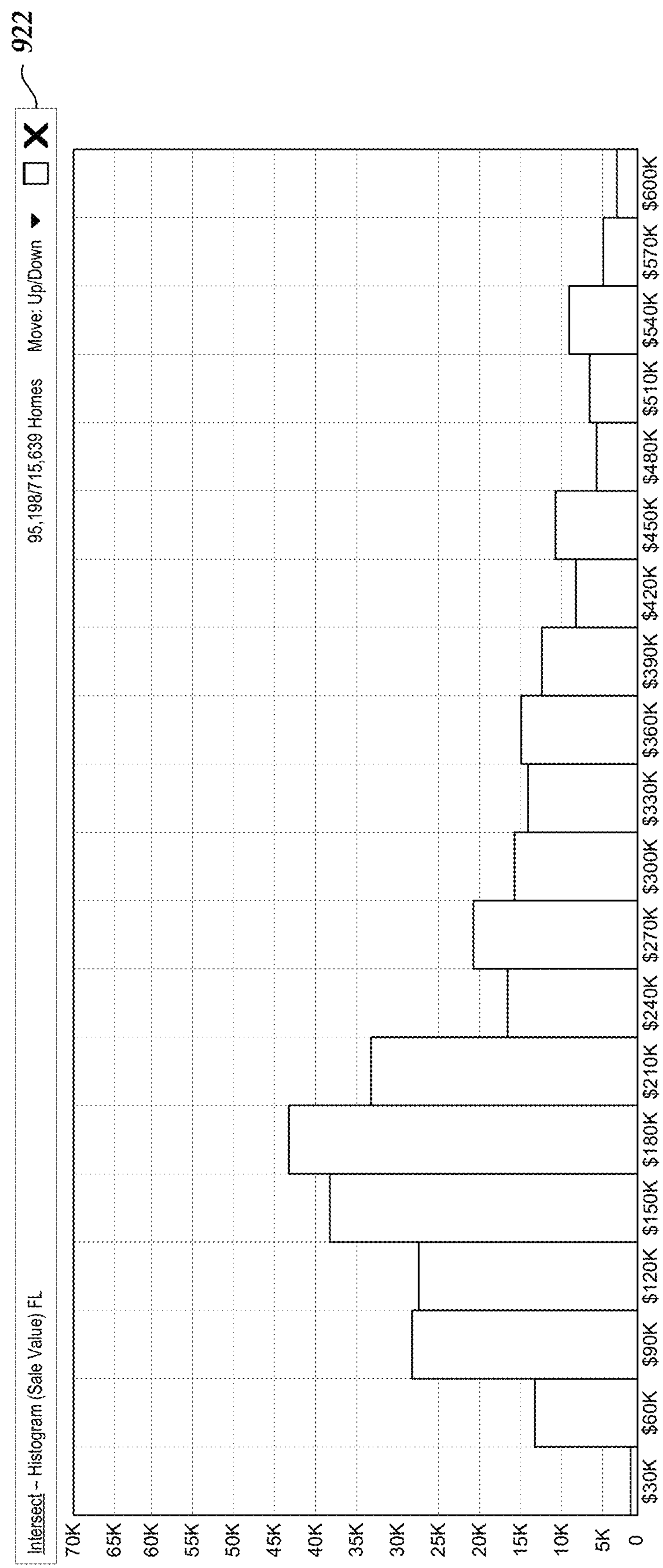
Figures 3, 9:
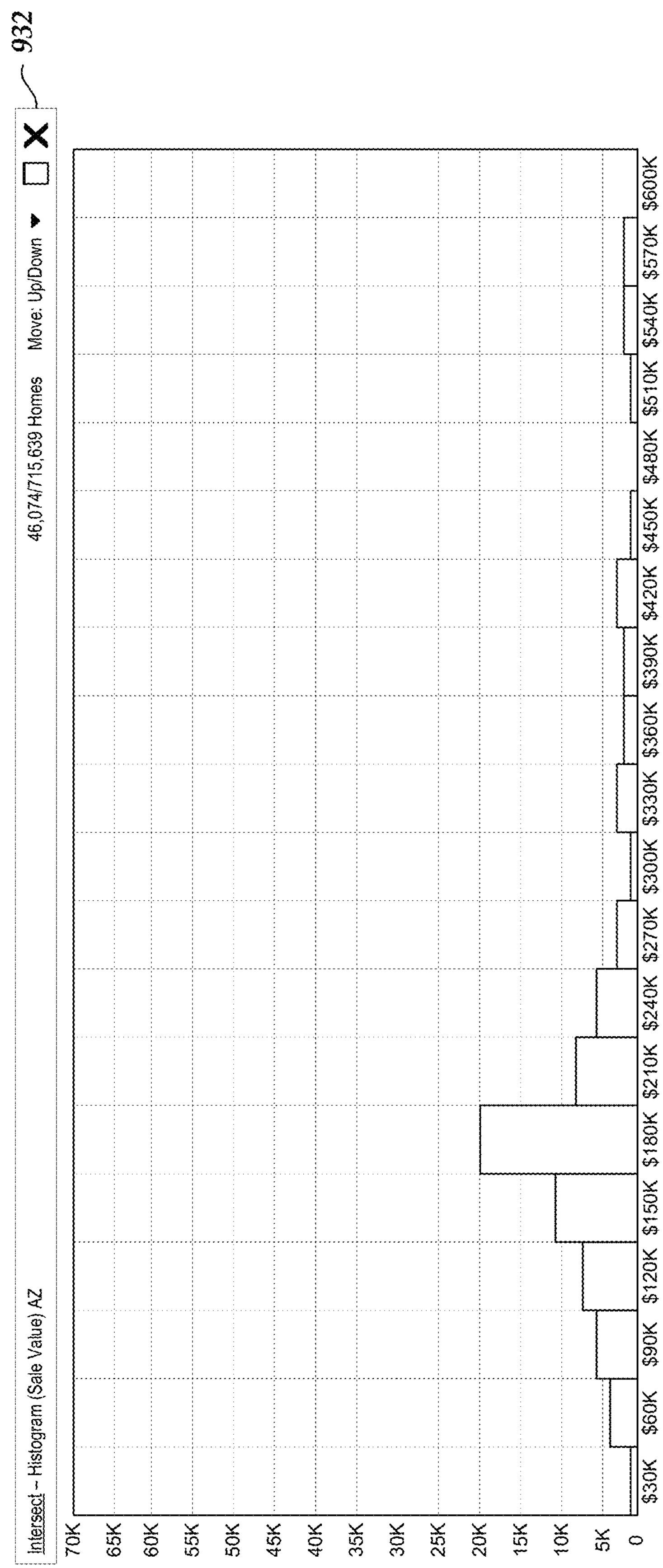
Figures 4, 9:
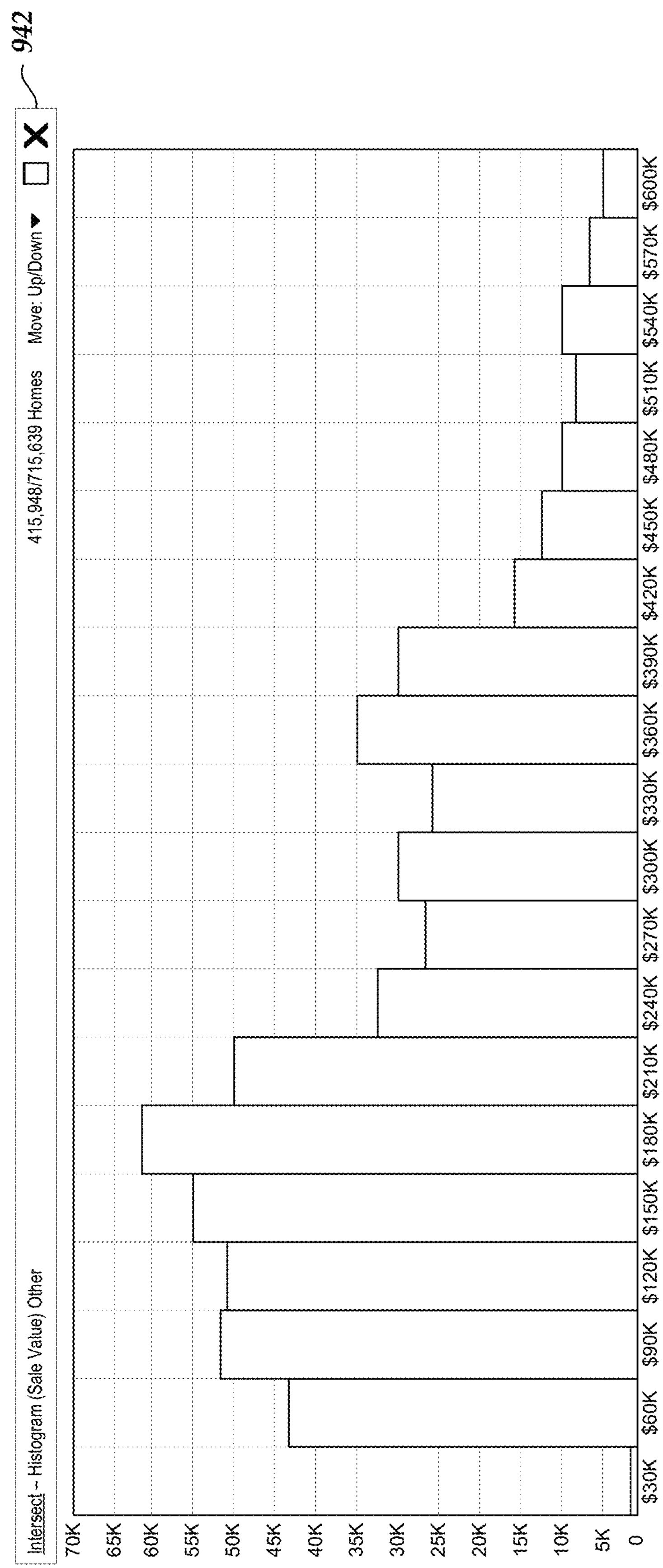

FIG. 9-2 illustrates another content pane 922 included in the GUI 900 of FIG. 9. In an embodiment, the content pane 922 includes a filter that is applied to the data in content pane 902 such that 95,196 out of 715,639 homes satisfy the membership criteria embodied by the filter. For example, the membership criteria may specify that the data is to be displayed in a histogram and that the homes must be in Florida. Thus, content pane 922 displays data that satisfies the membership criteria originally specified in content pane 902.

FIG. 9-3 illustrates another content pane 932 included in the GUI 900 of FIG. 9. In an embodiment, the content pane 932 includes a filter that is applied to the data in content pane 902 such that 46,074 out of 715,639 homes satisfy the membership criteria embodied by the filter. For example, the membership criteria may specify that the data is to be displayed in a histogram and that the homes must be in Arizona. Thus, content pane 932 displays data that satisfies the membership criteria originally specified in content pane 902.

FIG. 9-4 illustrates another content pane 942 included in the GUI 900 of FIG. 9. In an embodiment, the content pane 942 includes a filter that is applied to the data in content pane 902 such that 415,948 out of 715,639 homes are identified as not satisfying the membership criteria embodied by the filter. For example, the membership criteria may specify that the data is to be displayed in a histogram and that the homes must not be in California, Florida, or Arizona (e.g., "Other"). Thus, content pane 942 displays data that does not satisfy the membership criteria originally specified in content pane 902.

Figure 10:
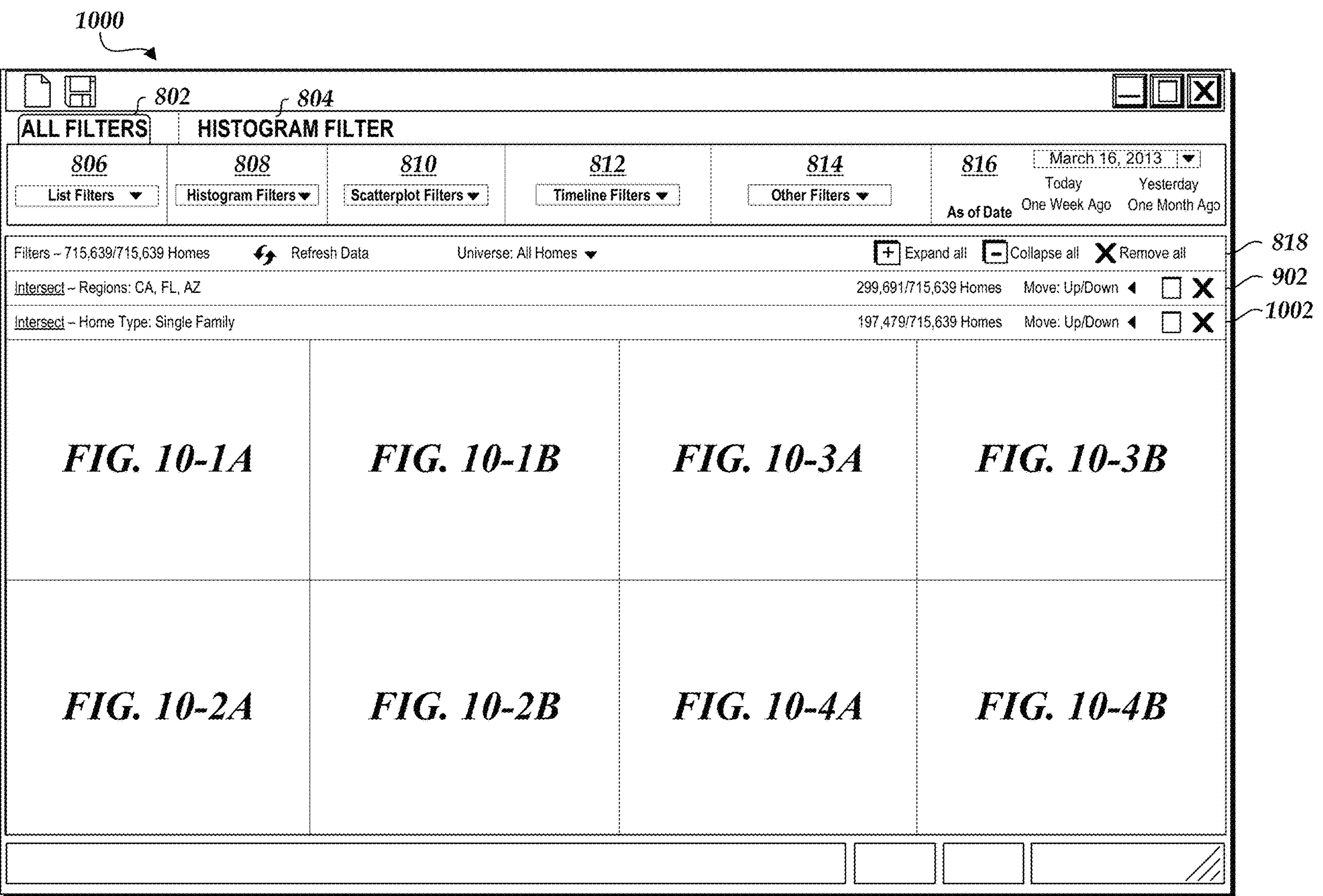
FIG. 10 illustrates another example GUI for a multipath explorer.

FIG. 10 illustrates another example graphical user interface (GUI) 1000 for a multipath explorer. As illustrated in FIG. 10, the GUI 1000 includes the all filters tab 802 and the histogram filter tab 804. While the GUI 1000 includes the all filters tab 802 and the histogram filter tab 804, this is not meant to be limiting as the GUI 1000 may include fewer or additional tabs, such as tabs associated with each of the filters discussed below.

Figures 1A, 10:
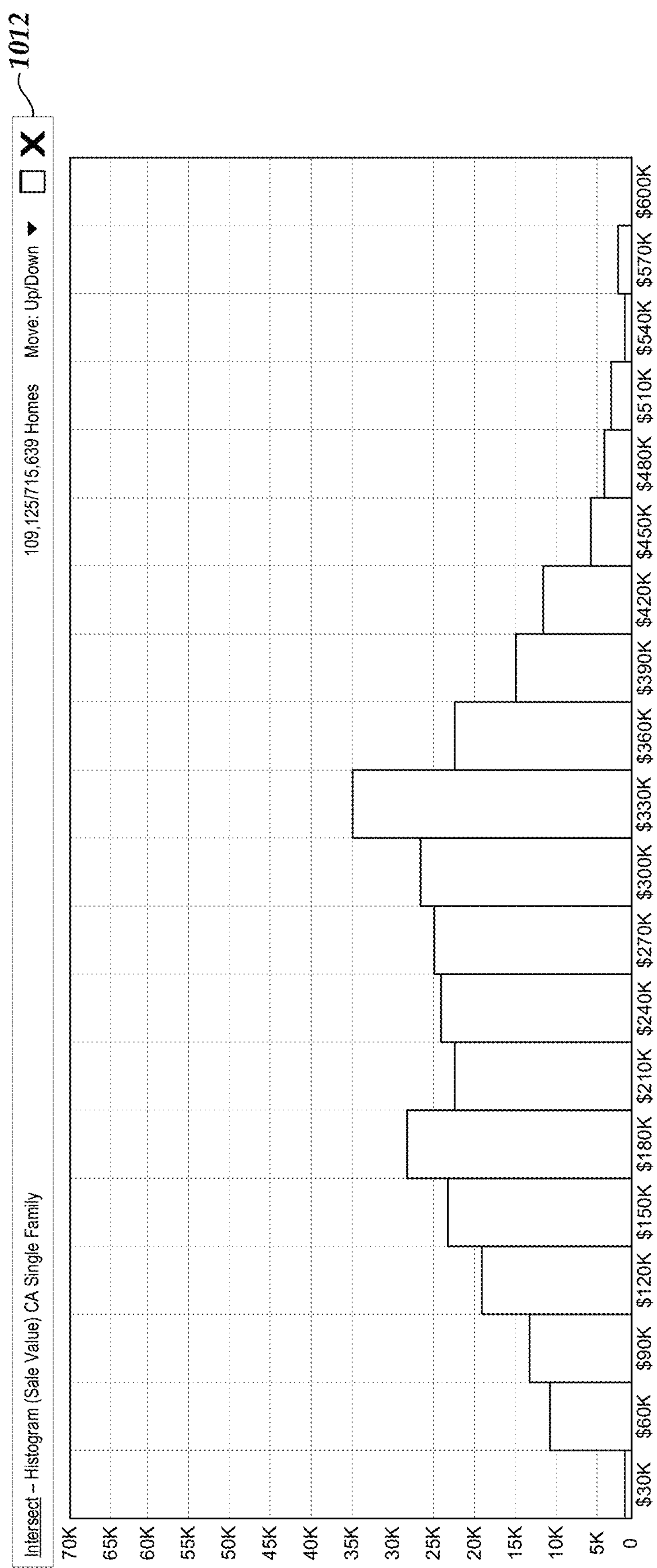

As illustrated in FIG. 10, the GUI 1000 includes the content pane 818, the content pane 902, and a content pane 1002. In an embodiment, the content pane 1002 includes a filter that is applied to the inventory in content pane 902 such that 197,479 out of 715,639 homes satisfy the membership criteria embodied by the filter. For example, the membership criteria may specify that the homes must be of a particular type (e.g., single family homes). Based on this membership criteria, eight additional content panes may be included in the GUI 1000. The first additional content pane is illustrated in FIG. 10-1A, the second in FIG. 10-1B, the third in FIG. 10-2A, the fourth in FIG. 10-2B, the fifth in FIG. 10-3A, the sixth in FIG. 10-3B, the seventh in FIG. 10-4A, and the eight in FIG. 10-4B. The additional content panes may display data that satisfies the membership criteria, data that satisfies some of the membership criteria, and data that does not satisfy the membership criteria.

FIG. 10-1A illustrates a content pane 1012 included in the GUI 1000 of FIG. 10. In an embodiment, the content pane 1012 includes a filter that is applied to the data in content pane 1002 such that 109,125 out of 715,639 homes satisfy the membership criteria embodied by the filter. For example, the membership criteria may specify that the data is to be displayed in a histogram and that the homes must be single family homes in California. Thus, content pane 1012 displays data that satisfies the membership criteria originally specified in content pane 902 and content pane 1002.

Figures 1B, 10:
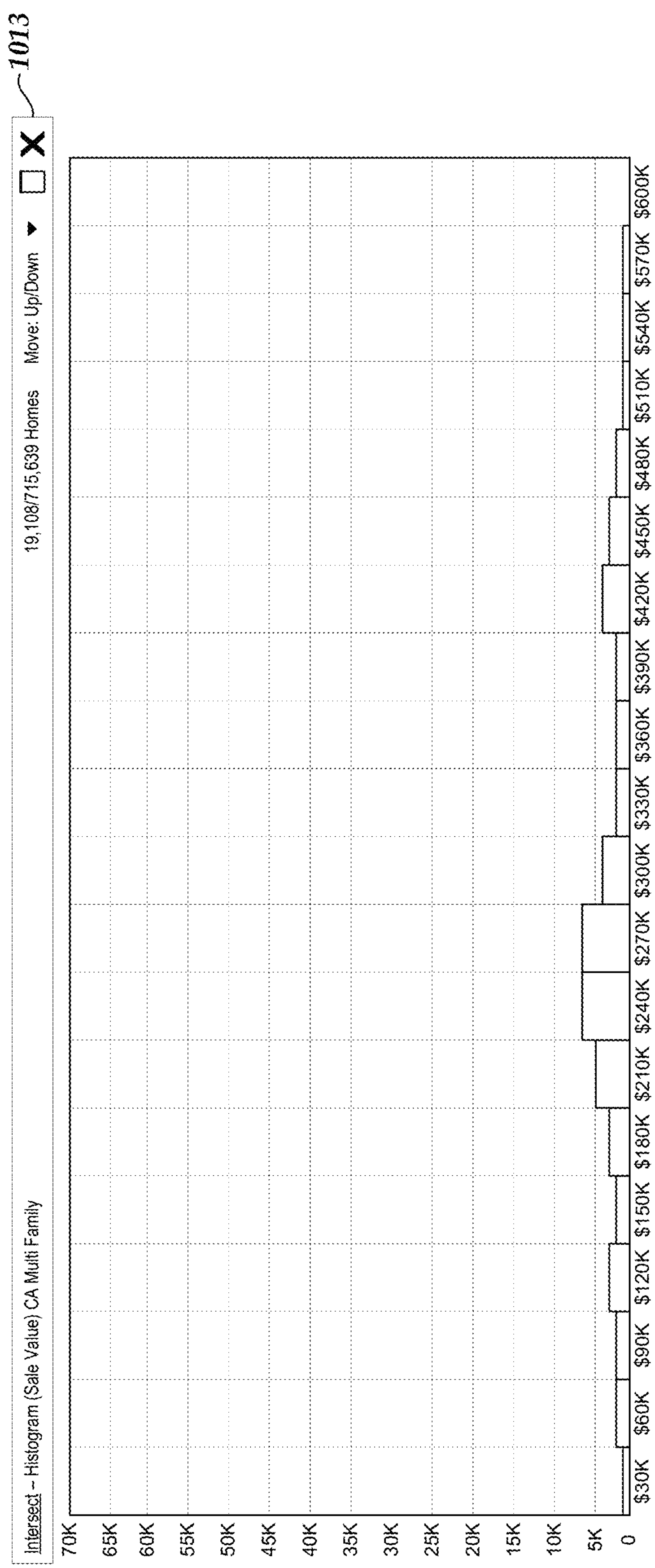
Figures 2A, 10:
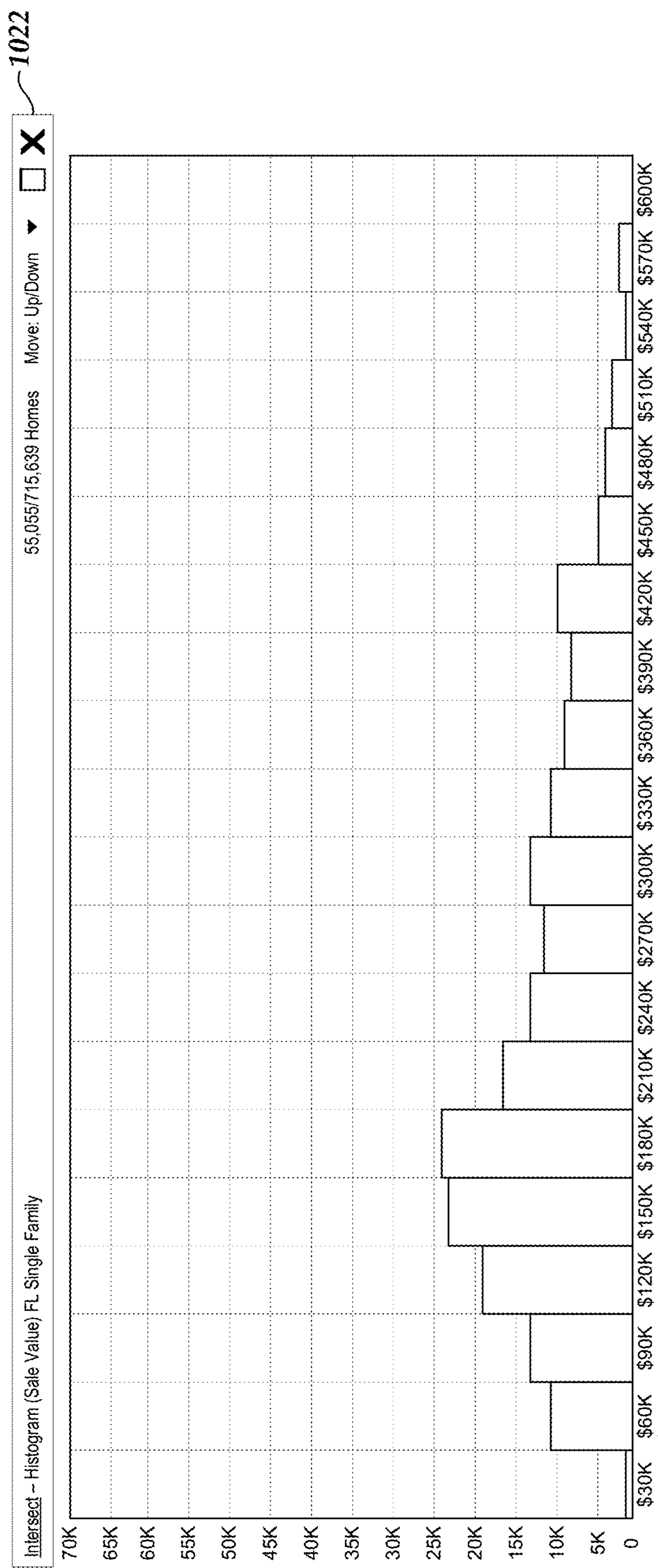
Figures 2B, 10:
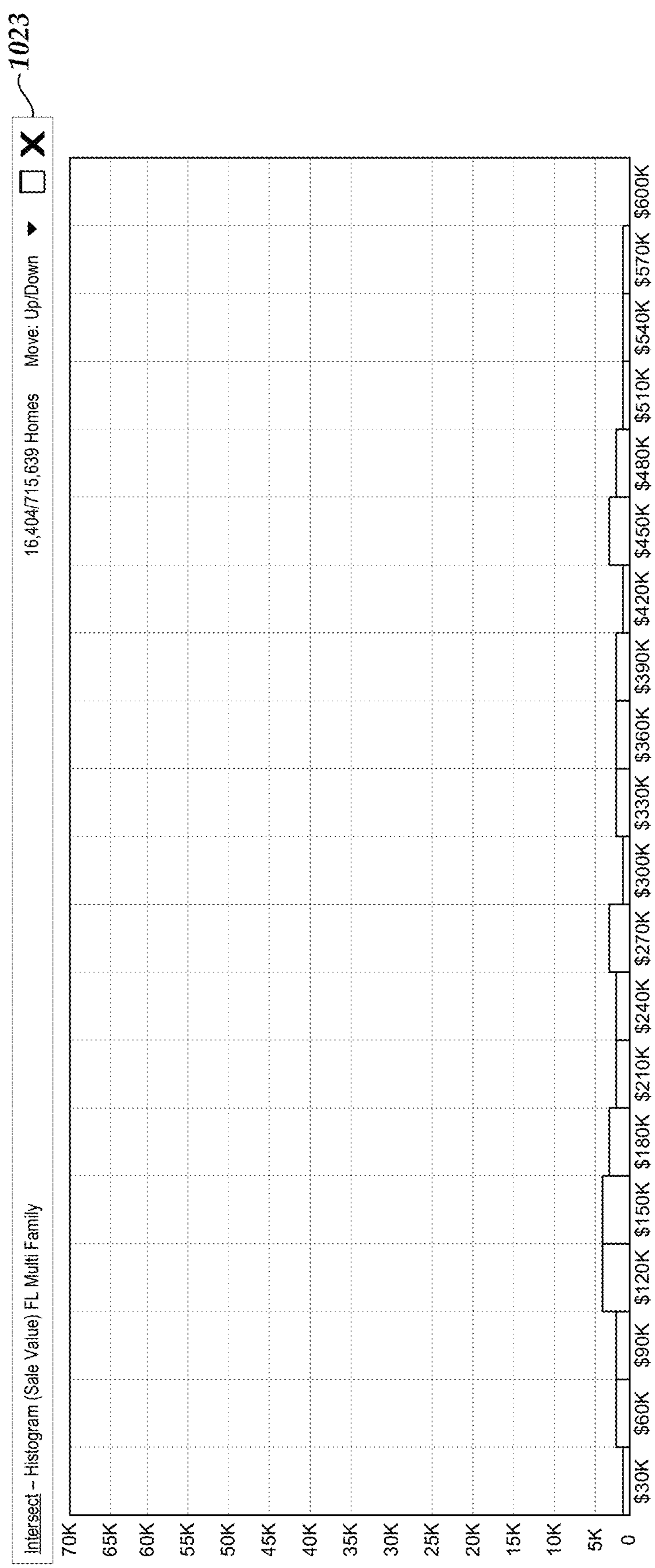

FIG. 10-1B illustrates another content pane 1013 included in the GUI 1000 of FIG. 10. In an embodiment, the content pane 1013 includes a filter that is applied to the data in content pane 1002 such that 19,108 out of 715,639 homes are identified as not satisfying the membership criteria embodied by the filter. For example, the membership criteria may specify that the data is to be displayed in a histogram and that the homes must not be single family homes in California (e.g., must be multi family homes in California). Thus, content pane 1013 displays data that satisfies the membership criteria originally specified in content pane 902 and that does not satisfy the membership criteria originally specified in content pane 1002.

FIG. 10-2A illustrates another content pane 1022 included in the GUI 1000 of FIG. 10. In an embodiment, the content pane 1022 includes a filter that is applied to the data in content pane 1002 such that 55,055 out of 715,639 homes satisfy the membership criteria embodied by the filter. For example, the membership criteria may specify that the data is to be displayed in a histogram and that the homes must be single family homes in Florida. Thus, content pane 1022 displays data that satisfies the membership criteria originally specified in content pane 902 and content pane 1002.

FIG. 10-2B illustrates another content pane 1023 included in the GUI 1000 of FIG. 10. In an embodiment, the content pane 1023 includes a filter that is applied to the data in content pane 1002 such that 16,404 out of 715,639 homes are identified as not satisfying the membership criteria embodied by the filter. For example, the membership criteria may specify that the data is to be displayed in a histogram and that the homes must not be single family homes in Florida (e.g., must be multi family homes in Florida). Thus, content pane 1023 displays data that satisfies the membership criteria originally specified in content pane 902 and that does not satisfy the membership criteria originally specified in content pane 1002.

Figures 3A, 10:
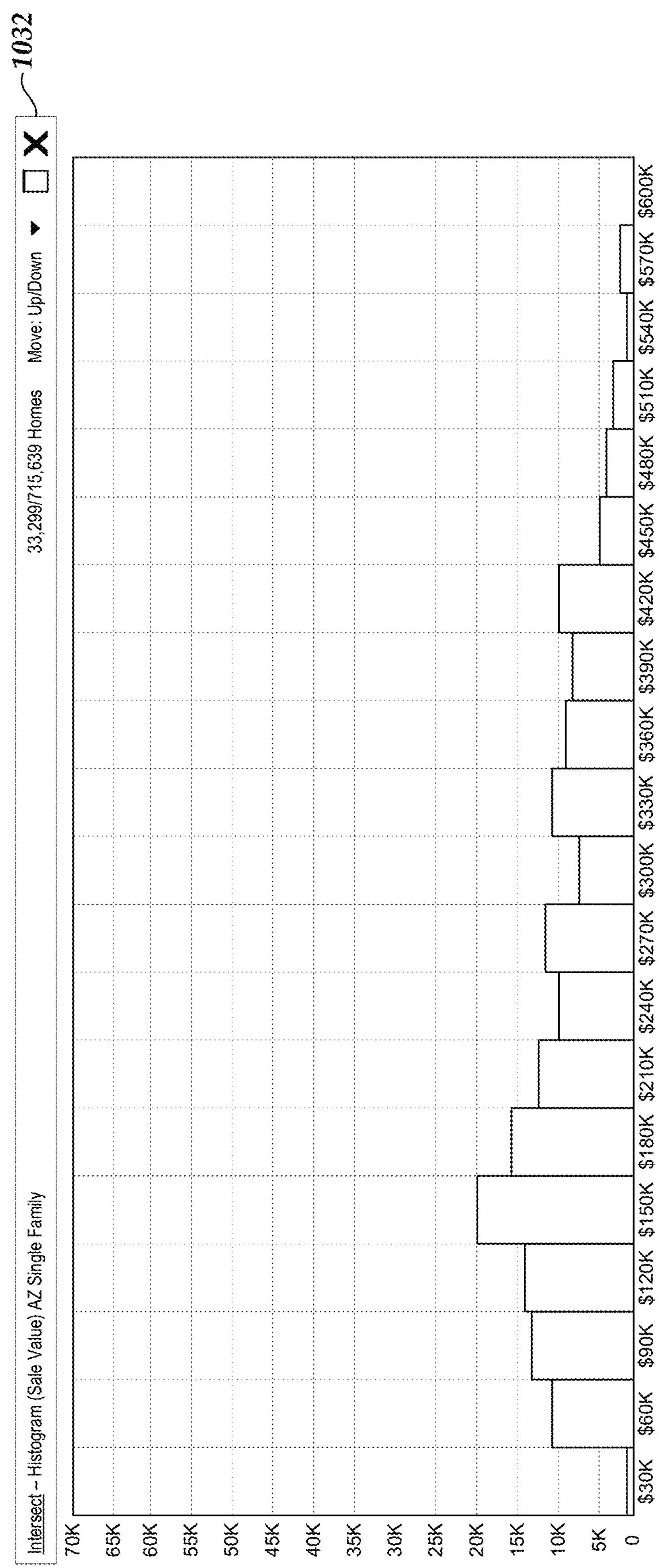
Figures 3B, 10:
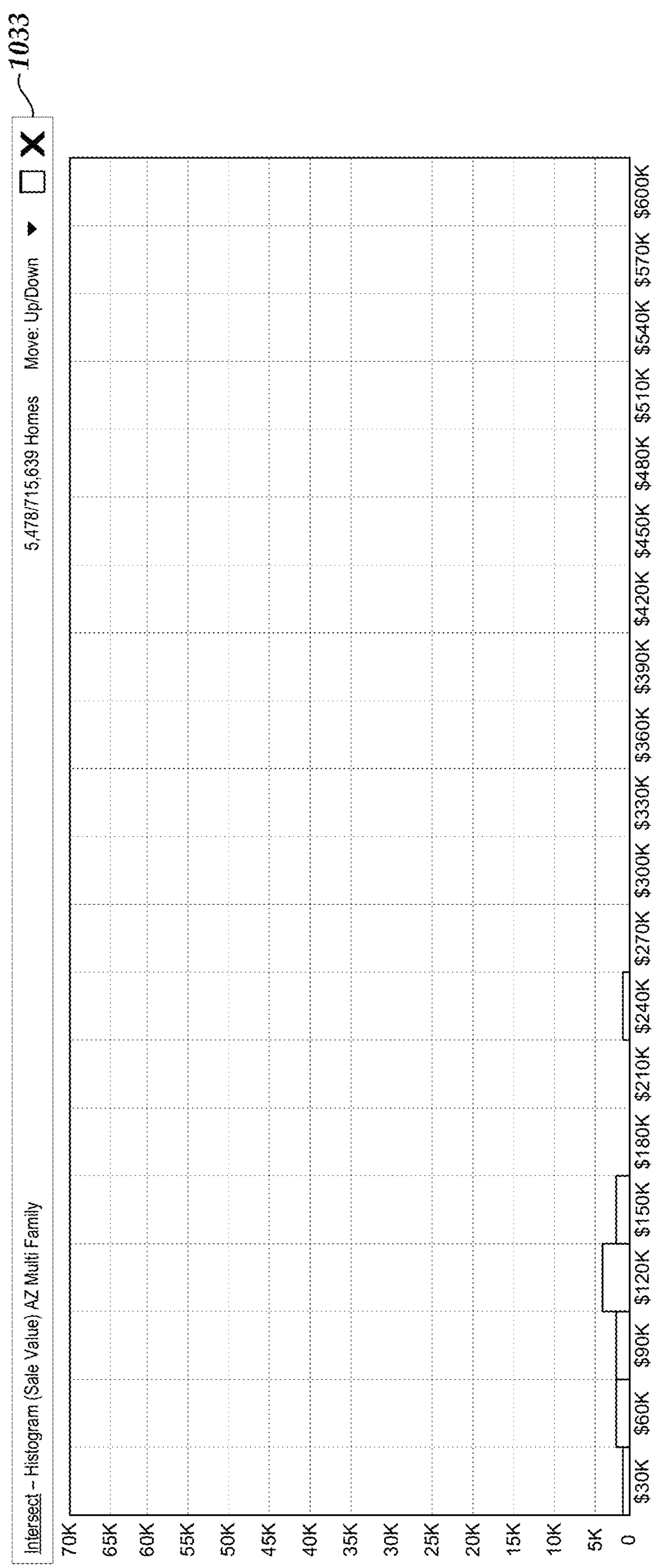

FIG. 10-3A illustrates another content pane 1032 included in the GUI 1000 of FIG. 10. In an embodiment, the content pane 1032 includes a filter that is applied to the data in content pane 1002 such that 33,299 out of 715,639 homes satisfy the membership criteria embodied by the filter. For example, the membership criteria may specify that the data is to be displayed in a histogram and that the homes must be single family homes in Arizona. Thus, content pane 1032 displays data that satisfies the membership criteria originally specified in content pane 902 and content pane 1002.

FIG. 10-3B illustrates another content pane 1033 included in the GUI 1000 of FIG. 10. In an embodiment, the content pane 1033 includes a filter that is applied to the data in content pane 1002 such that 5,478 out of 715,639 homes are identified as not satisfying the membership criteria embodied by the filter. For example, the membership criteria may specify that the data is to be displayed in a histogram and that the homes must not be single family homes in Arizona (e.g., must be multi family homes in Arizona). Thus, content pane 1033 displays data that satisfies the membership criteria originally specified in content pane 902 and that does not satisfy the membership criteria originally specified in content pane 1002.

Figures 4A, 10:
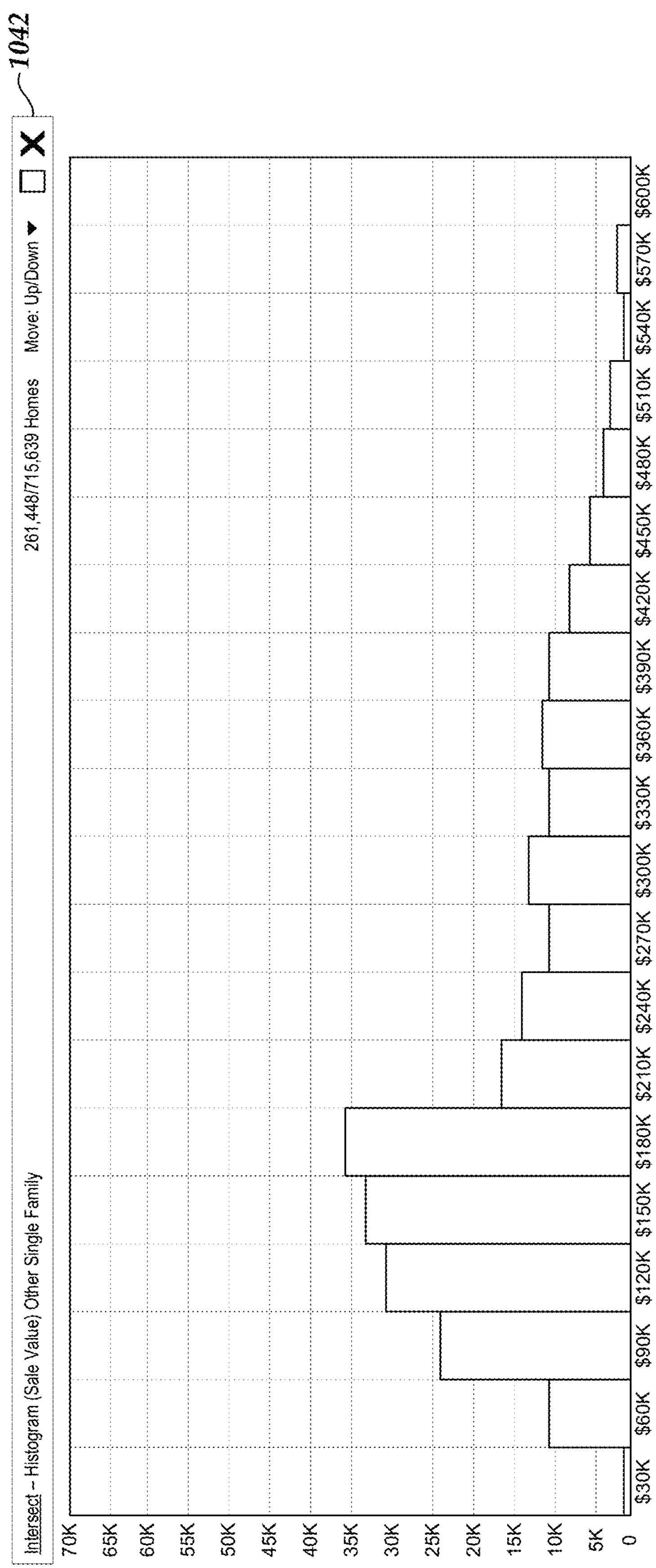

FIG. 10-4A illustrates another content pane 1042 included in the GUI 1000 of FIG. 10. In an embodiment, the content pane 1042 includes a filter that is applied to the data in content pane 1002 such that 261,448 out of 715,639 homes are identified as not satisfying the membership criteria embodied by the filter. For example, the membership criteria may specify that the data is to be displayed in a histogram and that the homes must be single family homes not in California, Florida, or Arizona. Thus, content pane 1042 displays data that does not satisfy the membership criteria originally specified in content pane 902 and that does satisfy the membership criteria originally specified in content pane 1002.

Figures 4B, 10:
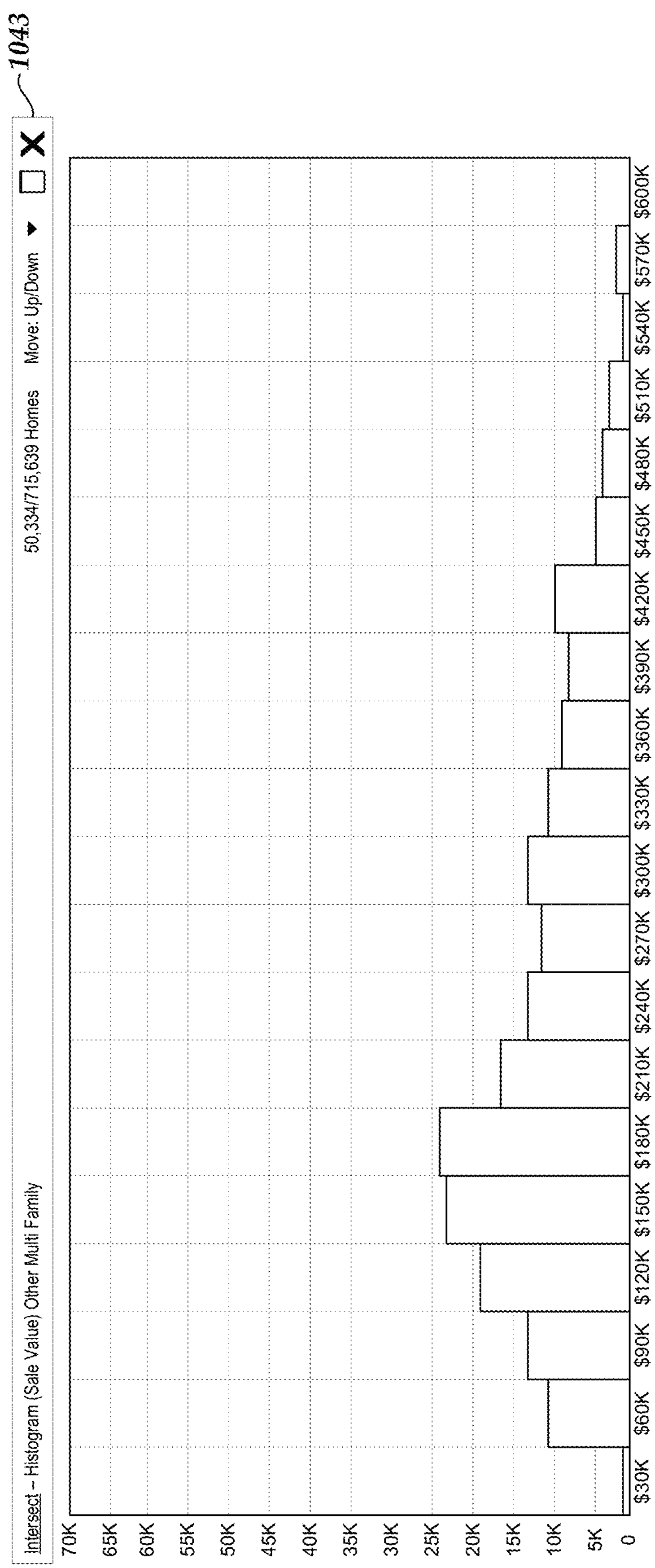

FIG. 10-4B illustrates another content pane 1043 included in the GUI 1000 of FIG. 10. In an embodiment, the content pane 1043 includes a filter that is applied to the data in content pane 1002 such that 50,334 out of 715,639 homes are identified as not satisfying the membership criteria embodied by the filter. For example, the membership criteria may specify that the data is to be displayed in a histogram, that the homes must not be single family homes, and that the homes must not be in California, Florida, or Arizona (e.g., must be multi family homes locations other than California, Florida, or Arizona). Thus, content pane 1043 displays data that does not satisfy the membership criteria originally specified in content pane 902 and content pane 1002.

Figure 11:
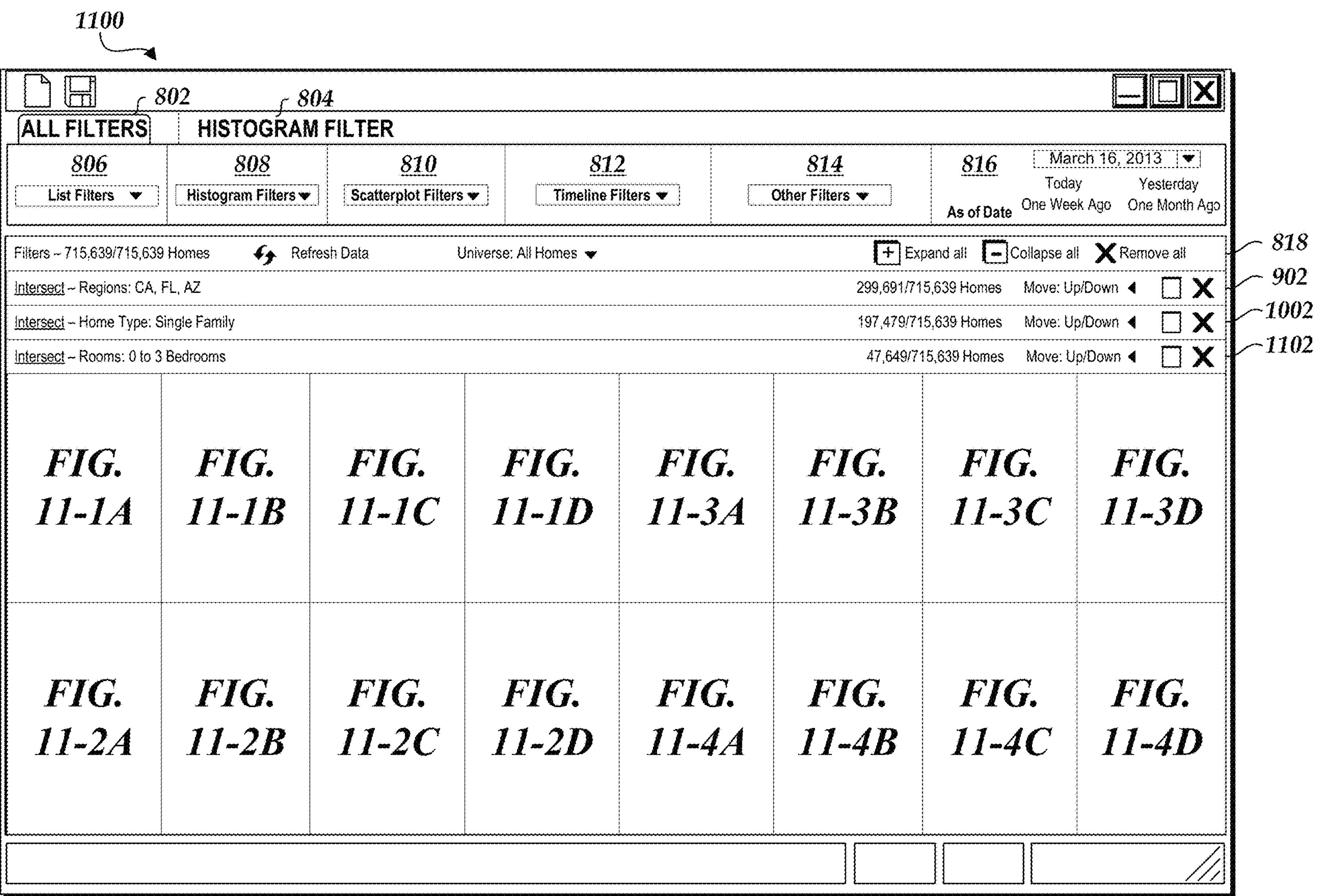
FIG. 11 illustrates another example GUI for a multipath explorer.
Figures 1A, 11:
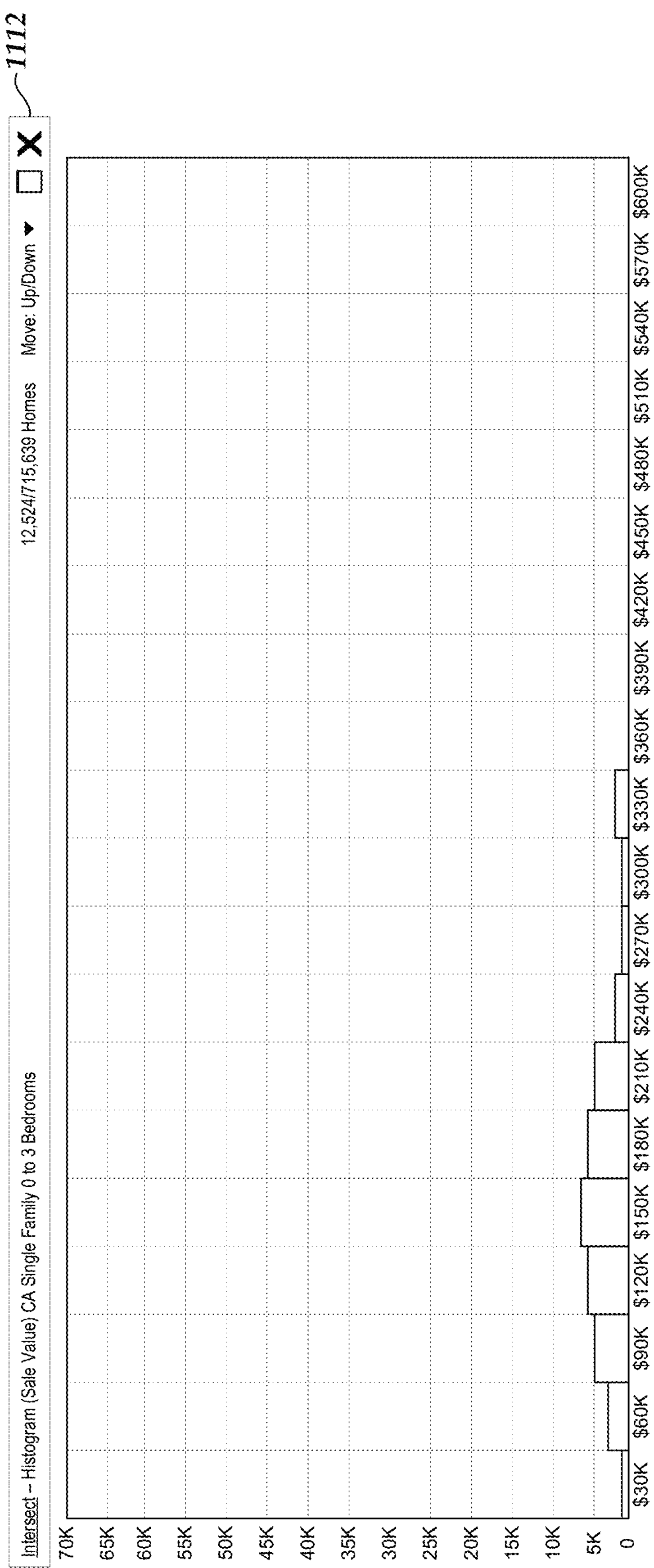
Figures 1B, 11:
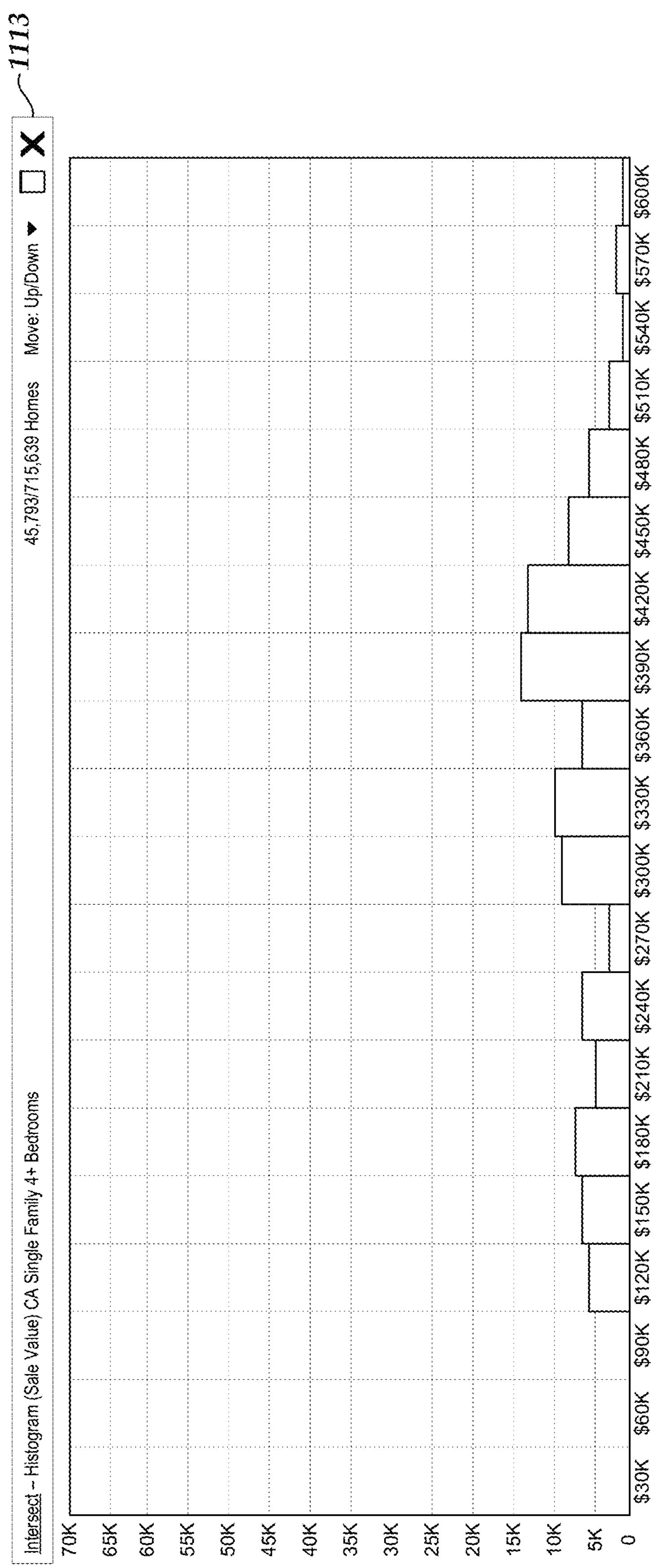

FIG. 11 illustrates another example graphical user interface (GUI) 1100 for a multipath explorer. As illustrated in FIG. 11, the GUI 1100 includes the all filters tab 802 and the histogram filter tab 804. While the GUI 1100 includes the all filters tab 802 and the histogram filter tab 904, this is not meant to be limiting as the GUI 1200 may include fewer or additional tabs, such as tabs associated with each of the filters discussed below.

As illustrated in FIG. 11, the GUI 1100 includes the content pane 818, the content pane 902, the content pane 1002, and a content pane 1102. In an embodiment, the content pane 1102 includes a filter that is applied to the inventory in content pane 1002 such that 47,649 out of 715,639 homes satisfy the membership criteria embodied by the filter. For example, the membership criteria may specify that the homes must include a certain number of bedrooms (e.g., zero to three bedrooms). Based on this membership criteria, sixteen additional content panes may be included in the GUI 1100. The first additional content pane is illustrated in FIG. 11-1A, the second in FIG. 11-1B, the third in FIG. 11-1C, the fourth in FIG. 11-1D, the fifth in FIG. 11-2A, the sixth in FIG. 11-2B, the seventh in FIG. 11-2C, the eight in FIG. 11-2D, the ninth in FIG. 11-3A, the tenth in FIG. 11-3B, the eleventh in FIG. 11-3C, the twelfth in FIG. 11-3D, the thirteenth in FIG. 11-4A, the fourteenth in FIG. 11-4B, the fifteenth in FIG. 11-4C, and the sixteenth in FIG. 11-4D. The additional content panes may display data that satisfies the membership criteria, data that satisfies some of the membership criteria, and data that does not satisfy the membership criteria.

FIG. 11-1A illustrates a content pane 1112 included in the GUI 1100 of FIG. 11. In an embodiment, the content pane 1112 includes a filter that is applied to the data in content pane 1102 such that 12,524 out of 715,639 homes satisfy the membership criteria embodied by the filter. For example, the membership criteria may specify that the data is to be displayed in a histogram and that the homes must be single family homes with zero to three bedrooms in California. Thus, content pane 1112 displays data that satisfies the membership criteria originally specified in content pane 902, content pane 1002, and content pane 1102.

FIG. 11-1B illustrates another content pane 1113 included in the GUI 1100 of FIG. 11. In an embodiment, the content pane 1113 includes a filter that is applied to the data in content pane 1102 such that 45,793 out of 715,639 homes are identified as not satisfying the membership criteria embodied by the filter. For example, the membership criteria may specify that the data is to be displayed in a histogram and that the homes must be single family homes not with zero to three bedrooms in California (e.g., must be single family homes with four or more bedrooms in California). Thus, content pane 1113 displays data that satisfies the membership criteria originally specified in content pane 902 and content pane 1002 and that does not satisfy the membership criteria originally specified in content pane 1102.

Figures 1C, 11:
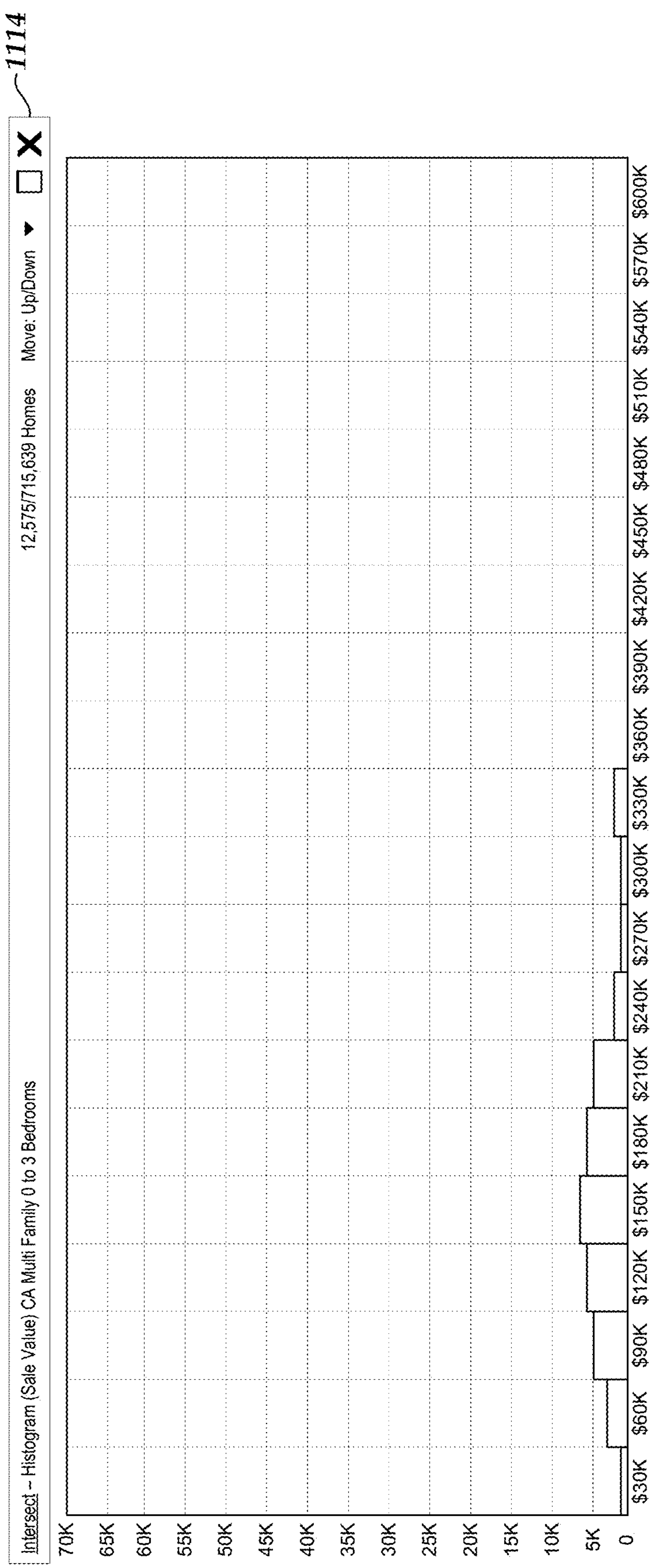

FIG. 11-1C illustrates another content pane 1114 included in the GUI 1100 of FIG. 11. In an embodiment, the content pane 1114 includes a filter that is applied to the data in content pane 1102 such that 12,575 out of 715,639 homes are identified as not satisfying the membership criteria embodied by the filter. For example, the membership criteria may specify that the data is to be displayed in a histogram and that the homes must not be single family homes with zero to three bedrooms in California (e.g., must be multi family homes with zero to three bedrooms in California). Thus, content pane 1114 displays data that satisfies the membership criteria originally specified in content pane 902 and content pane 1102 and that does not satisfy the membership criteria originally specified in content pane 1002.

Figures 1D, 11:
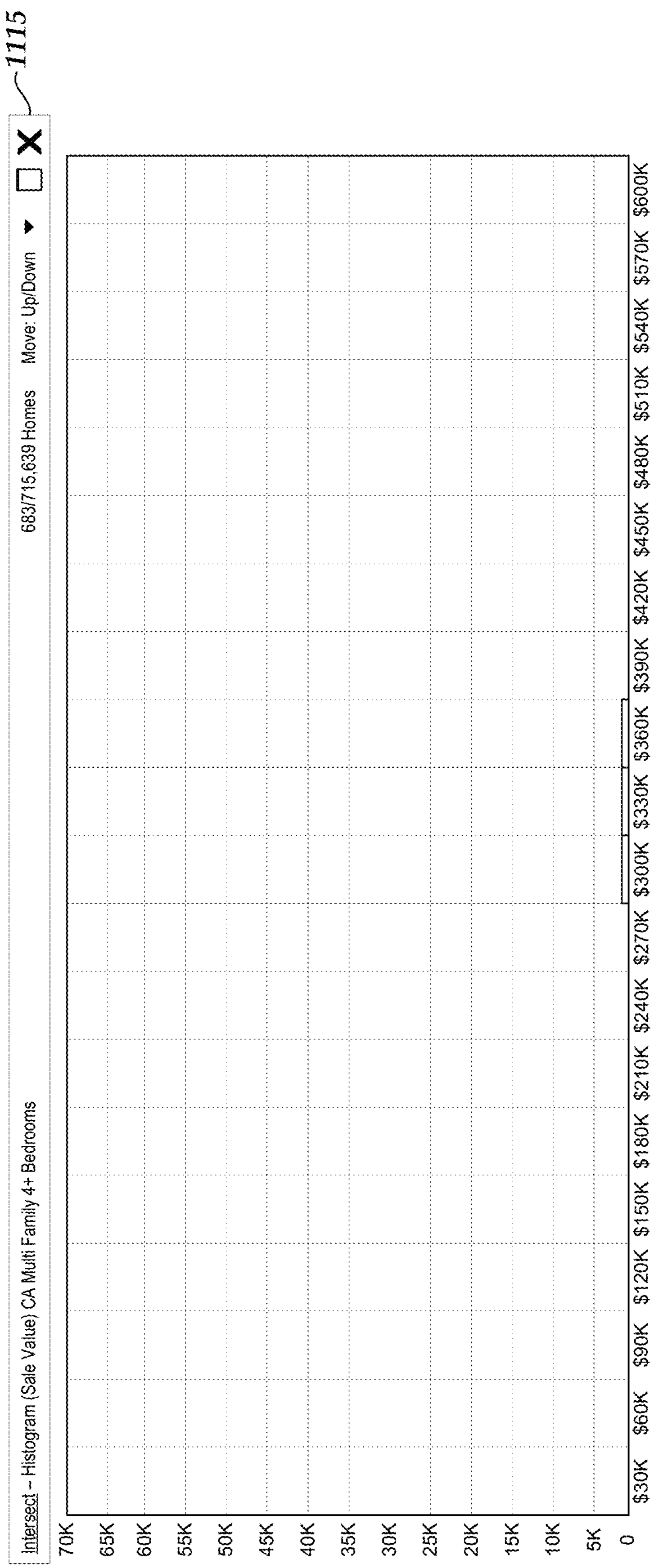
Figures 2A, 11:
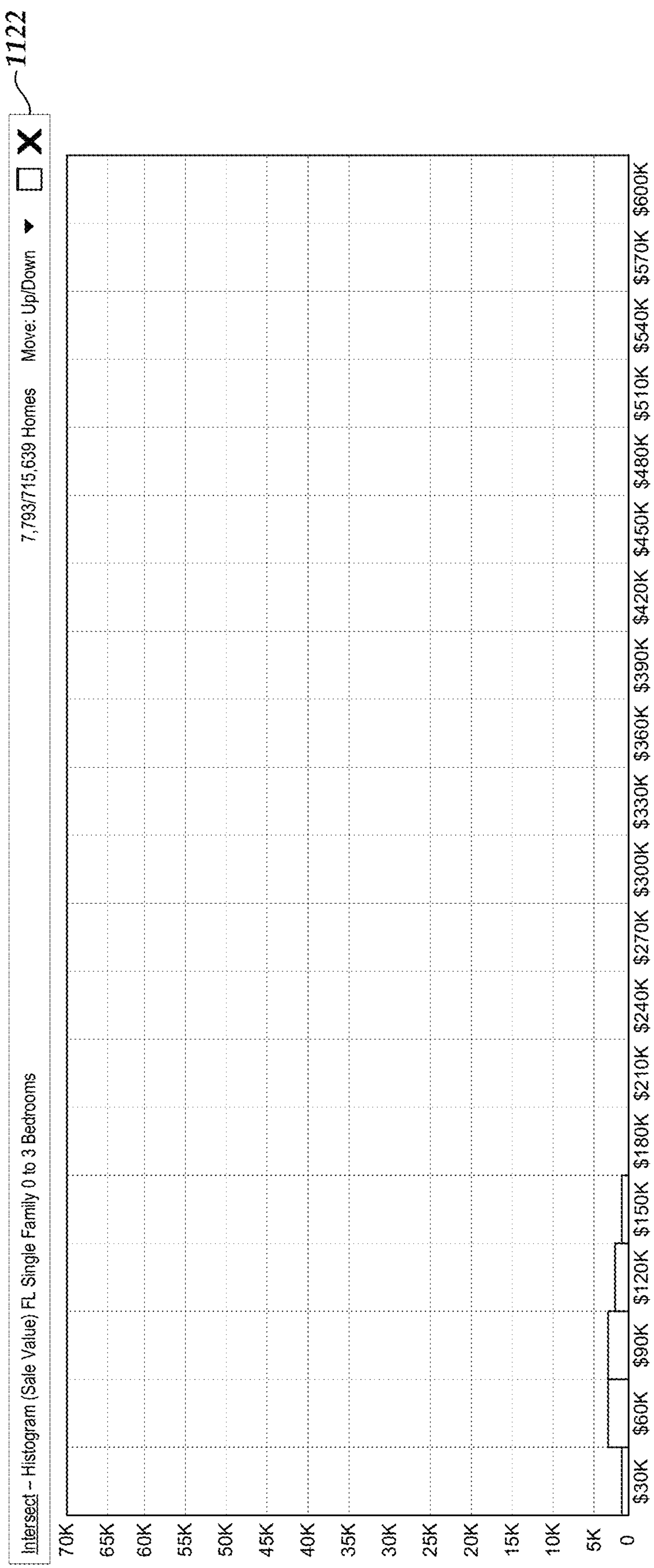
Figures 2B, 11:
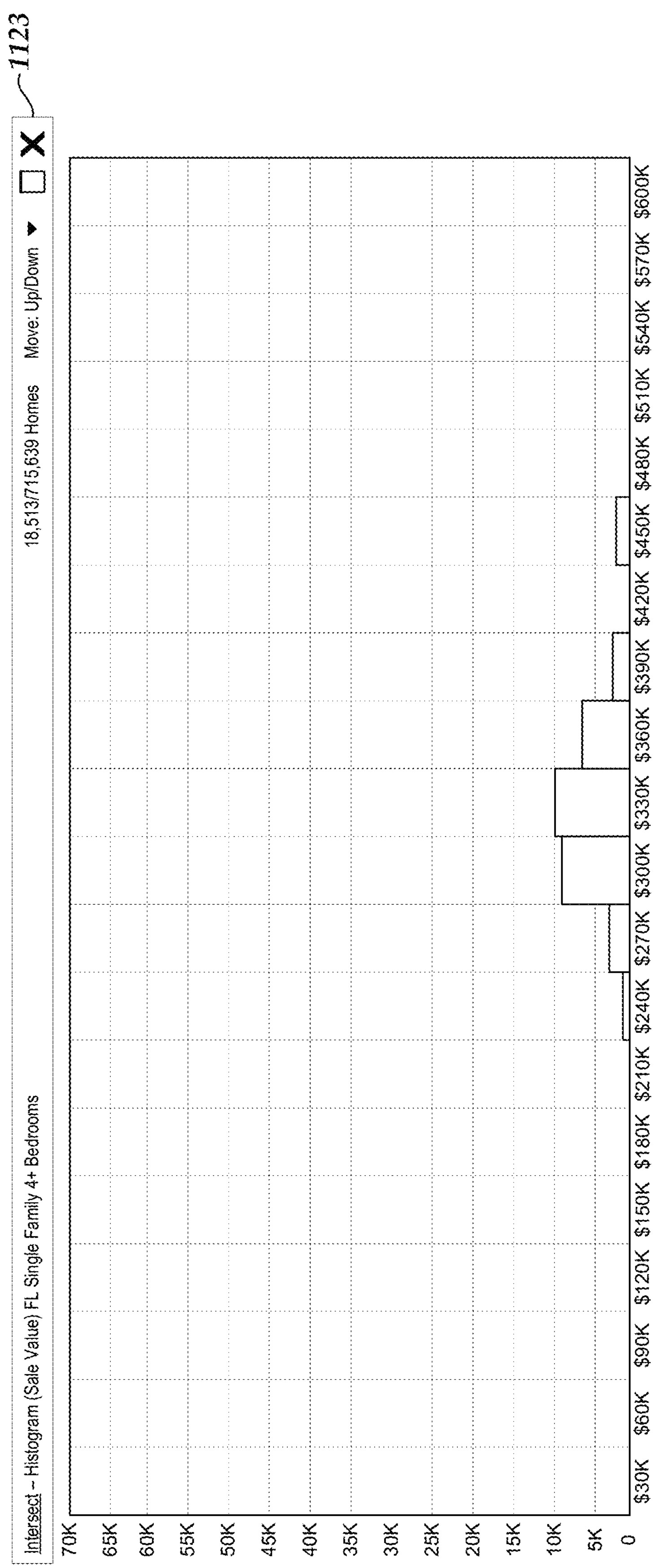
Figures 2C, 11:
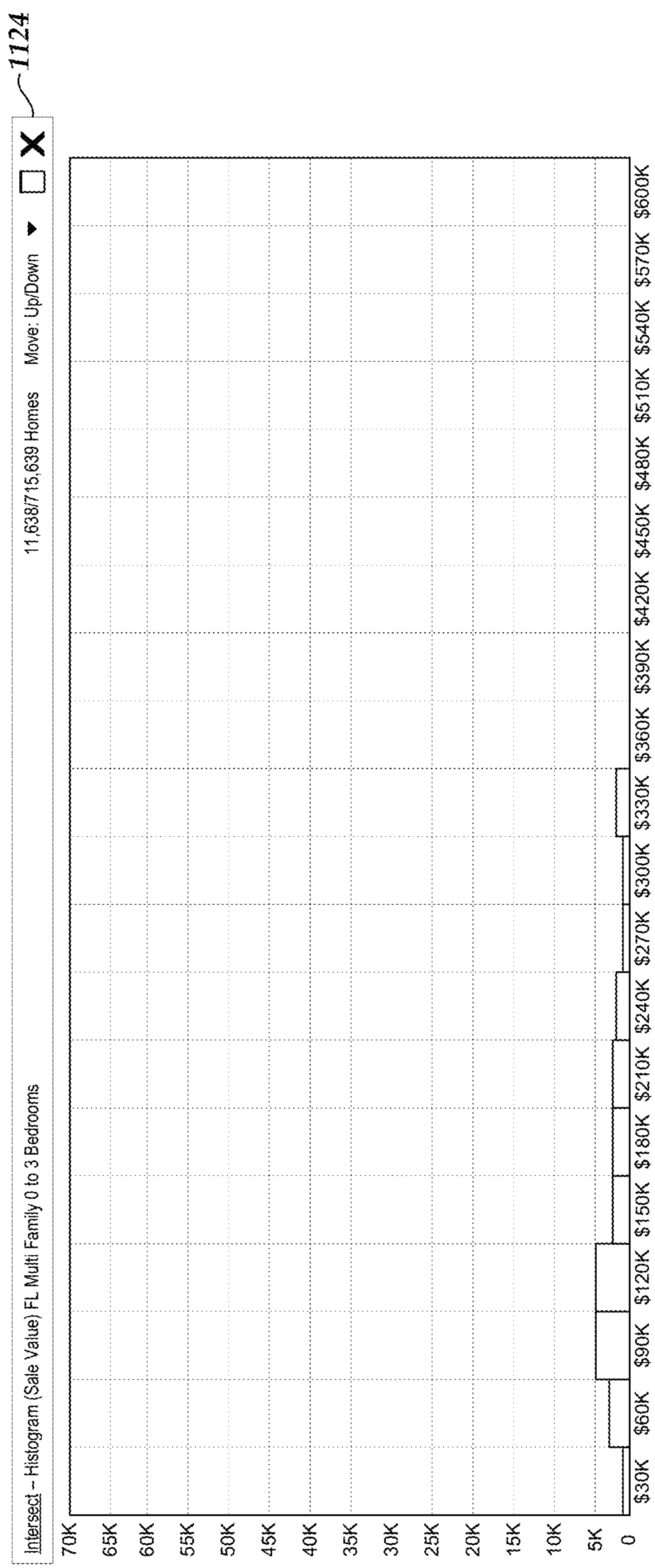

FIG. 11-1D illustrates another content pane 1115 included in the GUI 1100 of FIG. 11. In an embodiment, the content pane 1215 includes a filter that is applied to the data in content pane 1102 such that 683 out of 715,639 homes are identified as not satisfying the membership criteria embodied by the filter. For example, the membership criteria may specify that the data is to be displayed in a histogram and that the homes must not be single family homes in California and must not include zero to three bedrooms (e.g., must be multi family homes with four or more bedrooms in California). Thus, content pane 1115 displays data that satisfies the membership criteria originally specified in content pane 902 and does not satisfy the membership criteria originally specified in content pane 1002 and content pane 1102.

FIG. 11-2A illustrates another content pane 1122 included in the GUI 1100 of FIG. 11. In an embodiment, the content pane 1122 includes a filter that is applied to the data in content pane 1102 such that 7,793 out of 715,639 homes satisfy the membership criteria embodied by the filter. For example, the membership criteria may specify that the data is to be displayed in a histogram and that the homes must be single family homes with zero to three bedrooms in Florida. Thus, content pane 1122 displays data that satisfies the membership criteria originally specified in content pane 902, content pane 1002, and content pane 1102.

FIG. 11-2B illustrates another content pane 1123 included in the GUI 1100 of FIG. 11. In an embodiment, the content pane 1123 includes a filter that is applied to the data in content pane 1102 such that 18,513 out of 715,639 homes are identified as not satisfying the membership criteria embodied by the filter. For example, the membership criteria may specify that the data is to be displayed in a histogram and that the homes must be single family homes not with zero to three bedrooms in Florida (e.g., must be single family homes with four or more bedrooms in Florida). Thus, content pane 1123 displays data that satisfies the membership criteria originally specified in content pane 902 and content pane 1002 and that does not satisfy the membership criteria originally specified in content pane 1102.

FIG. 11-2C illustrates another content pane 1124 included in the GUI 1100 of FIG. 11. In an embodiment, the content pane 1124 includes a filter that is applied to the data in content pane 1102 such that 11,638 out of 715,639 homes are identified as not satisfying the membership criteria embodied by the filter. For example, the membership criteria may specify that the data is to be displayed in a histogram and that the homes must not be single family homes with zero to three bedrooms in Florida (e.g., must be multi family homes with zero to three bedrooms in Florida). Thus, content pane 1124 displays data that satisfies the membership criteria originally specified in content pane 902 and content pane 1102 and that does not satisfy the membership criteria originally specified in content pane 1002.

Figures 2D, 11:
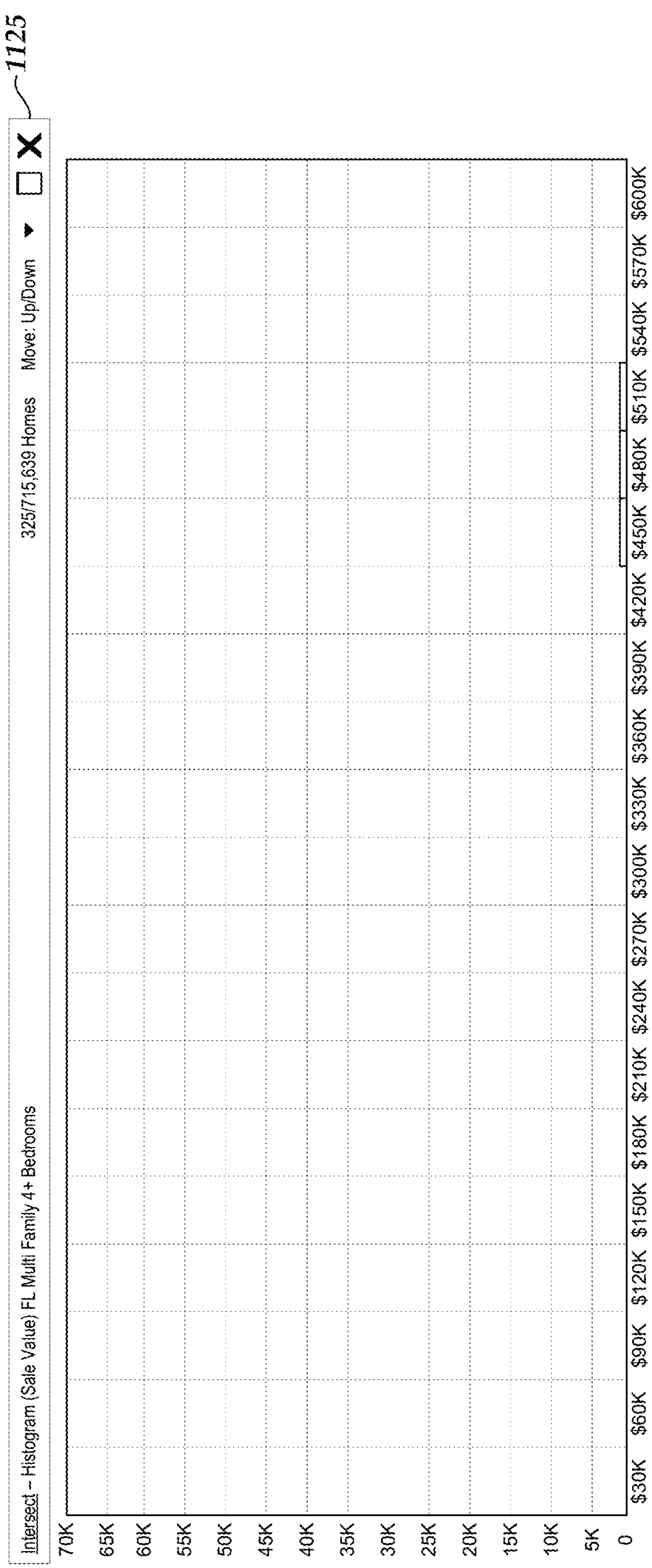
Figures 3A, 11:
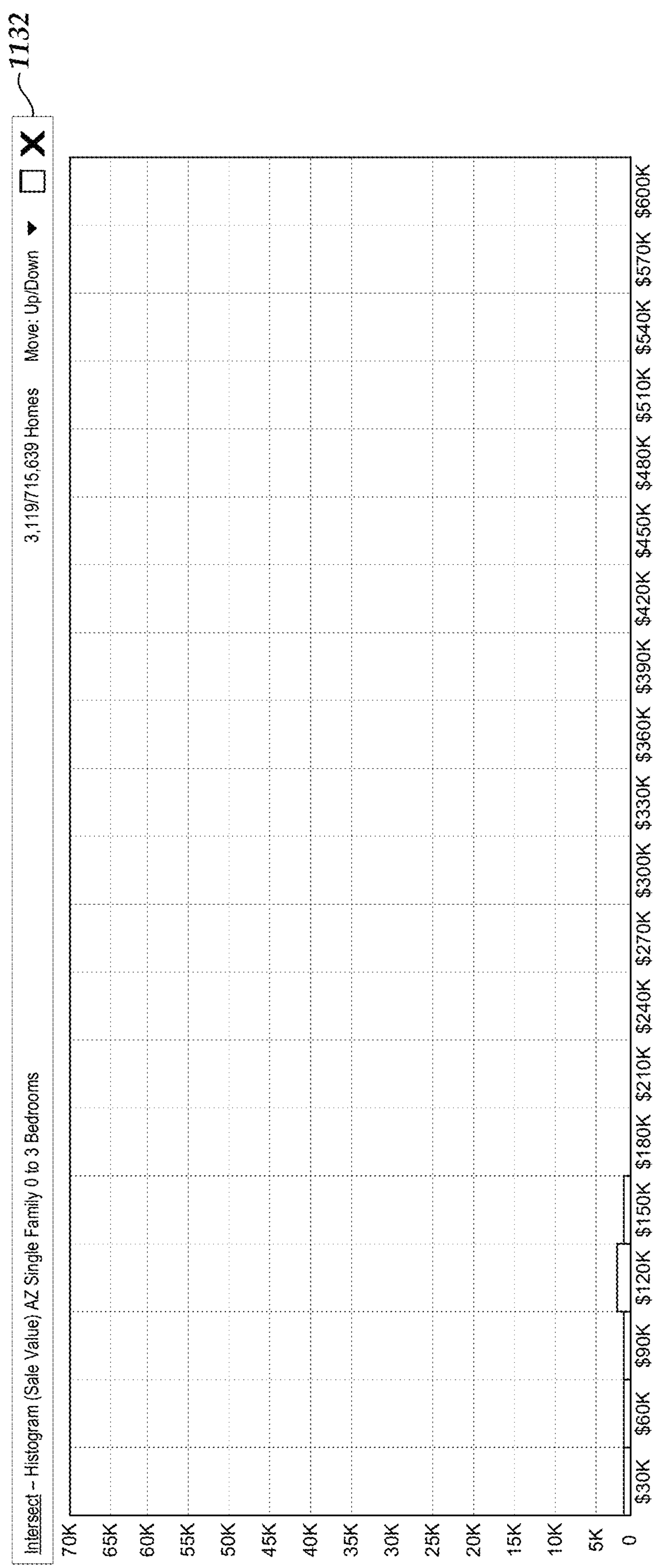
Figures 3B, 11:
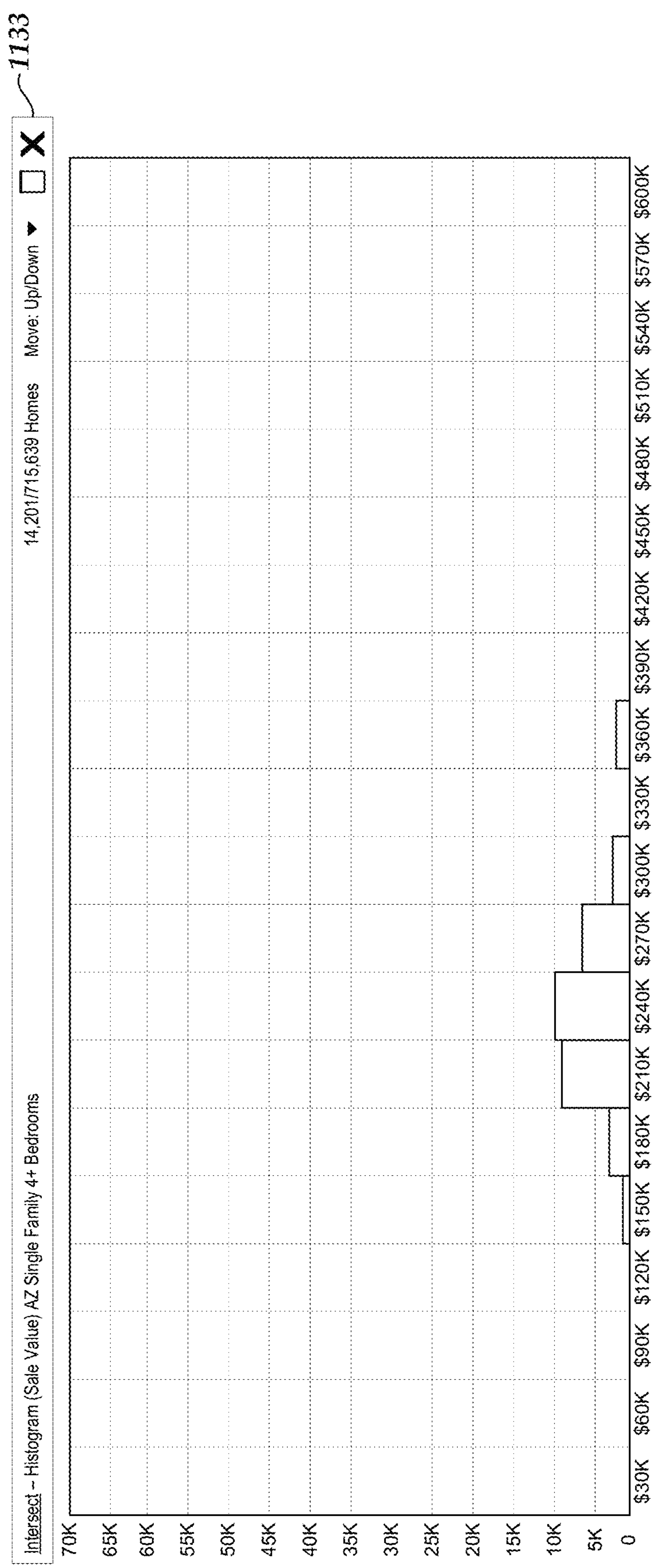

FIG. 11-2D illustrates another content pane 1125 included in the GUI 1100 of FIG. 11. In an embodiment, the content pane 1125 includes a filter that is applied to the data in content pane 1102 such that 325 out of 715,639 homes are identified as not satisfying the membership criteria embodied by the filter. For example, the membership criteria may specify that the data is to be displayed in a histogram and that the homes must not be single family homes in Florida and must not include zero to three bedrooms (e.g., must be multi family homes with four or more bedrooms in Florida). Thus, content pane 1125 displays data that satisfies the membership criteria originally specified in content pane 902 and does not satisfy the membership criteria originally specified in content pane 1102 and content pane 1102.

FIG. 11-3A illustrates another content pane 1132 included in the GUI 1100 of FIG. 11. In an embodiment, the content pane 1132 includes a filter that is applied to the data in content pane 1102 such that 3,119 out of 715,639 homes satisfy the membership criteria embodied by the filter. For example, the membership criteria may specify that the data is to be displayed in a histogram and that the homes must be single family homes with zero to three bedrooms in Arizona. Thus, content pane 1132 displays data that satisfies the membership criteria originally specified in content pane 902, content pane 1002, and content pane 1102.

FIG. 11-3B illustrates another content pane 1133 included in the GUI 1100 of FIG. 11. In an embodiment, the content pane 1133 includes a filter that is applied to the data in content pane 1102 such that 14,201 out of 715,639 homes are identified as not satisfying the membership criteria embodied by the filter. For example, the membership criteria may specify that the data is to be displayed in a histogram and that the homes must be single family homes not with zero to three bedrooms in Arizona (e.g., must be single family homes with four or more bedrooms in Arizona). Thus, content pane 1133 displays data that satisfies the membership criteria originally specified in content pane 902 and content pane 1002 and that does not satisfy the membership criteria originally specified in content pane 1102.

Figures 3C, 11:
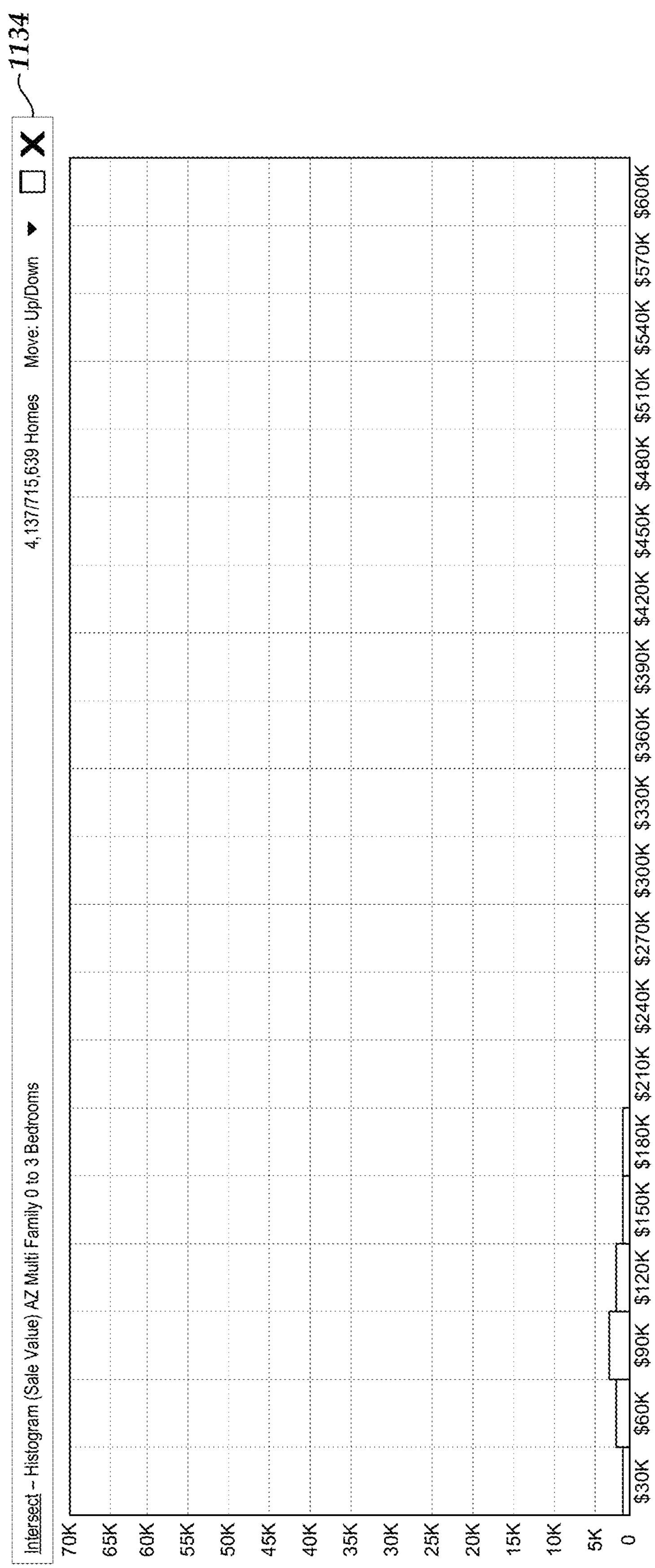

FIG. 11-3C illustrates another content pane 1134 included in the GUI 1100 of FIG. 11. In an embodiment, the content pane 1134 includes a filter that is applied to the data in content pane 1102 such that 4,137 out of 715,639 homes are identified as not satisfying the membership criteria embodied by the filter. For example, the membership criteria may specify that the data is to be displayed in a histogram and that the homes must not be single family homes with zero to three bedrooms in Arizona (e.g., must be multi family homes with zero to three bedrooms in Arizona). Thus, content pane 1134 displays data that satisfies the membership criteria originally specified in content pane 1002 and content pane 1102 and that does not satisfy the membership criteria originally specified in content pane 1002.

Figures 3D, 11:
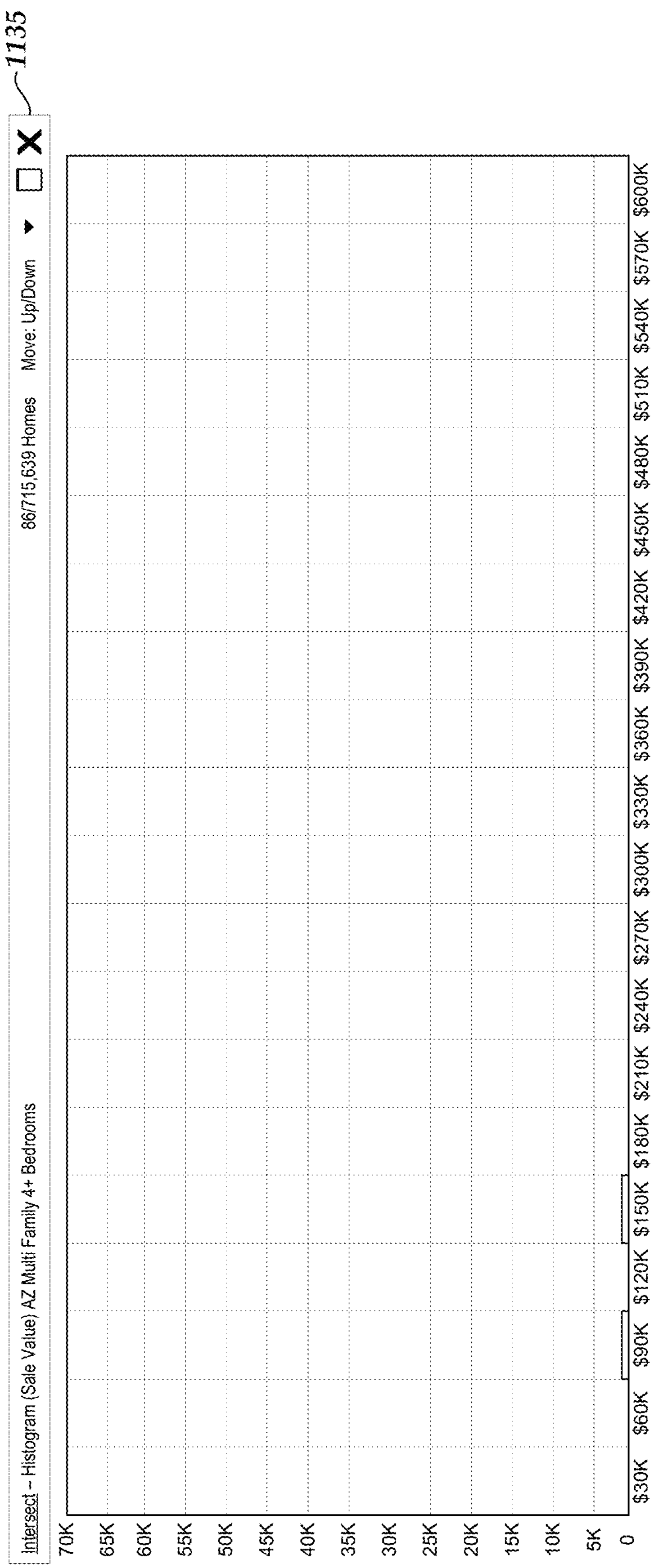
Figures 4A, 11:
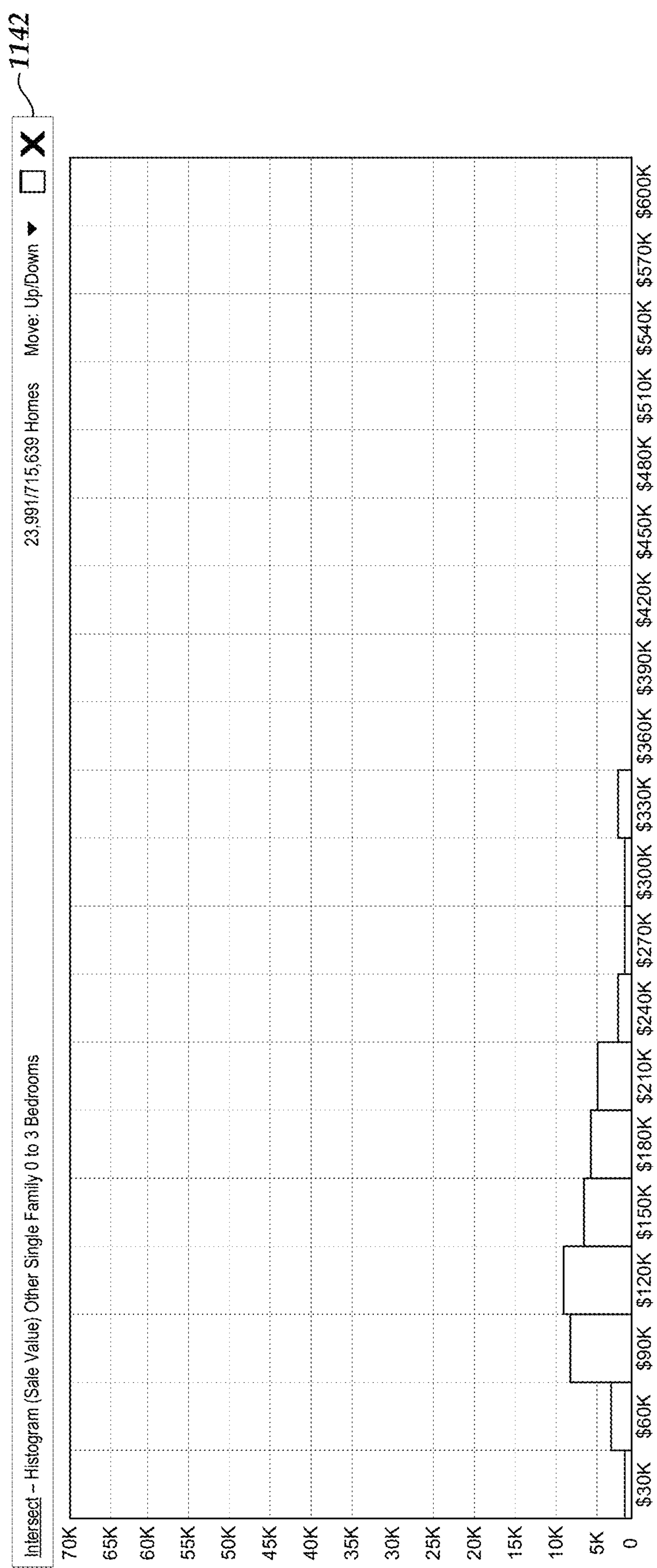
Figures 4B, 11:
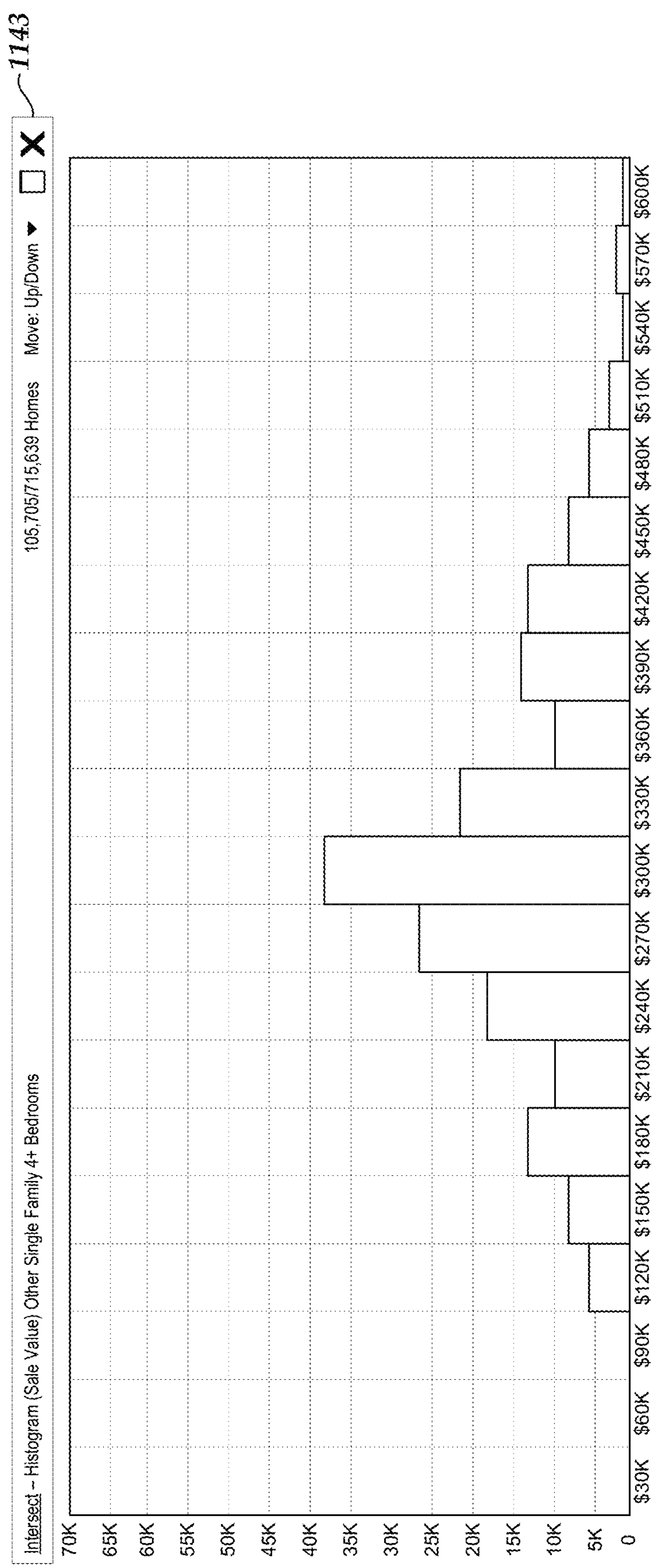

FIG. 11-3D illustrates another content pane 1135 included in the GUI 1100 of FIG. 11. In an embodiment, the content pane 1135 includes a filter that is applied to the data in content pane 1102 such that 86 out of 715,639 homes are identified as not satisfying the membership criteria embodied by the filter. For example, the membership criteria may specify that the data is to be displayed in a histogram and that the homes must not be single family homes in Arizona and must not include zero to three bedrooms (e.g., must be multi family homes with four or more bedrooms in Arizona). Thus, content pane 1135 displays data that satisfies the membership criteria originally specified in content pane 902 and does not satisfy the membership criteria originally specified in content pane 1102 and content pane 1102.

FIG. 11-4A illustrates another content pane 1142 included in the GUI 1100 of FIG. 11. In an embodiment, the content pane 1142 includes a filter that is applied to the data in content pane 1102 such that 23,991 out of 715,639 homes are identified as not satisfying the membership criteria embodied by the filter. For example, the membership criteria may specify that the data is to be displayed in a histogram and that the homes must be single family homes with zero to three bedrooms not in California, Florida, or Arizona. Thus, content pane 1142 displays data that satisfies the membership criteria originally specified in content pane 1002 and content pane 1102 and that does not satisfy the membership criteria originally specified in content pane 902.

FIG. 11-4B illustrates another content pane 1143 included in the GUI 1100 of FIG. 11. In an embodiment, the content pane 1143 includes a filter that is applied to the data in content pane 1102 such that 105,705 out of 715,639 homes are identified as not satisfying the membership criteria embodied by the filter. For example, the membership criteria may specify that the data is to be displayed in a histogram and that the homes must be single family homes not with zero to three bedrooms and not in California, Florida, or Arizona (e.g., must be single family homes with four or more bedrooms in locations other than California, Florida, or Arizona). Thus, content pane 1143 displays data that satisfies the membership criteria originally specified in content pane 1002 and that does not satisfy the membership criteria originally specified in content pane 902 and content pane 1102.

Figures 4C, 11:
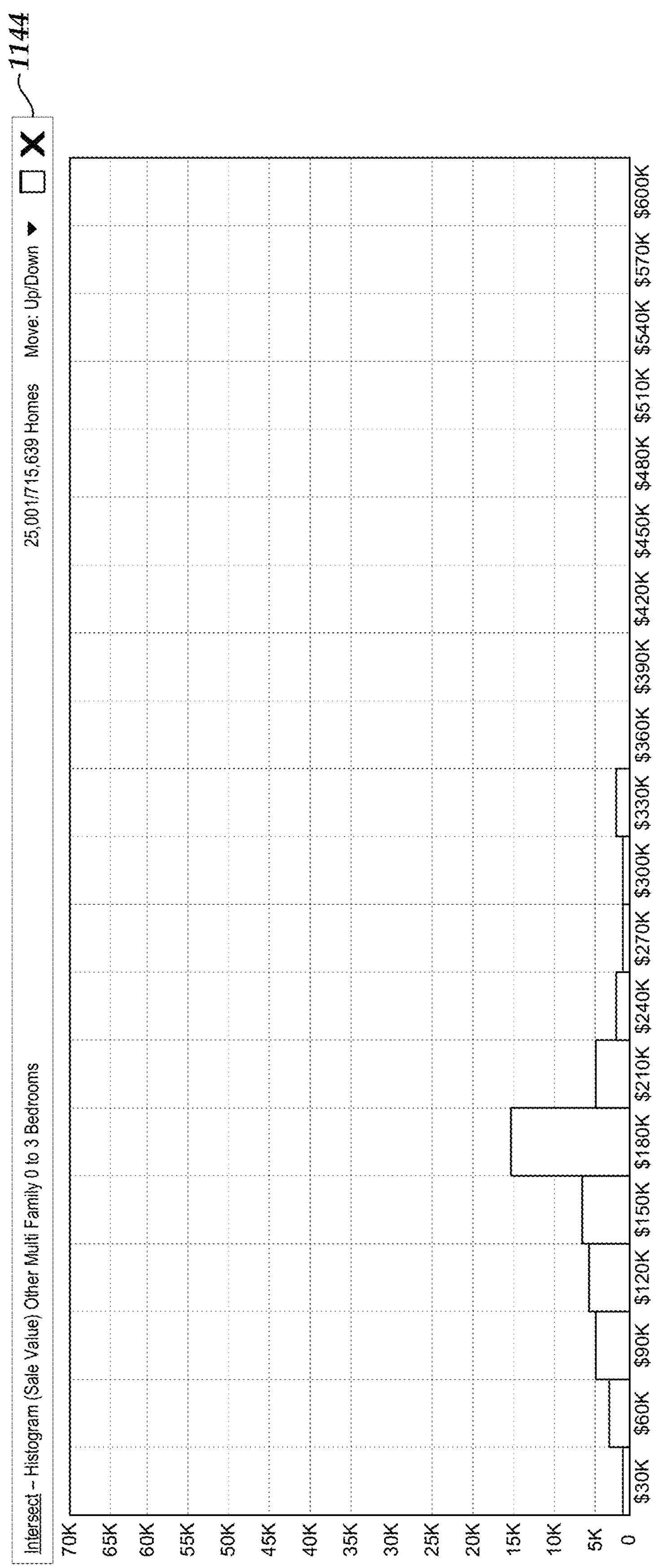

FIG. 11-4C illustrates another content pane 1144 included in the GUI 1100 of FIG. 11. In an embodiment, the content pane 1144 includes a filter that is applied to the data in content pane 1102 such that 25,001 out of 715,639 homes are identified as not satisfying the membership criteria embodied by the filter. For example, the membership criteria may specify that the data is to be displayed in a histogram and that the homes must not be single family homes with zero to three bedrooms and must not be in California, Florida, or Arizona (e.g., must be multi family homes with zero to three bedrooms in locations other than California, Florida, or Arizona). Thus, content pane 1144 displays data that satisfies the membership criteria originally specified in content pane 1102 and that does not satisfy the membership criteria originally specified in content pane 902 and content pane 1002.

Figures 4D, 11:
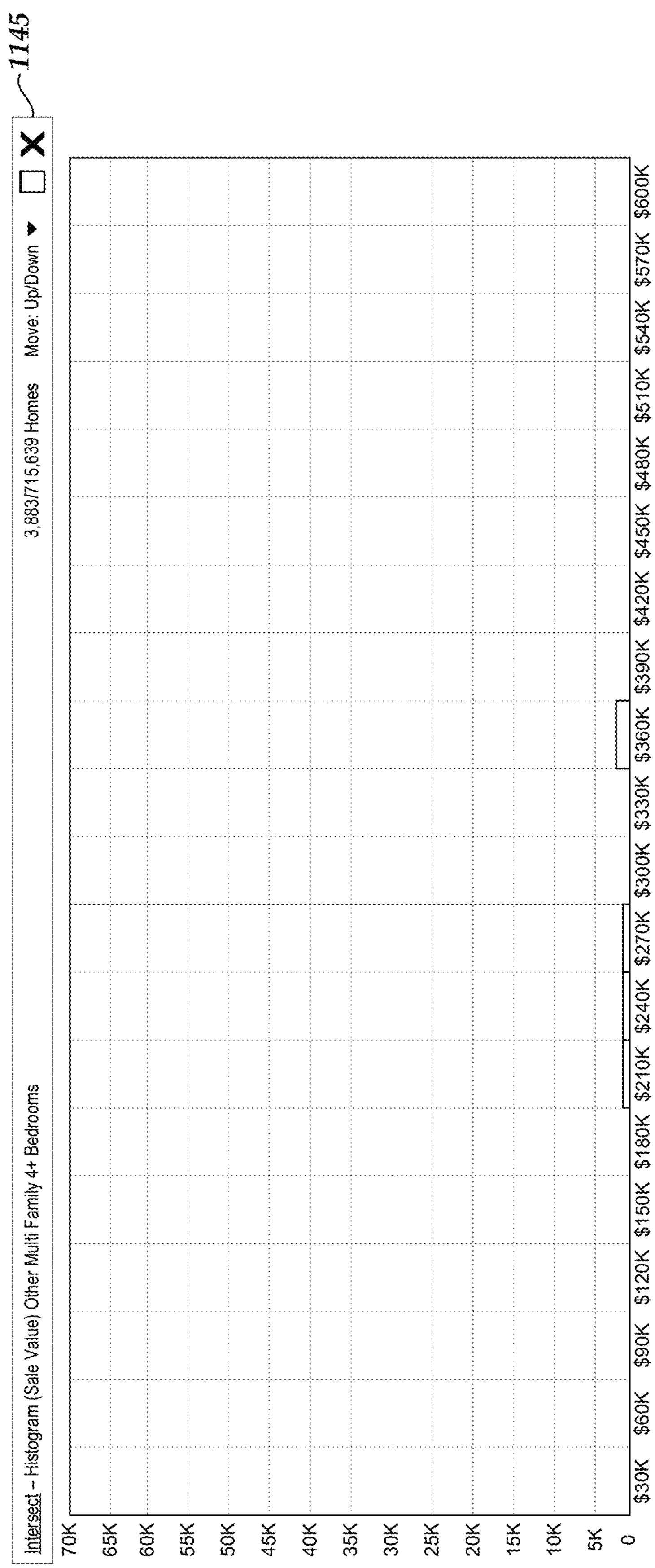

FIG. 11-4D illustrates another content pane 1145 included in the GUI 1100 of FIG. 11. In an embodiment, the content pane 1145 includes a filter that is applied to the data in content pane 1102 such that 3,883 out of 715,639 homes are identified as not satisfying the membership criteria embodied by the filter. For example, the membership criteria may specify that the data is to be displayed in a histogram and that the homes must not be single family homes in California, Florida, or Arizona and must not include zero to three bedrooms (e.g., must be multi family homes with four or more bedrooms in locations other than California, Florida, or Arizona). Thus, content pane 1145 displays data that does not satisfy the membership criteria originally specified in content pane 902, content pane 1002, and content pane 1102.

Figure 12:
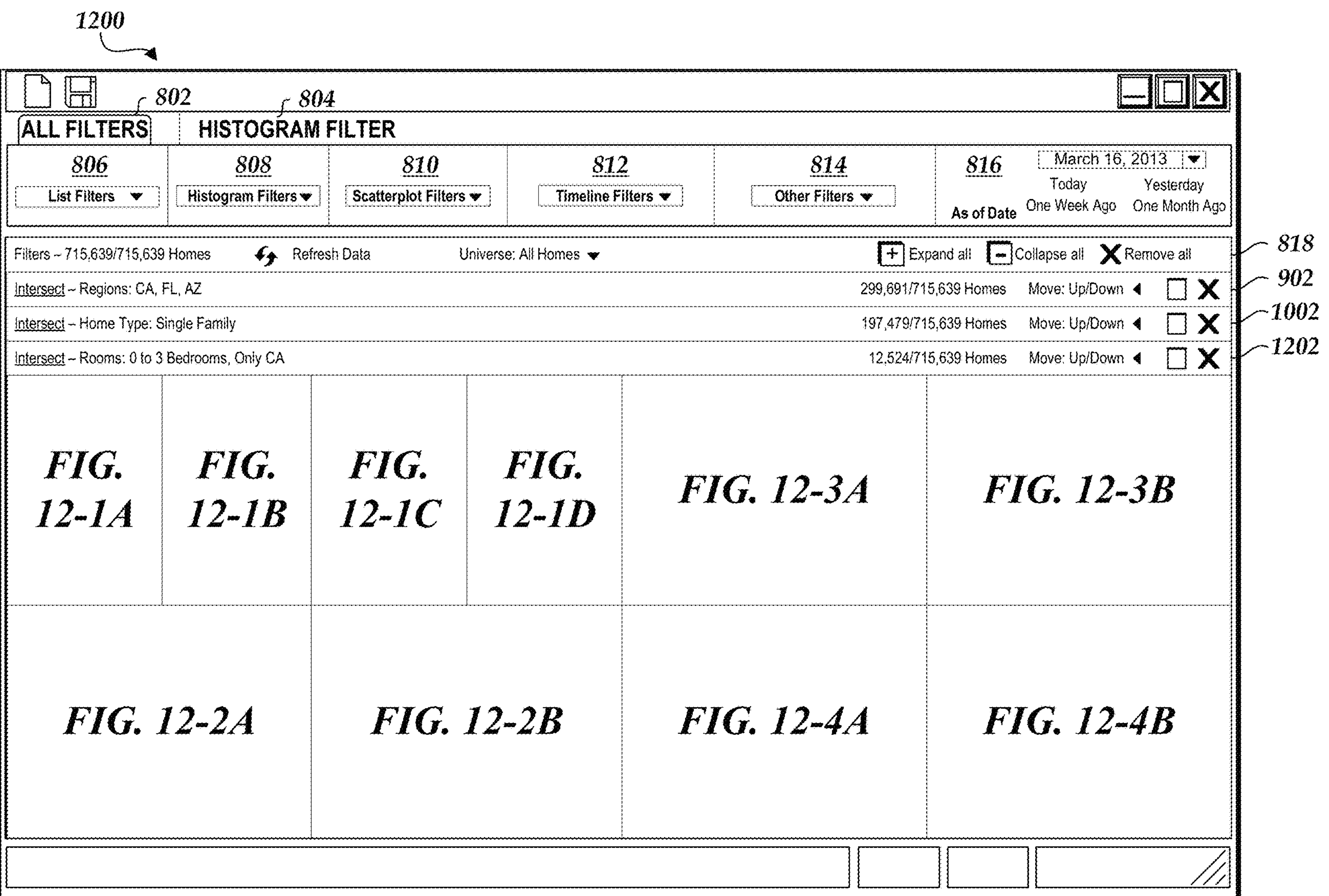
FIG. 12 illustrates another example GUI for a multipath explorer.
Figures 1A, 12:
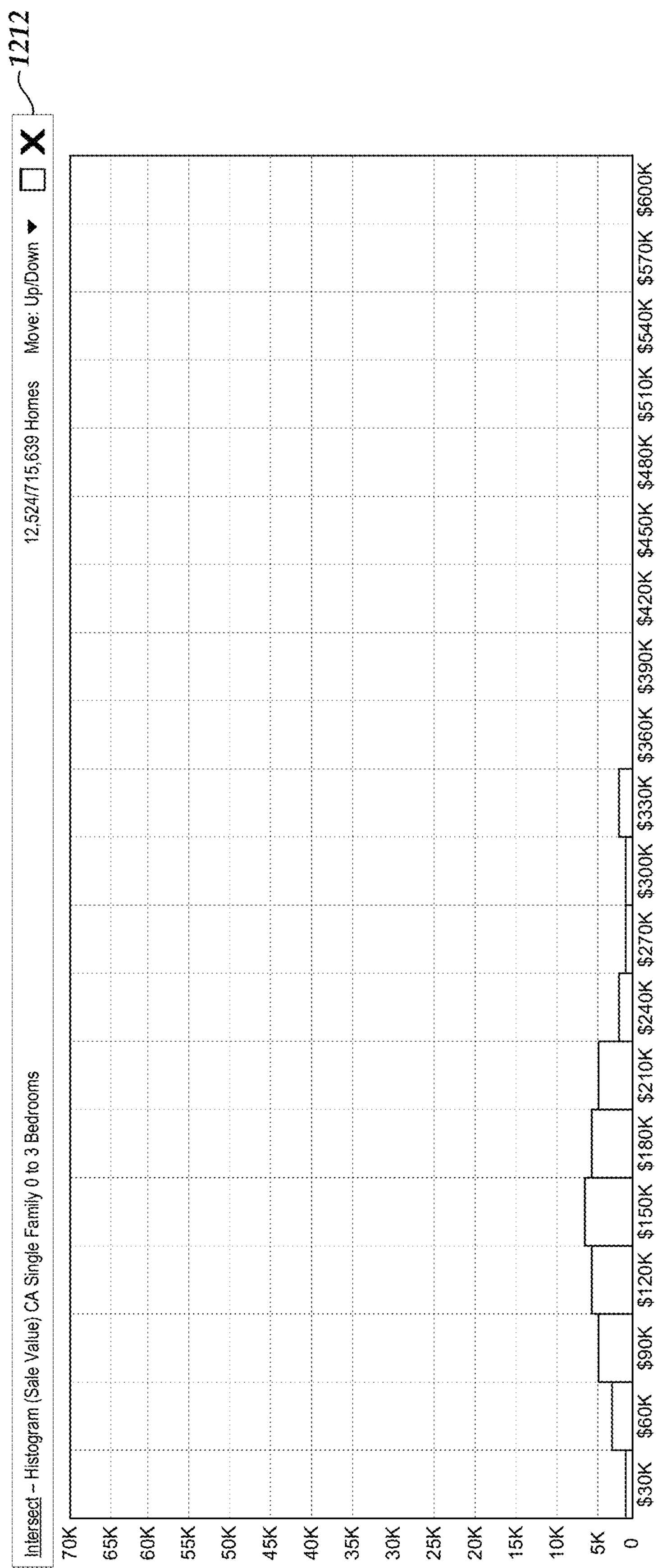
Figures 1B, 12:
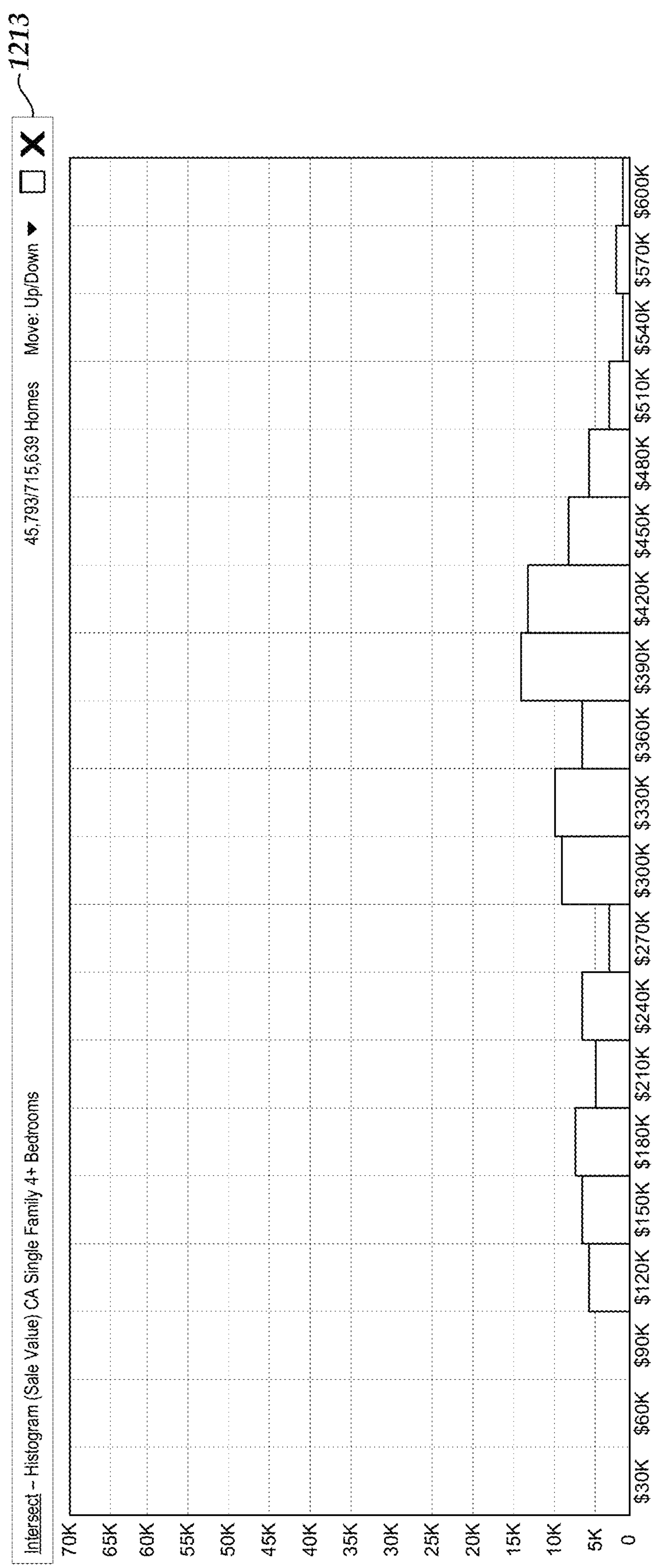
Figures 1C, 12:
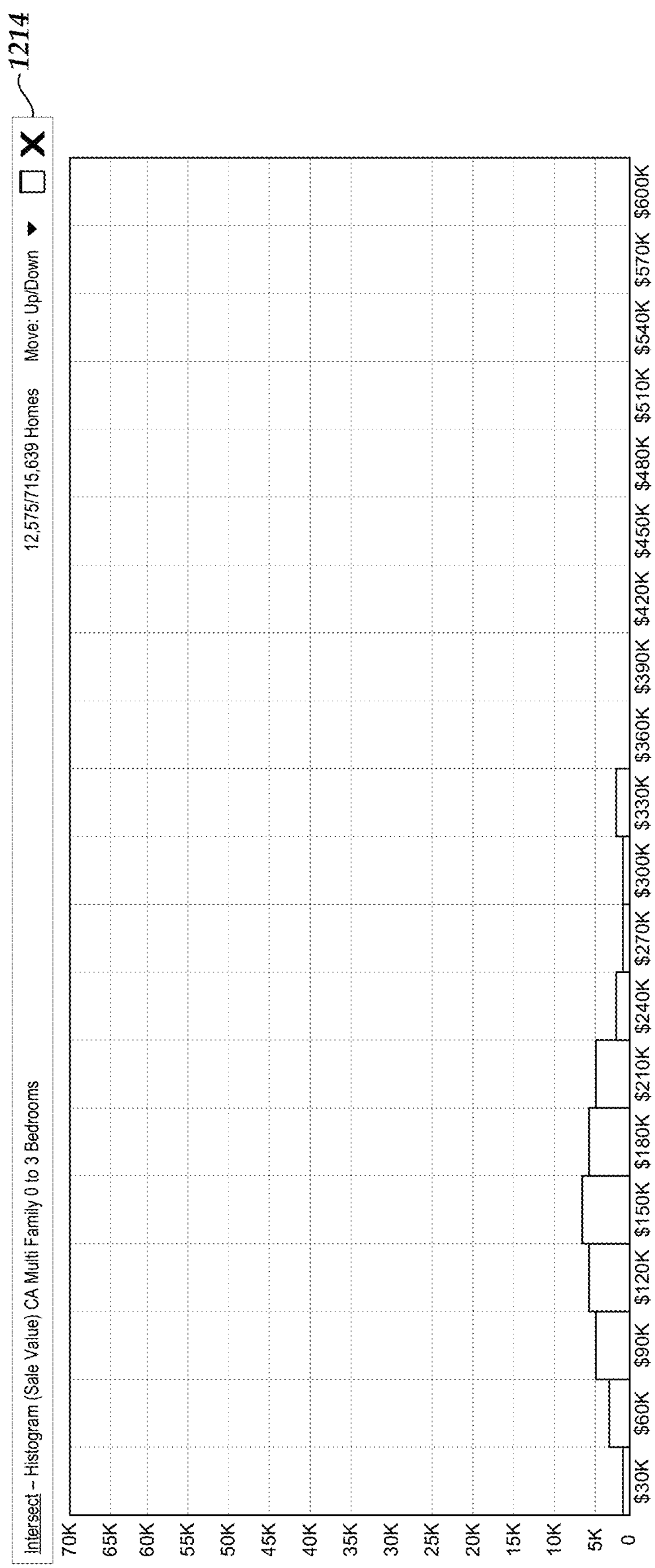
Figures 1D, 12:
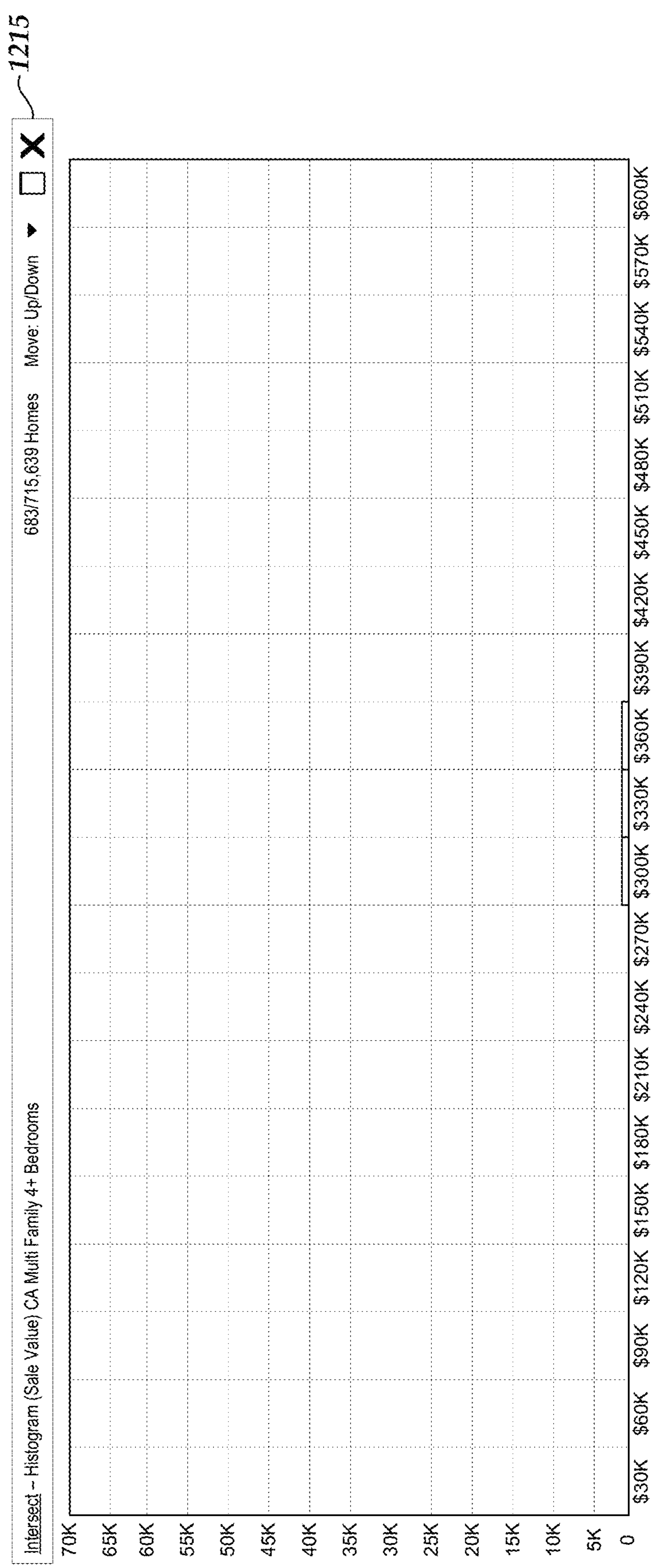
Figures 2A, 12:
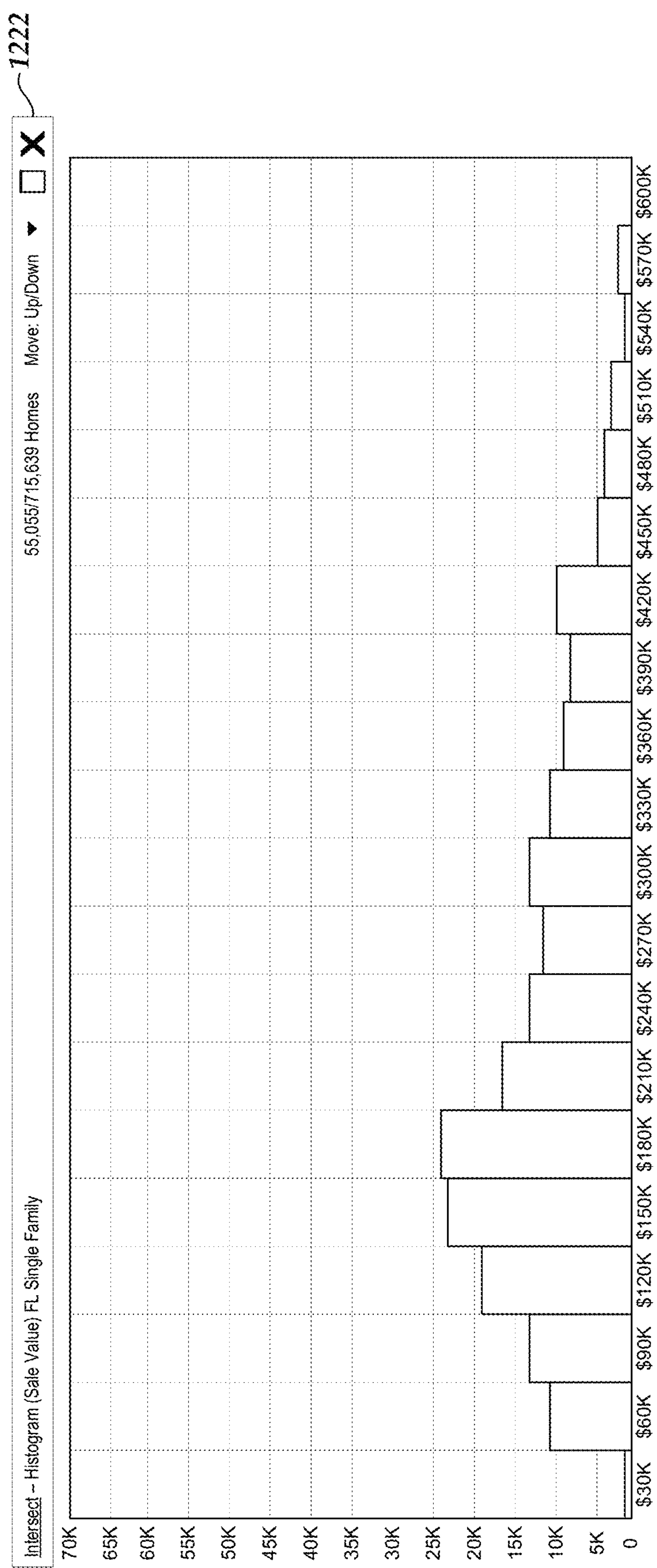
Figures 2B, 12:
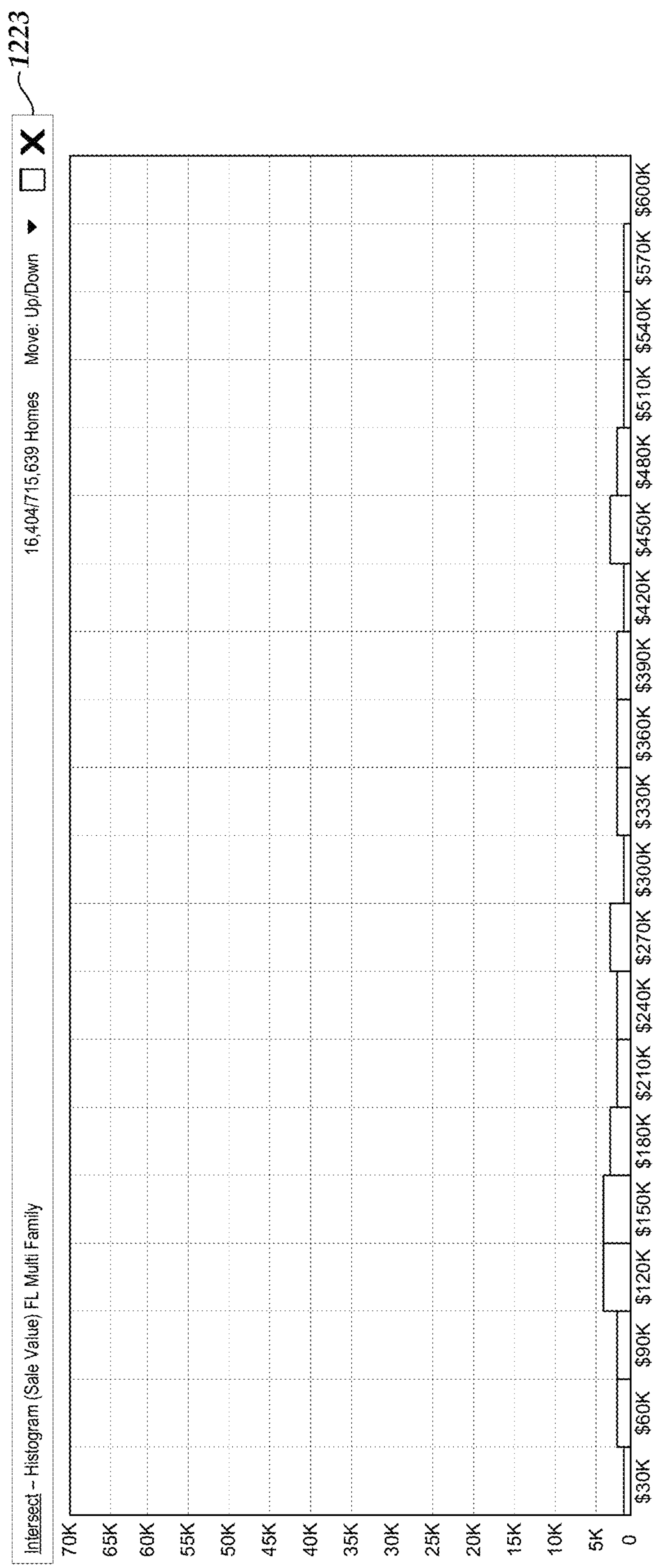
Figures 3A, 12:
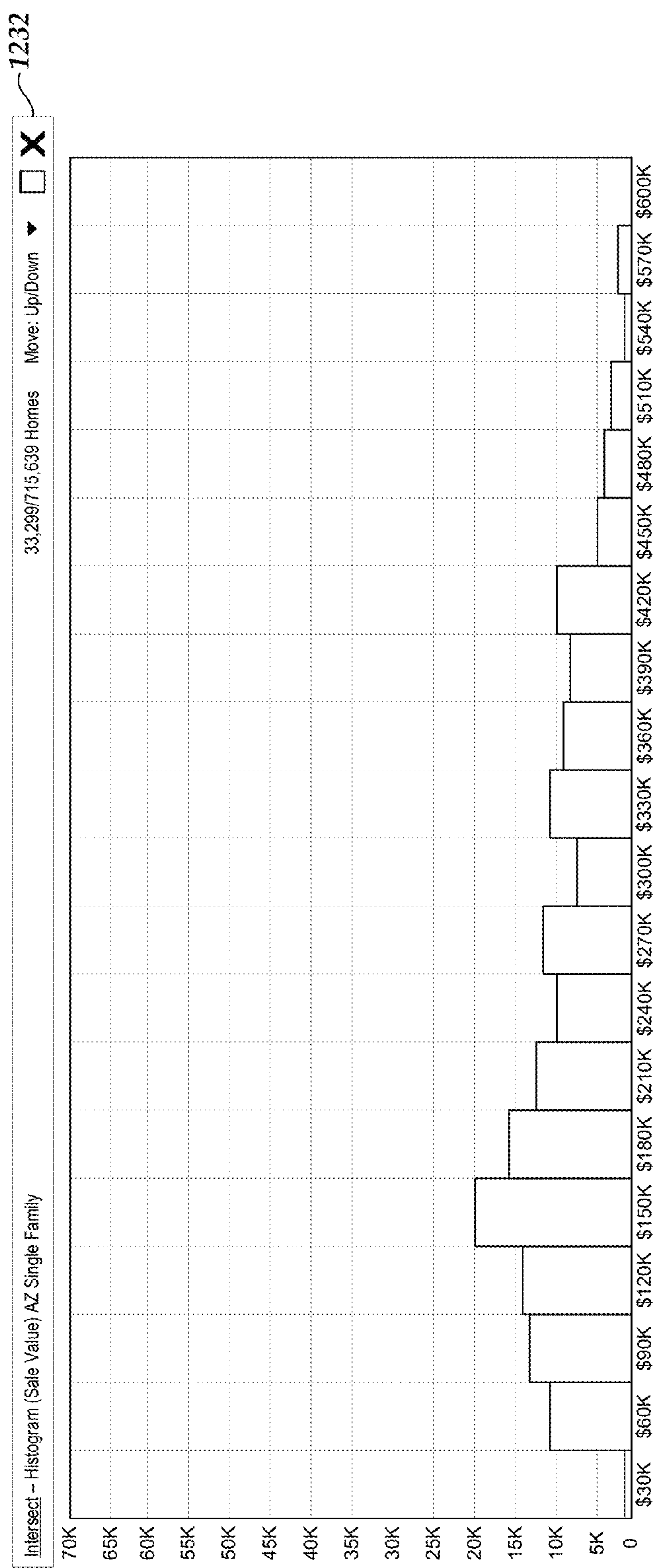
Figures 3B, 12:
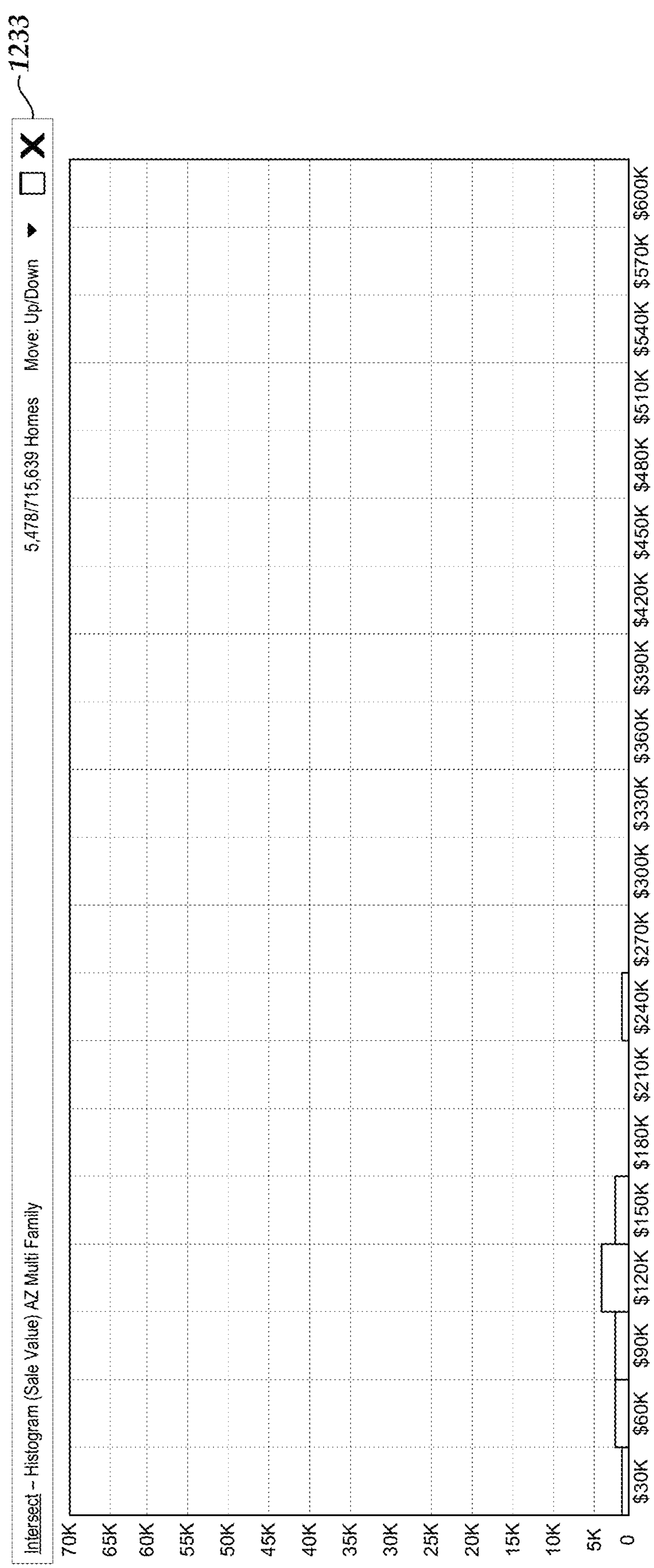
Figures 4A, 12:
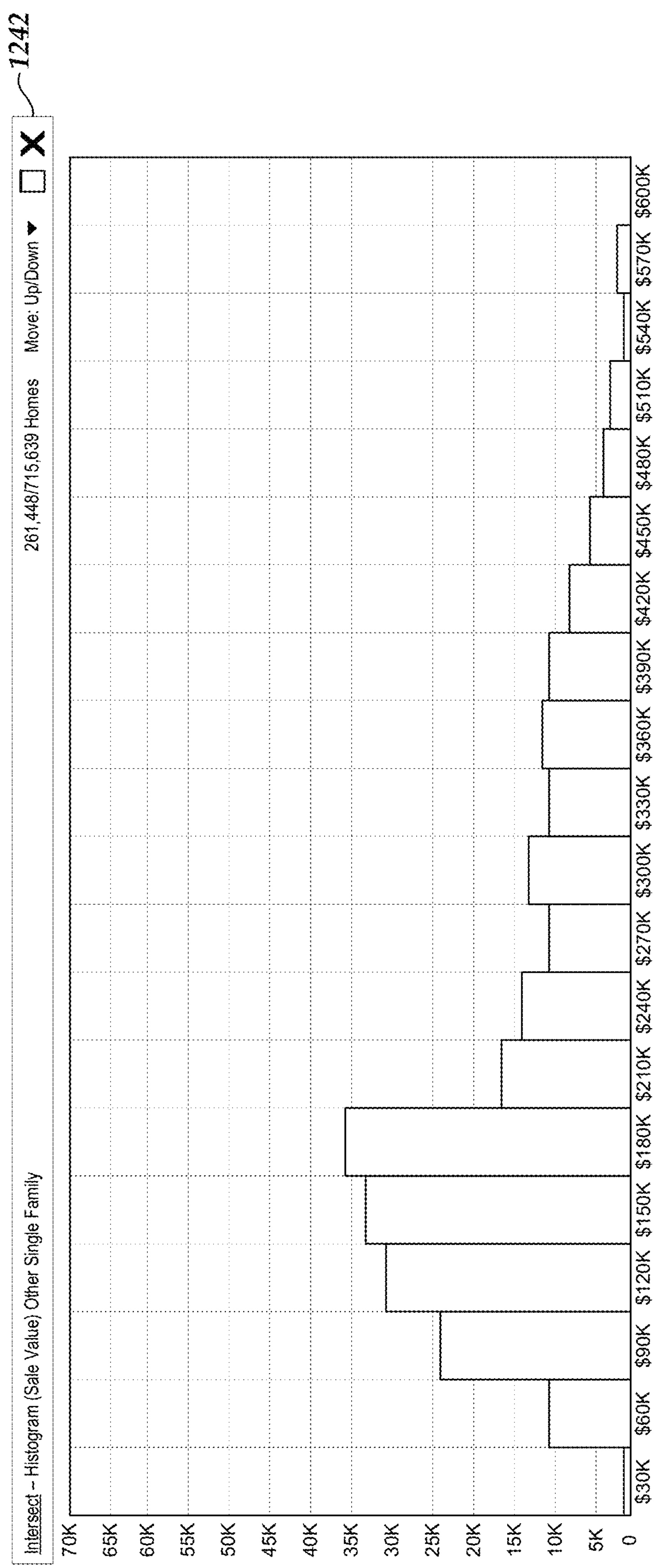
Figures 4B, 12:
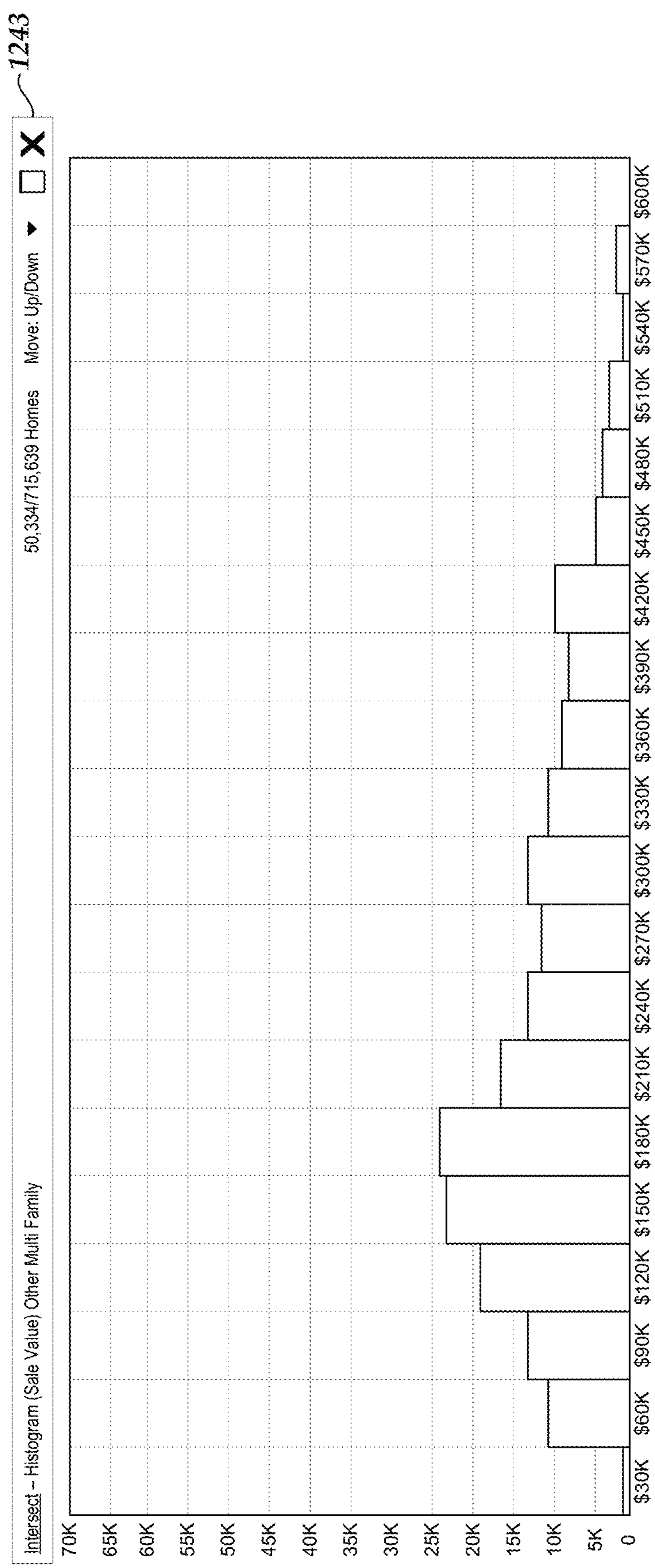

FIG. 12 illustrates another example graphical user interface (GUI) 1200 for a multipath explorer. As illustrated in FIG. 12, the GUI 1200 includes the all filters tab 802 and the histogram filter tab 804. While the GUI 1200 includes the all filters tab 802 and the histogram filter tab 804, this is not meant to be limiting as the GUI 1200 may include fewer or additional tabs, such as tabs associated with each of the filters discussed below.

As illustrated in FIG. 12, the GUI 1200 includes the content pane 818, the content pane 902, the content pane 1002, and a content pane 1202. In an embodiment, the content pane 1202 is similar to the content pane 1102 of FIG. 11. However, unlike the content pane 1102, which includes a filter that is applied to the inventory in content pane 1002, the content pane 1202 includes a filter that is only applied to a portion of the inventory in content pane 1002 such that 12,524 out of 715,639 homes satisfy the membership criteria embodied by the filter. For example, the membership criteria may apply only to homes in California (e.g., one of the three regions specified in the filter of content pane 902) and may specify that the homes must include a certain number of bedrooms (e.g., zero to three bedrooms).

As described above, the filter in content pane 902 creates four paths (e.g., four additional content panes). The filter in content pane 1002 creates two additional paths for each of the four paths created by the filter in content pane 902, resulting in eight total paths. The filter in content pane 1102 created two more paths for each of the eight paths created by the filter in content pane 1002, resulting in sixteen total paths. However, as described below, the filter in content pane 1202 is applied only to two of the eight paths created by the filter in content pane 1002, resulting in ten total paths.

Based on this membership criteria, ten additional content panes may be included in the GUI 1200. The first additional content pane is illustrated in FIG. 12-1A, the second in FIG. 12-1B, the third in FIG. 12-1C, the fourth in FIG. 12-1D, the fifth in FIG. 12-2A, the sixth in FIG. 12-2B, the seventh in FIG. 12-3A, the eight in FIG. 12-3B, the ninth in FIG. 12-4A, and the tenth in FIG. 12-4B. The additional content panes may display data that satisfies the membership criteria, data that satisfies some of the membership criteria, and data that does not satisfy the membership criteria.

FIG. 12-1A illustrates a content pane 1212 included in the GUI 1200 of FIG. 12. In an embodiment, the content pane 1212 includes a filter that is applied to the data in content pane 1202 such that 12,524 out of 715,639 homes satisfy the membership criteria embodied by the filter. For example, the membership criteria may specify that the data is to be displayed in a histogram and that the homes must be single family homes with zero to three bedrooms in California.

Thus, content pane 1212 displays data that satisfies the membership criteria originally specified in content pane 902, content pane 1002, and content pane 1202.

FIG. 12-1B illustrates another content pane 1213 included in the GUI 1200 of FIG. 12. In an embodiment, the content pane 1213 includes a filter that is applied to the data in content pane 1202 such that 45,793 out of 715,639 homes are identified as not satisfying the membership criteria embodied by the filter. For example, the membership criteria may specify that the data is to be displayed in a histogram and that the homes must be single family homes not with zero to three bedrooms in California (e.g., must be single family homes with four or more bedrooms in California). Thus, content pane 1213 displays data that satisfies the membership criteria originally specified in content pane 902 and content pane 1002 and that does not satisfy the membership criteria originally specified in content pane 1202.

FIG. 12-1C illustrates another content pane 1214 included in the GUI 1200 of FIG. 12. In an embodiment, the content pane 1214 includes a filter that is applied to the data in content pane 1202 such that 12,575 out of 715,639 homes are identified as not satisfying the membership criteria embodied by the filter. For example, the membership criteria may specify that the data is to be displayed in a histogram and that the homes must not be single family homes with zero to three bedrooms in California (e.g., must be multi family homes with zero to three bedrooms in California). Thus, content pane 1214 displays data that satisfies the membership criteria originally specified in content pane 902 and content pane 1202 and that does not satisfy the membership criteria originally specified in content pane 1002.

FIG. 12-1D illustrates another content pane 1215 included in the GUI 1200 of FIG. 12. In an embodiment, the content pane 1215 includes a filter that is applied to the data in content pane 1202 such that 683 out of 715,639 homes are identified as not satisfying the membership criteria embodied by the filter. For example, the membership criteria may specify that the data is to be displayed in a histogram and that the homes must not be single family homes in California and must not include zero to three bedrooms (e.g., must be multi family homes with four or more bedrooms in California). Thus, content pane 1215 displays data that satisfies the membership criteria originally specified in content pane 902 and does not satisfy the membership criteria originally specified in content pane 1002 and content pane 1202.

FIG. 12-2A illustrates another content pane 1222 included in the GUI 1200 of FIG. 12. In an embodiment, the content pane 1222 includes a filter that is applied to the data in content pane 1002 such that 55,055 out of 715,639 homes satisfy the membership criteria embodied by the filter. For example, the membership criteria may specify that the data is to be displayed in a histogram and that the homes must be single family homes in Florida. Thus, content pane 1222 displays data that satisfies the membership criteria originally specified in content pane 902 and content pane 1002.

FIG. 12-2B illustrates another content pane 1223 included in the GUI 1200 of FIG. 12. In an embodiment, the content pane 1223 includes a filter that is applied to the data in content pane 1002 such that 16,404 out of 715,639 homes are identified as not satisfying the membership criteria embodied by the filter. For example, the membership criteria may specify that the data is to be displayed in a histogram and that the homes must not be single family homes in Florida (e.g., must be multi family homes in Florida). Thus, content pane 1223 displays data that satisfies the membership criteria originally specified in content pane 902 and that does not satisfy the membership criteria originally specified in content pane 1002.

FIG. 12-3A illustrates another content pane 1232 included in the GUI 1000 of FIG. 10. In an embodiment, the content pane 1232 includes a filter that is applied to the data in content pane 1002 such that 33,299 out of 715,639 homes satisfy the membership criteria embodied by the filter. For example, the membership criteria may specify that the data is to be displayed in a histogram and that the homes must be single family homes in Arizona. Thus, content pane 1232 displays data that satisfies the membership criteria originally specified in content pane 902 and content pane 1002.

FIG. 12-3B illustrates another content pane 1233 included in the GUI 1200 of FIG. 12. In an embodiment, the content pane 1333 includes a filter that is applied to the data in content pane 1002 such that 5,478 out of 715,639 homes are identified as not satisfying the membership criteria embodied by the filter. For example, the membership criteria may specify that the data is to be displayed in a histogram and that the homes must not be single family homes in Arizona (e.g., must be multi family homes in Arizona). Thus, content pane 1233 displays data that satisfies the membership criteria originally specified in content pane 902 and that does not satisfy the membership criteria originally specified in content pane 1002.

FIG. 12-4A illustrates another content pane 1242 included in the GUI 1200 of FIG. 12. In an embodiment, the content pane 1242 includes a filter that is applied to the data in content pane 1002 such that 261,448 out of 715,639 homes are identified as not satisfying the membership criteria embodied by the filter. For example, the membership criteria may specify that the data is to be displayed in a histogram and that the homes must be single family homes not in California, Florida, or Arizona. Thus, content pane 1242 displays data that does not satisfy the membership criteria originally specified in content pane 902 and that does satisfy the membership criteria originally specified in content pane 1002.

FIG. 12-4B illustrates another content pane 1243 included in the GUI 1200 of FIG. 12. In an embodiment, the content pane 1243 includes a filter that is applied to the data in content pane 1002 such that 50,334 out of 715,639 homes are identified as not satisfying the membership criteria embodied by the filter. For example, the membership criteria may specify that the data is to be displayed in a histogram, that the homes must not be single family homes, and that the homes must not be in California, Florida, or Arizona (e.g., must be multi family homes locations other than California, Florida, or Arizona). Thus, content pane 1243 displays data that does not satisfy the membership criteria originally specified in content pane 902 and content pane 1002.

In an embodiment, the data displayed in the various content panes described herein is updated dynamically as new data is entered, updated, deleted, and/or otherwise changed. In a further embodiment, the data displayed in the various content panes described herein is updated if the user selects the refresh data button illustrated in content pane 818.

As described above, one or more child nodes can be combined to form a parent node. For example, the GUI 800, 900, 1000, 1100, and/or 1200 may include functionality to allow a user to combine one or more child content panes to form a master content pane. The data displayed in the master content pane may be based on one or more common attributes of the data displayed in the child content panes. The master content pane may be positioned as a parent of the one or more child content panes in the content pane hierarchy or may be positioned as a child of the one or more child content panes in the content pane hierarchy. The data displayed in the child content panes may or may not be derived from a common data set. For example, the data displayed in the child content panes may be subsets of a data set that includes loan values for homes. As another example, the data displayed in a first child content pane may be a subset of a data set that includes loan values for homes and the data displayed in a second child content pane may be a subset of a data set that includes sales prices for homes.

In a further embodiment, not shown, the GUI 800, 900, 1000, 1100, and/or 1200 includes functionality to allow a user to transform a data set from a first object type to a second object type. For example, a data set may include homes having a default mortgage and the content panes may display documents (e.g., the mortgages) according to one of the views described herein. The data set may be transformed into new objects, such as real estate agents associated with those homes, so that the content panes then display persons (e.g., the real estate agents) according to one of the views described herein. Additional content panes may then be generated based on the real estate agent data set (e.g., a new membership criteria may require that the names of real estate agents must appear three or more times).

In a further embodiment, the GUI 800, 900, 1000, 1100, and/or 1200 includes functionality to allow a user to save a filtered or defiltered data set as a new object series (e.g., one or more of the membership criteria and the order in which they are used in determining how to display data in the content panes). The user may be able to title the new object series. The new object series may be shared with other users, or restricted from other users viewing. The new object series may also be used in later analysis or filtering. For example, the new object series may be applied to the same data set at a later time (e.g., after the data set has been updated). As another example, the new object series may be applied to a different data set. When applying the new object series to the different data set, the content panes may be created and displayed in the same or similar hierarchy as the content panes of the saved data set.

In a further embodiment, not shown, one or more reports can be generated based on the data displayed in one or more content panes. The reports may be generated in any suitable format (e.g., .doc, .xls, .pdf, etc.). For example, a report may include text based on the data displayed in one or more content panes. As another example, a report may include a visual representation of the data in the data set, such as in a manner similar to or the same as the manner in which data is displayed in one or more content panes (e.g., the report may look similar to the view provided by GUI 800, 900, 1000, 1100, and/or 1200).

In a further embodiment, not shown, the various content panes in the GUI 800, 900, 1000, 1100, and/or 1200 are color coded. The content panes may be color coded based on a metric or attribute (e.g., magnitude, name, value, etc.) determined by the user. For example, if the output of a content pane are numbers (e.g., home loan values), then content panes with loan values in a high range may appear red and content panes with loan values in a low range may appear blue.

Example Node Combination and Object Transformation

Figure 13A:
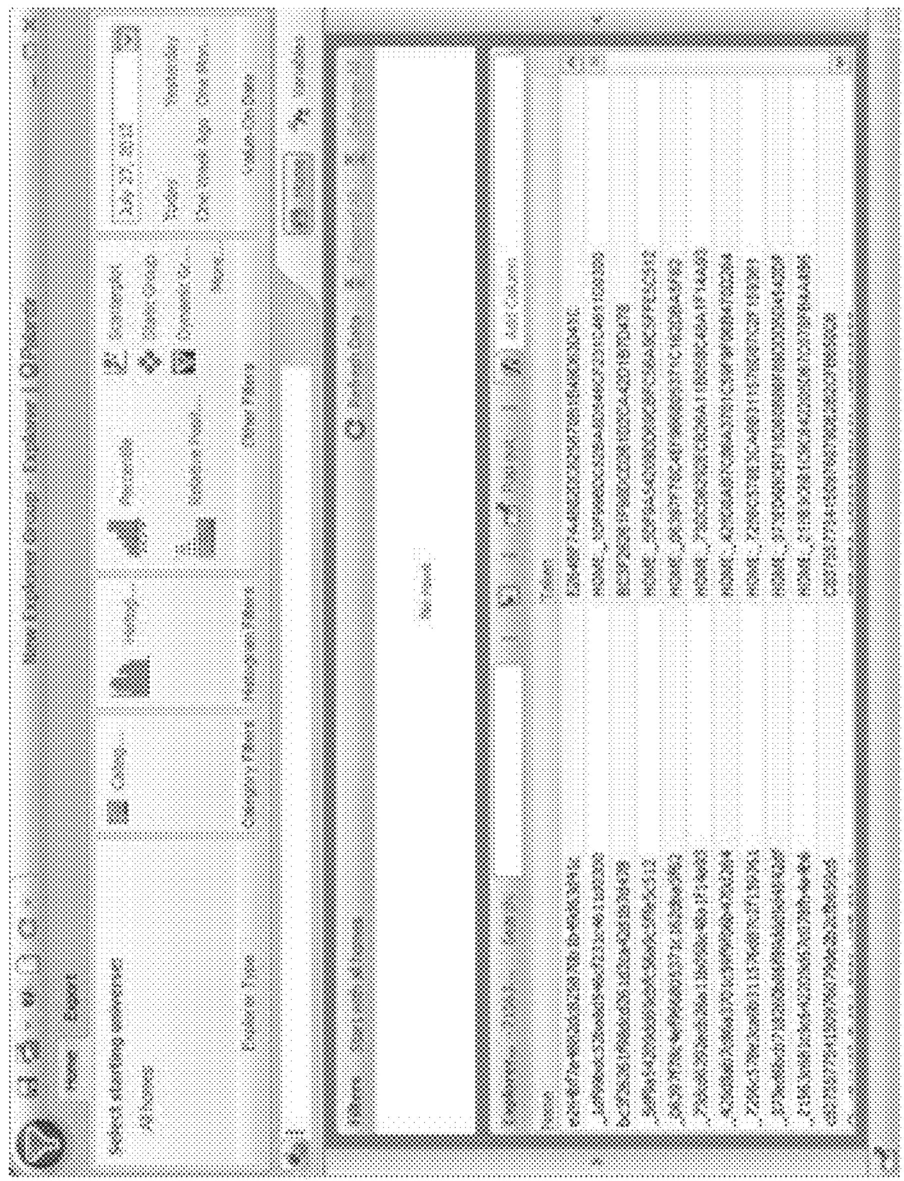
FIG. 13A illustrates an example GUI for selecting a starting set of inventory.

FIG. 13A illustrates an example graphical user interface (GUI) 1300 for selecting a starting set of inventory. As illustrated in FIG. 13A, a starting set of inventory is selected (e.g., indicated by the word "all" followed by an object type). For example, the starting set of inventory may include all homes.

Figure 13B:
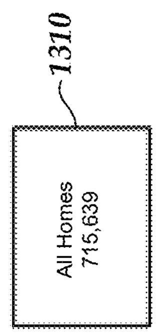
FIG. 13B illustrates a box that represents the starting set of inventory

FIG. 13B illustrates a box 1310 that represents the starting set of inventory. In some embodiments, the size of the box 1310 is determined by the content (e.g., the font becomes smaller to fit more content if needed). In other embodiments, the size of the box 1410 is fixed at a default starting size. As described above, the box 1310 may be copied, dragged (e.g., to change order or location), resized, and/or rotated by the user. The content of the box 1310 may likewise be copied, dragged, resized, and/or rotated by the user. In addition, the contents of the box 1310 may be enlarged or shrunken (e.g., zoom in, zoom out) by the user and the box 1310 may be deleted by the user.

Figure 13C:
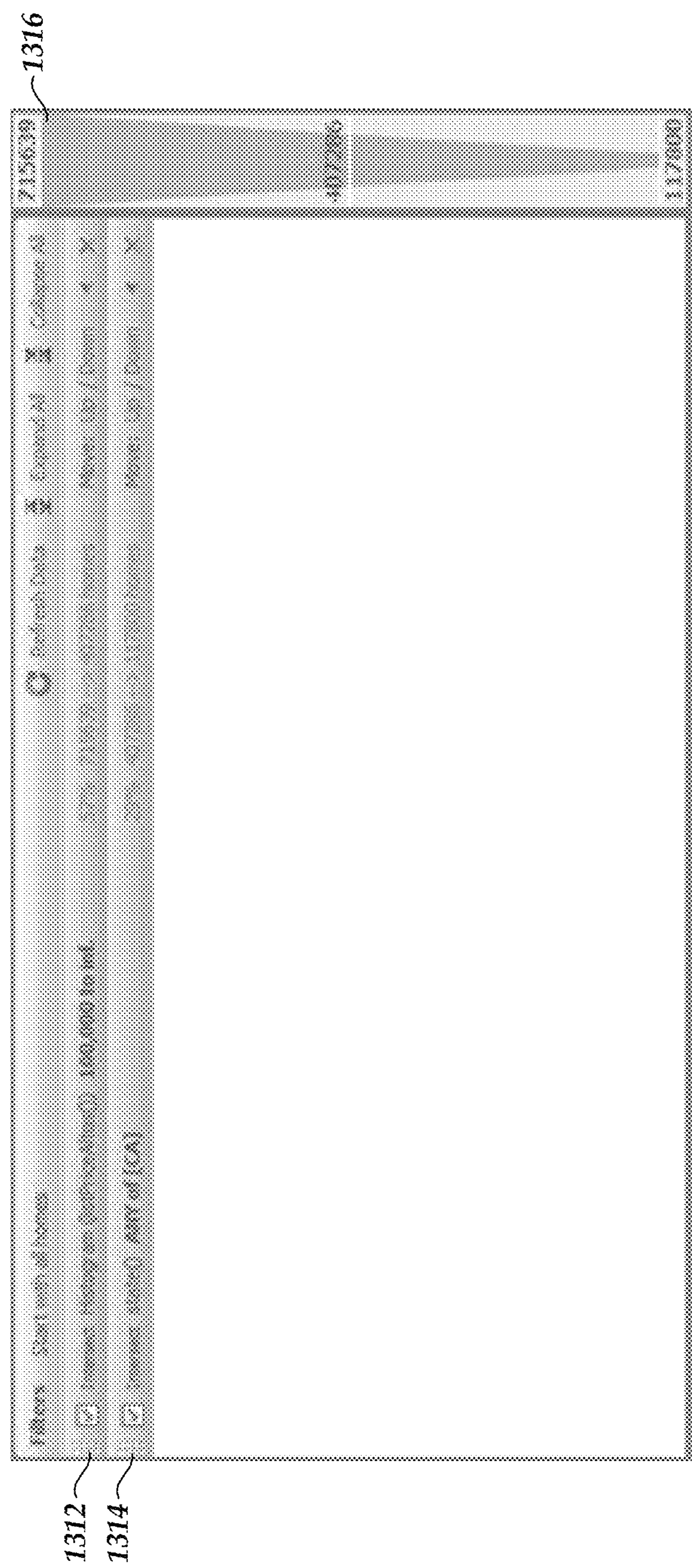
FIG. 13C illustrates a first filter and a second filter that are applied to the starting set of inventory.

FIG. 13C illustrates a first filter 1312 and a second filter 1314 that are applied to the starting set of inventory. In an embodiment, the first filter 1312 specifies that the homes must have a first list price greater than or equal to 100,000 and be displayed in a histogram. In an embodiment, the second filter 1314 specifies that the homes must be in California. As illustrated in FIG. 13C, the first filter 1312, when applied to the starting set of inventory, identifies 407,286 out of 715,639 homes that satisfy the first filter 1312 membership criteria. As illustrated in FIG. 13C, the second filter 1314, when applied to the 407,286 homes, identifies 117,800 out of 715,639 homes that satisfy the first filter 1312 membership criteria and the second filter 1314 membership criteria. The pairing of the starting set of inventory from 715,639 homes to 407,286 homes to 117,800 homes may be graphically represented via diagram 1316.

Figure 13D:
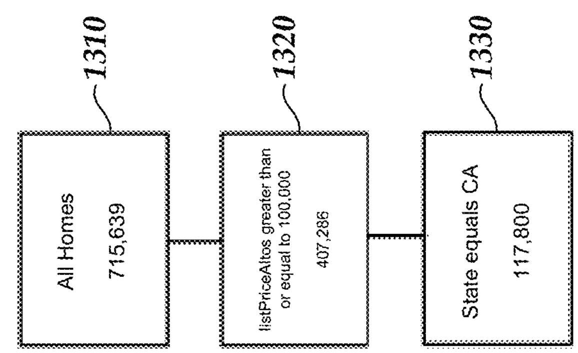
FIG. 13D illustrates the box of FIG. 13B, a second box, which represents a subset of the starting set of inventory based on the first filter membership criteria, and a third box, which represents a subset of the starting set of inventory based on the first filter membership criteria and the second filter membership criteria.
Figure 13E:
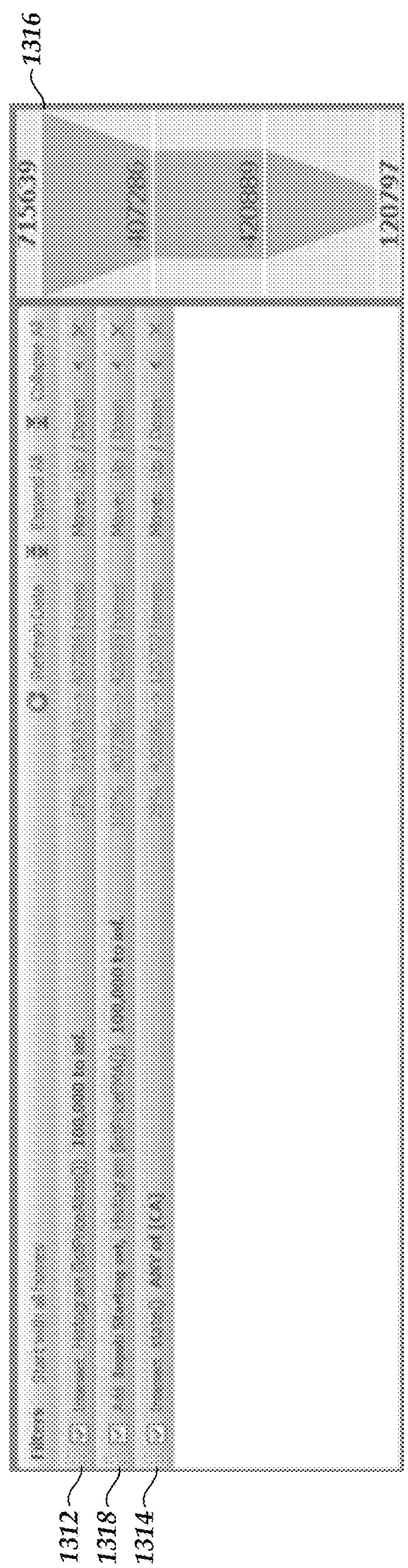
FIG. 13E illustrates an add filter that is applied to the starting set of inventory.
Figure 13F:
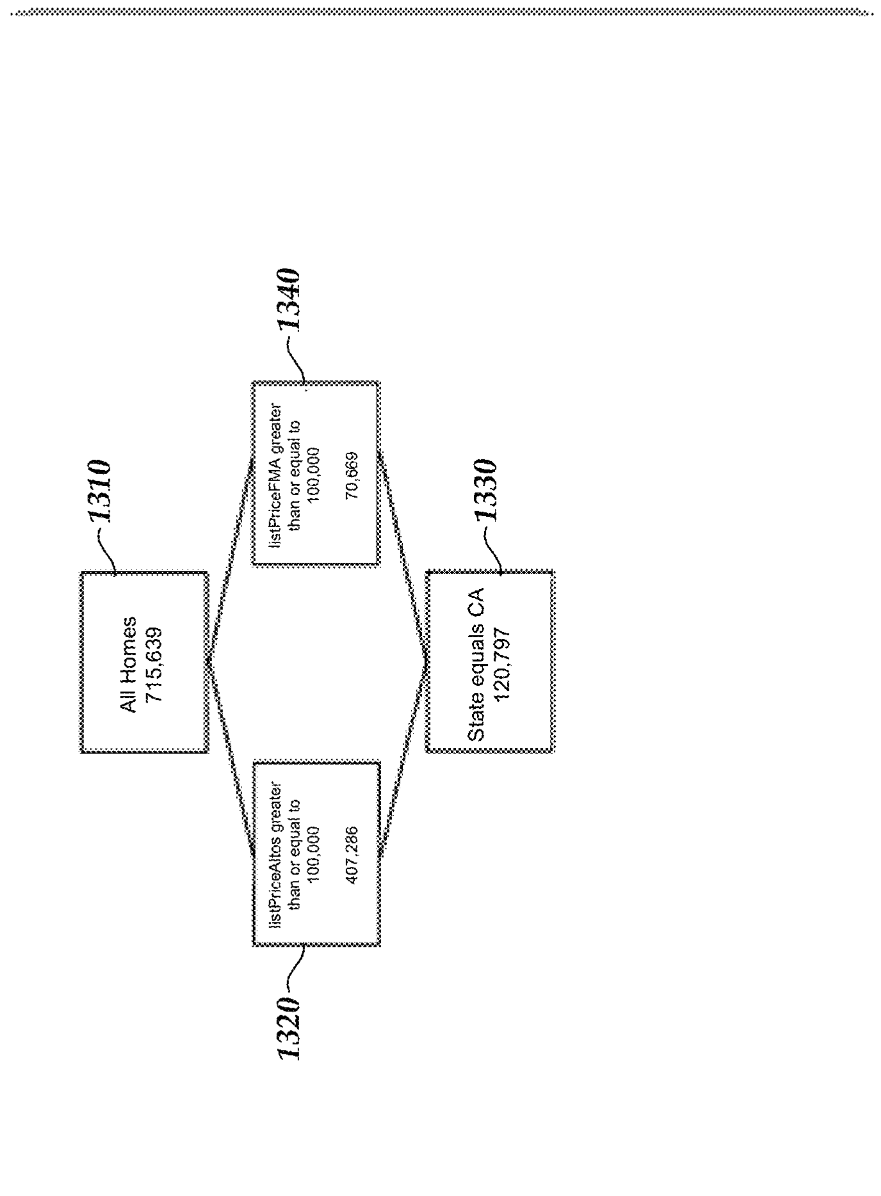
FIG. 13F illustrates the box of FIG. 13B, the boxes of FIG. 13D, and a fourth box, which represents a subset of the starting set of inventory based on the add filter membership criteria.
Figure 13G:
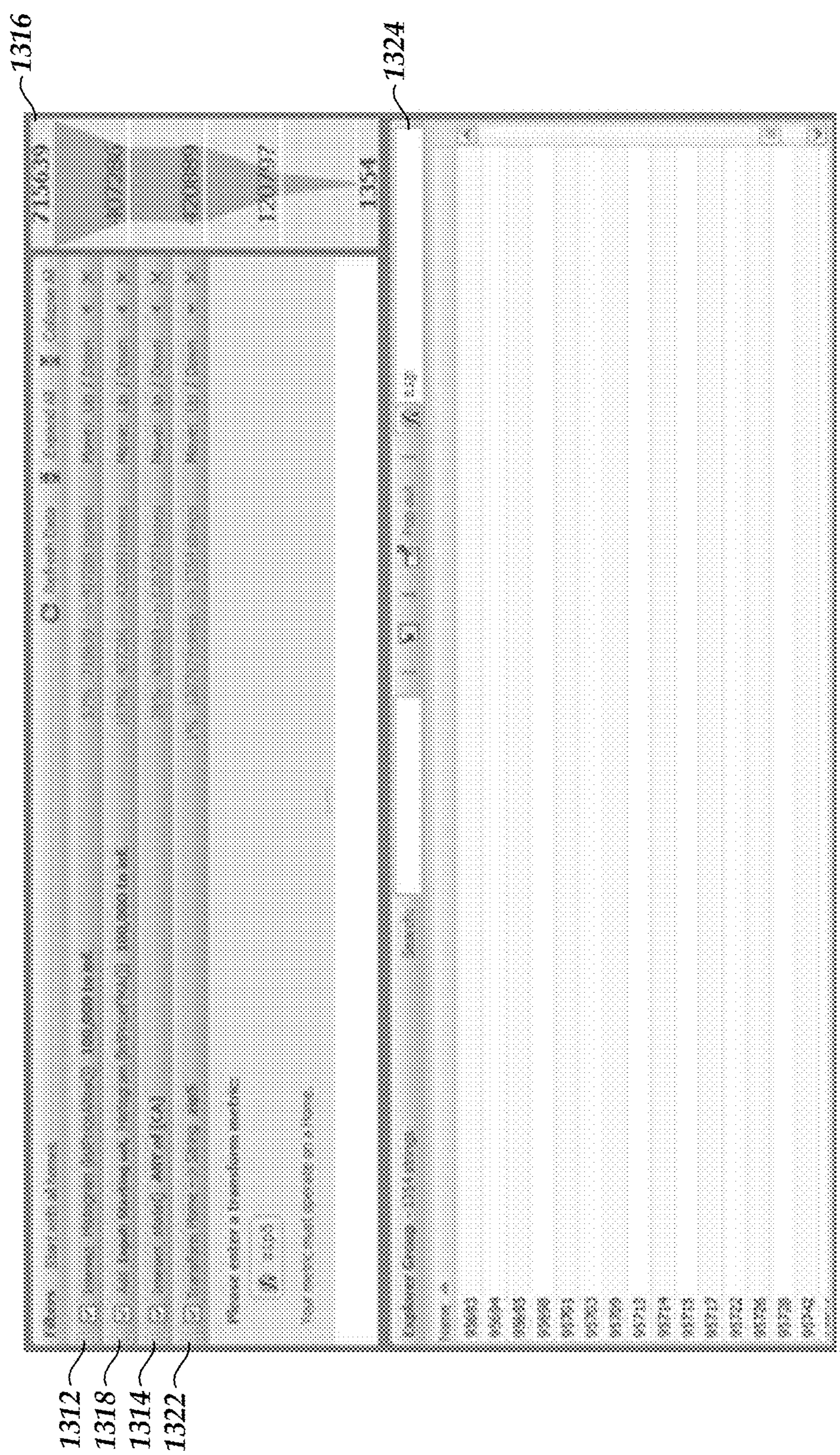
FIG. 13G illustrates a transform filter that is applied to the subset of data that results from applying the second filter of FIG. 13C.
Figure 13H:
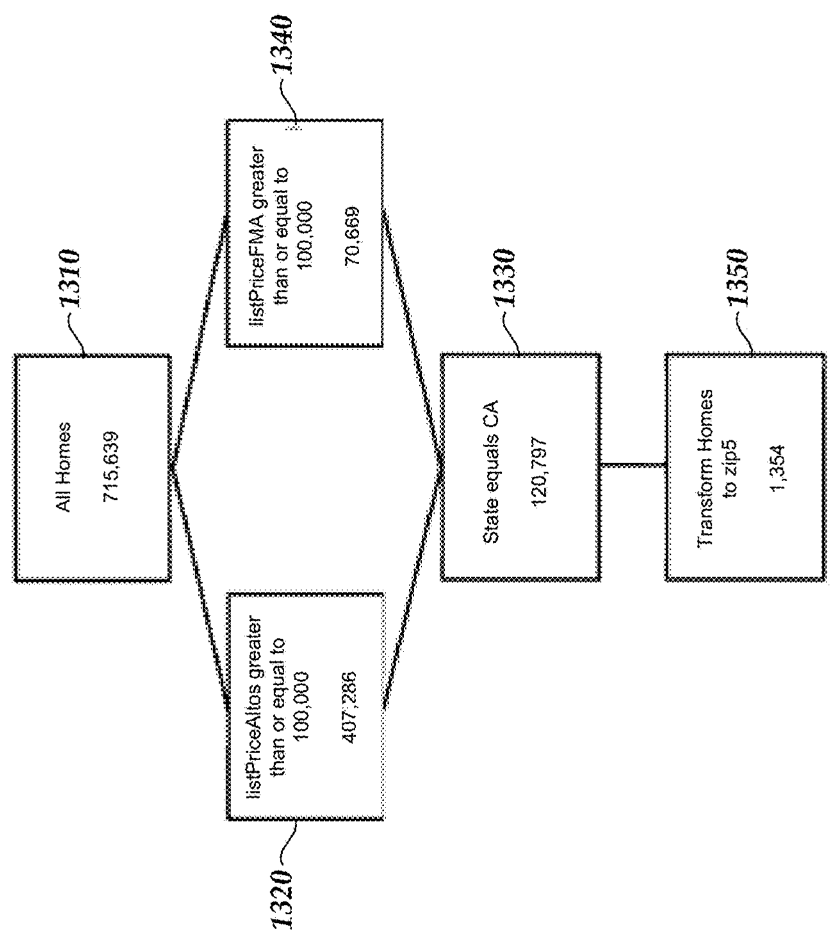
FIG. 13H illustrates the box of FIG. 13B, the boxes of FIG. 13D, the box of FIG. 13F, and a fifth box, which represents a subset of the starting set of inventory based on the first filter membership criteria, the add filter membership criteria, the second filter membership criteria, and the transform filter membership criteria.

FIG. 13D illustrates the box 1310, which represents the starting set of inventory, a box 1320, which represents a subset of the starting set of inventory based on the first filter 1312 membership criteria, and a box 1330, which represents a subset of the starting set of inventory based on the first filter 1312 membership criteria and the second filter 1314 membership criteria. The boxes 1320, and/or 1330 may have the same properties as the properties of box 1310 described above.

FIG. 13E illustrates an add filter 1318 that is applied to the starting set of inventory. In an embodiment, the add filter 1318 specifies that the homes must have a second list price greater than or equal to 100,000 and be displayed in a histogram. As illustrated in FIG. 13E, the add filter 1318, when applied to the starting set of inventory, identifies 420,889 out of 715,639 homes that satisfy the add filter 1318 membership criteria. As illustrated in FIG. 13E, the second filter 1314 is then applied to the subset of data that results from applying the first filter 1312 and to the subset of data that results from applying the add filter 1318. In other words, as described above, the second filter 1314 is used to identify common attributes within the subset of data that results from applying the first filter 1312 and the subset of data that results from applying the add filter 1318 (e.g., the common attributes being that the homes are in California). The add filter 1318, when applied to the 407,286 homes and the 420,889 homes, identifies 120,797 out of 715,639 homes that satisfy the first filter 1312 membership criteria and the second filter 1314 membership criteria and the add filter 1318 membership criteria and the second filter 1314 membership criteria. The pairing of the starting set of inventory from 715,639 homes to 407,286 homes to 420,889 homes to 120,797 homes may be graphically represented via the diagram 1316.

FIG. 13F illustrates the box 1310, which represents the starting set of inventory, the box 1320, which represents a subset of the starting set of inventory based on the first filter 1312 membership criteria, the box 1330, which represents a subset of the starting set of inventory based on the first filter 1312 membership criteria, the add filter 1318 membership criteria, and the second filter 1314 membership criteria, and a box 1340, which represents a subset of the starting set of inventory based on the add filter 1318 membership criteria. The box 1340 may have the same properties as the properties of box 1310 described above.

FIG. 13G illustrates a transform filter 1322 that is applied to the subset of data that results from applying the second filter 1314. In an embodiment, the transform filter 1322 transforms the subset of data that results from applying the second filter 1314 from a first object type into a second object type. The second object type may be specified by the user via an entry in text field box 1324 (e.g., the user may specify a transform metric in the text field box 1324). As an example, the transform filter 1322, when applied to the 120,797 homes, identifies 1,354 out of 715,639 homes that satisfy the first filter 1312 membership criteria, the second filter 1314 membership criteria, and the transform filter 1322 membership criteria and the add filter 1318 membership criteria, the second filter 1314 membership criteria, and the transform filter 1322 membership criteria. The pairing of the starting set of inventory from 715,639 homes to 407,286 homes to 420,889 homes to 120,797 homes to 1,354 home may be graphically represented via the diagram 1316.

FIG. 13H illustrates the box 1310, which represents the starting set of inventory, the box 1320, which represents a subset of the starting set of inventory based on the first filter 1312 membership criteria, the box 1330, which represents a subset of the starting set of inventory based on the first filter 1312 membership criteria, the add filter 1318 membership criteria, and the second filter 1314 membership criteria, the box 1340, which represents a subset of the starting set of inventory based on the add filter 1318 membership criteria, and a box 1350, which represents a subset of the starting set of inventory based on the first filter 1312 membership criteria, the add filter 1318 membership criteria, the second filter 1314 membership criteria, and the transform filter 1322 membership criteria. The box 1350 may have the same properties as the properties of box 1310 described above.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

For example, FIG. 14 is a block diagram that illustrates a computer system 1400 upon which an embodiment may be implemented. Computer system 1400 includes a bus 1402 or other communication mechanism for communicating information, and a hardware processor, or multiple processors, 1404 coupled with bus 1402 for processing information. Hardware processor(s) 1404 may be, for example, one or more general purpose microprocessors.

Computer system 1400 also includes a main memory 1406, such as a random access memory (RAM), cache and/or other dynamic storage devices, coupled to bus 1402 for storing information and instructions to be executed by processor 1404. Main memory 1406 also may be used for storing temporary variables or other intermediate information during execution of instructions to be executed by processor 1404. Such instructions, when stored in storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk, optical disk, or USB thumb drive (Flash drive), etc., is provided and coupled to bus 1402 for storing information and instructions.

Computer system 1400 may be coupled via bus 1402 to a display 1412, such as a cathode ray tube (CRT) or LCD display (or touch screen), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor(s) 1404 executing one or more sequences of one or more instructions contained in main memory 1406. Such instructions may be read into main memory 1406 from another storage medium, such as storage device 1410. Execution of the sequences of instructions contained in main memory 1406 causes processor(s) 1404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1410. Volatile media includes dynamic memory, such as main memory 1406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN (or WAN component to communicated with a WAN). Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computing system comprising:

non-transitory computer storage storing a plurality of data objects; and one or more computing devices programmed, via executable code instructions, to:

apply a first filter to the plurality of data objects, the plurality of data objects including a starting quantity of data objects, to determine:

a first set of data objects from the plurality of data objects that satisfy the first filter, the first set including a first quantity of data objects;

apply a second filter to the plurality of data objects to determine:

a second set of data objects from the plurality of data objects that satisfy the second filter, the second set including a second quantity of data objects;

apply a third filter to the first and the second sets of data objects to determine:

a third set of data objects from both the first and the second set of data objects that satisfy the third filter, the third set including a third quantity of data objects;

apply a transform filter to the third set of data objects to determine:

a set of object properties from a property associated with each respective data object in the third set of data objects; and generate or update a user interface to include:

concurrent graphical representations of:

a first segment having a top width representative of the starting quantity and a bottom width representative of the first quantity;

a second segment positioned adjacent and below the first segment, the second segment having a top width representative of the first quantity and a bottom width representative of the second quantity; and wherein the graphical representation includes a selectable control associated with the first segment and, in response to user selection of the selectable control, an order of filtering is adjusted so that the second filter is applied prior to the first filter, causing updates to the graphical representation so that:

the top width of the first segment is representative of the starting quantity and the bottom width of the first segment is representative of the second quantity, and the top width of the second segment is representative of the second quantity and the bottom width of the second segment is representative of the first quantity; and concurrent graphical representations of:

a root node indicating a root quantity of objects in the plurality of data objects;

a first node associated with the first filter and indicating the first quantity, wherein the first node is displayed as linked to the root node;

a second node associated with the second filter and indicating the second quantity, wherein the second node is displayed as linked to the root node;

a third node associated with the third filter and indicating the third quantity, wherein the third node is displayed as linked to the first and second nodes; and a fourth node associated with the transform filter and indicating a quantity of unique object properties in the set of object properties, wherein the fourth node is displayed as linked to the third node;

wherein the first node is selectable to initiate display of one or more of a first list or a first graph associated with the first set of data objects;

wherein the second node is selectable to initiate display of one or more of a second list or a second graph associated with the second set of data objects;

wherein the third node is selectable to initiate display of one or more of a third list or a third graph associated with the third set of data objects; and wherein the fourth node is selectable to initiate display of one or more of a fourth list or a fourth graph associated with the set of object properties.

2. The computing system of claim 1, wherein each data object of the plurality of data objects is a home data object.

3. The computing system of claim 1, wherein application of the first filter is in response to a user selection.

4. The computing system of claim 1, wherein the plurality of data objects is selected by a user.

5. The computing system of claim 1, wherein the one or more computing devices are further programmed, via executable code instructions, to:

generate a report based at least on data from the first set of data objects and the second set of data objects, wherein a format of the report comprises at least one of a text format, a word processing format, a spreadsheet format, or a portable document format.

6. The computing system of claim 1, wherein the transform filter comprises a user-specified transform metric.

7. The computing system of claim 1, wherein the plurality of data objects is selected through a graphical user interface.

8. The computing system of claim 1, wherein at least one data object of the plurality of data objects corresponds to at least one of a buyer, seller, entity, or real estate agent.

9. Non-transitory computer storage comprising instructions for causing one or more computing devices to perform operations comprising:

applying a first filter to a plurality of data objects, the plurality of data objects including a starting quantity of data objects, to determine:

a first set of data objects from the plurality of data objects that satisfy the first filter, the first set including a first quantity of data objects;

applying a second filter to the plurality of data objects to determine:

a second set of data objects from the plurality of data objects that satisfy the second filter, the second set including a second quantity of data objects;

applying a third filter to the first and the second sets of data objects to determine:

a third set of data objects from both the first and the second set of data objects that satisfy the third filter, the third set including a third quantity of data objects;

applying a transform filter to the third set of data objects to determine:

a set of object properties from a property associated with each respective data object in the third set of data objects; and generating or updating a user interface to include:

concurrent graphical representations of:

a first segment having a top width representative of the starting quantity and a bottom width representative of the first quantity;

a second segment positioned adjacent and below the first segment, the second segment having a top width representative of the first quantity and a bottom width representative of the second quantity; and wherein the graphical representation includes a selectable control associated with the first segment and, in response to user selection of the selectable control, an order of filtering is adjusted so that the second filter is applied prior to the first filter, causing updates to the graphical representation so that:

the top width of the first segment is representative of the starting quantity and the bottom width of the first segment is representative of the second quantity, and the top width of the second segment is representative of the second quantity and the bottom width of the second segment is representative of the first quantity; and concurrent graphical representations of:

a root node indicating a root quantity of objects in the plurality of data objects;

a first node associated with the first filter and indicating the first quantity, wherein the first node is displayed as linked to the root node;

a second node associated with the second filter and indicating the second quantity, wherein the second node is displayed as linked to the root node;

a third node associated with the third filter and indicating the third quantity, wherein the third node is displayed as linked to the first and second nodes; and a fourth node associated with the transform filter and indicating a quantity of unique object properties in the set of object properties, wherein the fourth node is displayed as linked to the third node;

wherein the first node is selectable to initiate display of one or more of a first list or a first graph associated with the first set of data objects;

wherein the second node is selectable to initiate display of one or more of a second list or a second graph associated with the second set of data objects;

wherein the third node is selectable to initiate display of one or more of a third list or a third graph associated with the third set of data objects; and wherein the fourth node is selectable to initiate display of one or more of a fourth list or a fourth graph associated with the set of object properties.

10. The computing system of claim 1, wherein the one or more computing devices are further programmed, via the executable code instructions, to:

generate or update a user interface to include a graphical representation of:

a third segment positioned adjacent and below the second segment, the third segment having a top width representative of the second quantity and a bottom width representative of the third quantity.

11. The non-transitory computer storage of claim 9, wherein each data object of the plurality of data objects is a home data object.

12. The non-transitory computer storage of claim 9, wherein application of the first filter is in response to a user selection.

13. The non-transitory computer storage of claim 9, wherein the plurality of data objects is selected by a user.

14. The non-transitory computer storage of claim 9, wherein the transform filter comprises a user-specified transform metric.

15. A computer-implemented method comprising:

applying a first filter to a plurality of data objects, the plurality of data objects including a starting quantity of data objects, to determine:

a first set of data objects from the plurality of data objects that satisfy the first filter, the first set including a first quantity of data objects;

applying a second filter to the plurality of data objects to determine:

a second set of data objects from the plurality of data objects that satisfy the second filter, the second set including a second quantity of data objects;

applying a third filter to the first and the second sets of data objects to determine:

a third set of data objects from both the first and the second set of data objects that satisfy the third filter, the third set including a third quantity of data objects;

applying a transform filter to the third set of data objects to determine:

a set of object properties from a property associated with each respective data object in the third set of data objects; and generating or updating a user interface to include:

concurrent graphical representations of:

a first segment having a top width representative of the starting quantity and a bottom width representative of the first quantity;

a second segment positioned adjacent and below the first segment, the second segment having a top width representative of the first quantity and a bottom width representative of the second quantity; and wherein the graphical representation includes a selectable control associated with the first segment and, in response to user selection of the selectable control, an order of filtering is adjusted so that the second filter is applied prior to the first filter, causing updates to the graphical representation so that:

the top width of the first segment is representative of the starting quantity and the bottom width of the first segment is representative of the second quantity, and the top width of the second segment is representative of the second quantity and the bottom width of the second segment is representative of the first quantity; and concurrent graphical representations of:

a root node indicating a root quantity of objects in the plurality of data objects;

a first node associated with the first filter and indicating the first quantity, wherein the first node is displayed as linked to the root node;

a second node associated with the second filter and indicating the second quantity, wherein the second node is displayed as linked to the root node;

a third node associated with the third filter and indicating the third quantity, wherein the third node is displayed as linked to the first and second nodes; and a fourth node associated with the transform filter and indicating a quantity of unique object properties in the set of object properties, wherein the fourth node is displayed as linked to the third node;

wherein the first node is selectable to initiate display of one or more of a first list or a first graph associated with the first set of data objects;

wherein the second node is selectable to initiate display of one or more of a second list or a second graph associated with the second set of data objects;

wherein the third node is selectable to initiate display of one or more of a third list or a third graph associated with the third set of data objects; and wherein the fourth node is selectable to initiate display of one or more of a fourth list or a fourth graph associated with the set of object properties.

16. The computer-implemented method of claim 15, wherein each data object of the plurality of data objects is a home data object.

17. The computer-implemented method of claim 15, wherein the application of the first filter is in response to a user selection.

18. The computer-implemented method of claim 15, wherein the plurality of data objects is selected by a user.

19. The computer-implemented method of claim 15, wherein the transform filter comprises a user-specified transform metric.

20. A computing system comprising:

non-transitory computer storage storing a plurality of data objects; and one or more computing devices programmed, via executable code instructions, to:

apply a first filter to the plurality of data objects, the plurality of data objects including a starting quantity of data objects, to determine:

a first set of data objects from the plurality of data objects that satisfy the first filter, the first set including a first quantity of data objects;

apply a second filter to the plurality of data objects to determine:

a second set of data objects from the plurality of data objects that satisfy the second filter, the second set including a second quantity of data objects;

apply a third filter to the first and the second sets of data objects to determine:

a third set of data objects from both the first and the second set of data objects that satisfy the third filter, the third set including a third quantity of data objects;

apply a transform filter to the third set of data objects to determine:

a set of object properties from a property associated with each respective data object in the third set of data objects; and generate or update a user interface to include:

concurrent graphical representations of:

a first segment having a top width representative of the starting quantity and a bottom width representative of the first quantity;

a second segment positioned adjacent and below the first segment, the second segment having a top width representative of the first quantity and a bottom width representative of the second quantity; and wherein the graphical representation includes a selectable control associated with the first segment and, in response to user selection of the selectable control, an order of filtering is adjusted so that the second filter is applied prior to the first filter, causing updates to the graphical representation so that:

the top width of the first segment is representative of the starting quantity and the bottom width of the first segment is representative of the second quantity, and the top width of the second segment is representative of the second quantity and the bottom width of the second segment is representative of the first quantity.

21. The computing system of claim 20, wherein the one or more computing devices are further programmed, via the executable code instructions, to:

generate or update a user interface to include a graphical representation of:

a third segment positioned adjacent and below the second segment, the third segment having a top width representative of the second quantity and a bottom width representative of the third quantity.

* * * * *